(12) United States Patent
Mao et al.

(10) Patent No.: US 11,407,662 B2
(45) Date of Patent: Aug. 9, 2022

(54) ADSORBENTS, SYSTEMS, AND METHODS FOR SEPARATION OF ORGANIC SPECIES FROM WATER

(71) Applicant: Massachusetts Institute of Technology, Cambridge, MA (US)

(72) Inventors: Xianwen Mao, Ithaca, NY (US); Wenda Tian, Cambridge, MA (US); Yinying Ren, Cambridge, MA (US); Gregory C. Rutledge, Newton, MA (US); Trevor Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 796 days.

(21) Appl. No.: 16/024,493

(22) Filed: Jun. 29, 2018

(65) Prior Publication Data

US 2019/0071328 A1 Mar. 7, 2019

Related U.S. Application Data

(60) Provisional application No. 62/527,514, filed on Jun. 30, 2017.

(51) Int. Cl.
| | | |
|---|---|---|
| C02F 1/469 | (2006.01) | |
| B01D 15/32 | (2006.01) | |
| B01J 20/20 | (2006.01) | |
| B01J 20/22 | (2006.01) | |
| B01J 20/32 | (2006.01) | |
| C02F 9/00 | (2006.01) | |
| C02F 101/30 | (2006.01) | |
| C02F 101/34 | (2006.01) | |

(52) U.S. Cl.
CPC ............ *C02F 1/469* (2013.01); *B01D 15/327* (2013.01); *B01J 20/205* (2013.01); *B01J 20/223* (2013.01); *B01J 20/327* (2013.01); *C02F 9/00* (2013.01); *C02F 2101/306* (2013.01); *C02F 2101/308* (2013.01); *C02F 2101/345* (2013.01); *C02F 2209/04* (2013.01); *C02F 2305/08* (2013.01)

(58) Field of Classification Search
CPC ...... C02F 1/469; C02F 9/00; C02F 2101/306; C02F 2101/308; C02F 2101/345; C02F 2209/04; C02F 2305/08; B01D 15/327; B01J 20/205; B01J 20/223; B01J 20/327
See application file for complete search history.

(56) References Cited

U.S. PATENT DOCUMENTS

| | | | |
|---|---|---|---|
| 3,730,885 | A | 5/1973 | Makrides et al. |
| 4,775,556 | A | 10/1988 | Krause et al. |
| 5,425,858 | A | 6/1995 | Farmer |
| 7,658,828 | B2 | 2/2010 | Freydina et al. |

(Continued)

OTHER PUBLICATIONS

Tian et al., Electrochemically nanostructured polyvinylferrocene/polypyrrole hybrids with synergy for energy storage. Adv Funct Mater. 2015;25:4803-13.

(Continued)

*Primary Examiner* — Salil Jain
(74) *Attorney, Agent, or Firm* — Wolf, Greenfield & Sacks, P.C.

(57) ABSTRACT

Aspects described herein relate generally to adsorbent systems and methods for capturing and/or separating organic species (e.g., uncharged organic species) from mixtures with water.

83 Claims, 41 Drawing Sheets

(56) References Cited

U.S. PATENT DOCUMENTS

| | | | |
|---|---|---|---|
| 2007/0080115 A1* | 4/2007 | Sylvester | C02F 1/283 |
| | | | 210/688 |
| 2012/0211367 A1 | 8/2012 | Vecitis | |
| 2017/0113951 A1* | 4/2017 | Su | C02F 1/469 |
| 2018/0148354 A1 | 5/2018 | Bayram | |
| 2019/0055371 A1* | 2/2019 | Liu | H01G 11/48 |

OTHER PUBLICATIONS

International Search Report and Written Opinion dated Sep. 24, 2018 for Application No. PCT/US2018/040444.

De et al., Ni-based bimetallic heterogeneous catalysts for energy and environmental applications. Energy Environ Sci. 2016;9:3314-47. Epub Sep. 15, 2016.

Mao et al., Energetically efficient electrochemically tunable affinity separation using multicomponent polymeric nanostructures for water treatment. Energy Environ Sci. 2018;11:2954-63.

Ren et al., Superhydrophobic, surfactant-doped, conducting polymers for electrochemically reversible adsorption of organic contaminants. Adv Funct Mater. Aug. 8, 2018:28(32):1801466(1-12). Epub Jun. 22, 2018.

Su et al., Asymmetric Faradaic systems for selective electrochemical separations. Energy Environ Sci. 2017;10:1272-8 3. Epub Apr. 18, 2017.

Suss et al., Water desalination via capacitive deionization: what is it and what can we expect from it? Energy Environ Sci. 2015;8:2296-319. Epub May 5, 2015.

\* cited by examiner

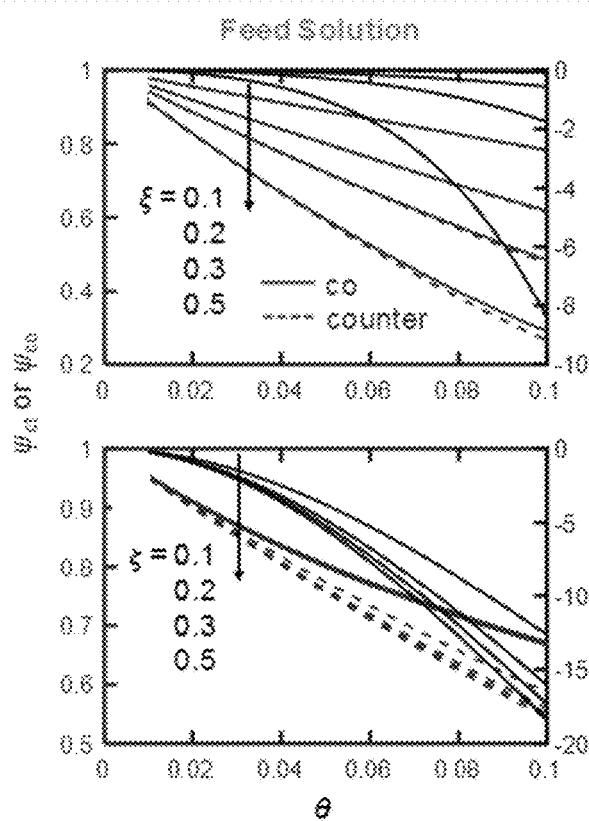
FIG. 6B
FIG. 6D
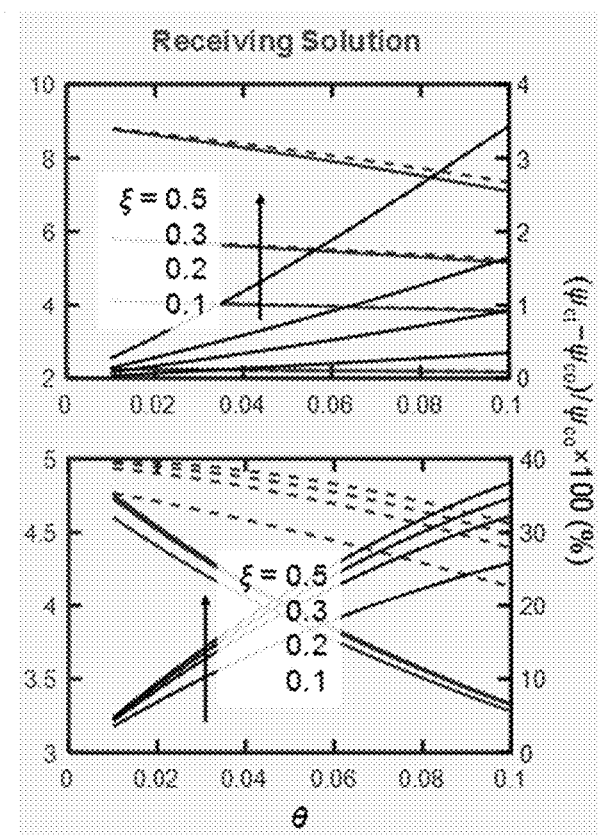
FIG. 6C
FIG. 6E

ADSORBENTS, SYSTEMS, AND METHODS FOR SEPARATION OF ORGANIC SPECIES FROM WATER

CROSS-REFERENCE TO RELATED APPLICATIONS

This application claims priority under 35 U.S.C. § 119(e) to U.S. Provisional Patent Application Ser. No. 62/527,514, filed Jun. 30, 2017, and entitled "ELECTROCHEMICALLY TUNABLE AFFINITY SEPARATION (ETAS) OF ORGANICS FROM WATER," which is incorporated herein by reference in its entirety for all purposes.

FIELD

Aspects described herein relate generally to adsorbent systems and methods for capturing and/or separating organic species (e.g., uncharged organic species) from mixtures with water.

BACKGROUND

Separation processes are of great importance in the chemical and environmental industries, accounting for 10-25% of the world's energy consumption, and about a third of total capital and operation costs in industrial plants. The development of separation technologies for water treatment with high energy efficiency and low environmental impact has become a primary engineering challenge for the $21^{st}$ century due to the worldwide occurrence of water contamination and the associated negative impacts on the environment and human health. Electrochemically controlled processes, such as capacitive deionization, have emerged as promising candidates for wastewater management and water desalination. However, since these previously developed electrochemical methods rely primarily on the electrostatic interaction between the electrode and the target pollutant, they only work for charged species (e.g., anions, cations). The aforementioned electrochemical methods and systems are not applicable to uncharged organic pollutants, which constitute the majority of industrial and municipal water contaminants, including many dyes, pesticides, pharmaceuticals and carcinogenic aromatics.

Accordingly, improved systems and methods are needed for separating organic species (e.g., uncharged organic species) from water.

SUMMARY

The current disclosure is related to adsorbent systems and methods for capturing and/or separating organic species (e.g., uncharged organic species) from water.

Certain embodiments are related to a method of separating an uncharged organic species from water, the method comprising applying a first electrical potential to a first adsorbent, contacting the first adsorbent with a feed stream comprising water and the uncharged organic species, and adsorbing at least some of the uncharged organic species into the first adsorbent.

Some embodiments are related to a method of separating an organic species from water, the method comprising applying a reductive potential to a first adsorbent, contacting the first adsorbent with a feed stream comprising water and the organic species, and adsorbing at least some of the organic species into the first adsorbent.

In certain embodiments, a system for reversibly adsorbing organic species is described, the system comprising a first adsorbent and/or a second adsorbent, and a polymeric coating associated with the first and/or second adsorbent, wherein the polymer coating comprises at least one redox active polymer species, and the conductivity of the polymeric coasting is from 1 S/cm to 200 S/cm, and the surface area of the polymeric coating is from 10 $m^2$/g to 200 $m^2$/g.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 4E is a $\psi_f$-$\theta$-$\eta$ chart of a PVF/PPY hybrid coating for a selected potential pair of 0.0 V-0.6 V, according to one set of embodiments;

FIG. 4F is a $\psi_f$-$\theta$-$\eta$ chart of a PVF/PPY hybrid coating for a selected potential pair of 0.2 V-0.4 V, according to one set of embodiments;

FIG. 6B shows simulated $\psi_{ct}$ or $\psi_{co}$ values with different $\theta$ and $\xi$ for the nonlinear sorption isotherm case of the feed stream, according to one set of embodiments;

FIG. 6C shows simulated $\psi_{ct}$ or $\psi_{co}$ values with different $\theta$ and $\xi$ for the nonlinear sorption isotherm case of the receiving stream, according to one set of embodiments;

FIG. 6D shows simulated $\psi_{ct}$ or $\psi_{co}$ values with different $\theta$ and $\xi$ for the linear sorption isotherm case of the feed stream, according to one set of embodiments;

FIG. 6E shows simulated $\psi_{ct}$ or $\psi_{co}$ values with different $\theta$ and $\xi$ for the linear sorption isotherm case of the receiving stream, according to one set of embodiments;

DETAILED DESCRIPTION

Figure 1A:
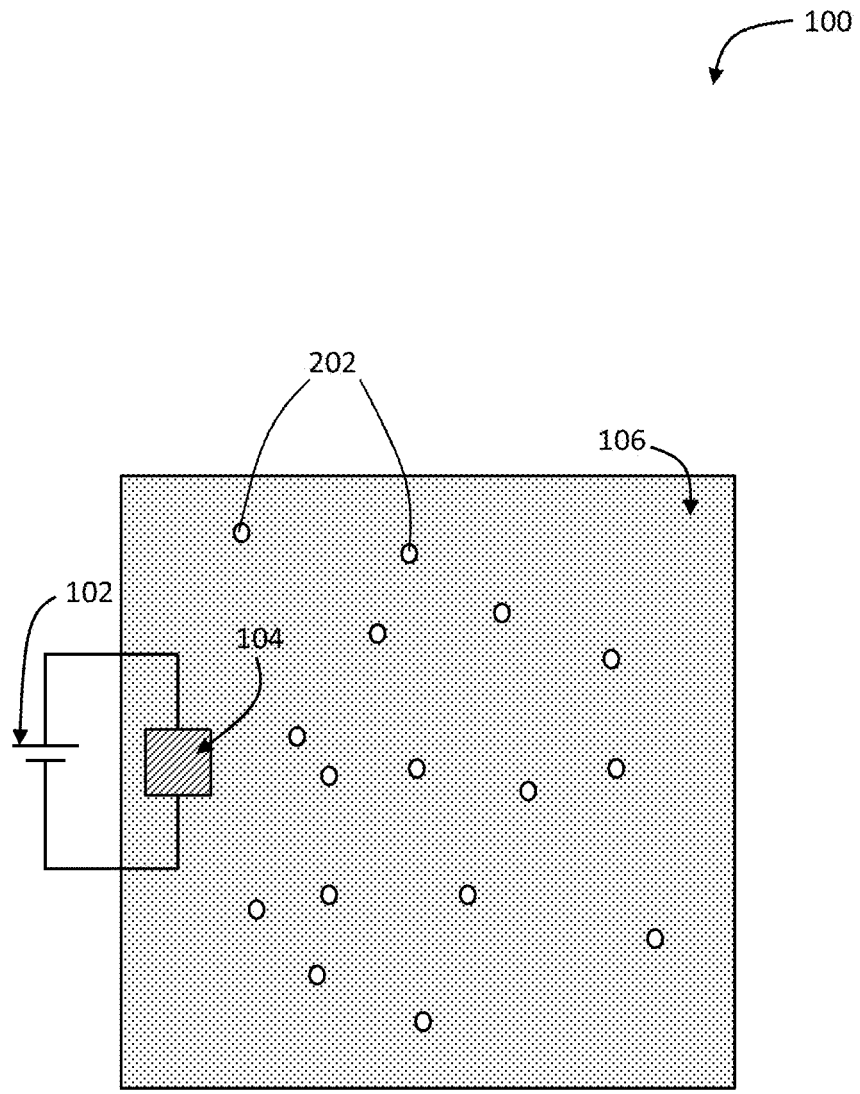
FIG. 1A is a schematic diagram of a method of separating an organic species from a feed stream using an adsorbent with an applied potential, according to one set of embodiments.

The Inventors have recognized and appreciated that developing novel separation strategies for chemical mixtures without using heat may significantly reduce energy consumption, emissions, and pollution worldwide. In the embodiments described, a new approach is taken to water treatment. Herein, the systems and methods employ what is referred to as electrochemically tunable affinity separation (ETAS), which exploits electricity as an external stimulus for control over separation of organics from water. Regarding the implementation of ETAS, the Inventors have developed stimulus-responsive adsorbent systems, with the surface hydrophobicity of a system being programmable by an electrical potential. In some embodiments, an adsorbent displays an electrically-controlled affinity toward neutral organic molecules, facilitating the use of exquisite electrical swing to release and capture organics in a cyclic fashion.

The global prevalence of water resources contaminated by pollutants (e.g., organic pollutants), such as pesticides, dyes, pharmaceuticals, and endocrine disrupting compounds, has raised concerns about potential deleterious effects on the environment, particularly aquatic ecosystems. Exposure to organic pollutants has been found to be linked to negative human health effects, including increased predisposition toward diabetes, cancer, infertility, obesity, and other types of endocrine disorders. High separation efficiencies for the removal of organics from water have been achieved using conventional processes such as adsorption, stripping, distillation, and solvent extraction, as well as more recent technologies such as advanced oxidation treatment and membrane separation. However, the overall separation process inherently associated with these methods usually involves energy-intensive steps (e.g., the requirement for high temperature or pressure) and/or environmentally unfriendly processes (e.g., the use of organic solvents and additives leading to the generation of secondary pollutants). It is therefore important to develop water treatment technologies that are more energy efficient and environmentally responsible.

In some embodiments, ETAS shows higher energy efficiencies and incurs lower environmental costs than established methods for separation of neutral organics from water. This can be attributed to the fact that ETAS operates at room temperature and pressure, requires almost no need for organic solvents and additional chemicals for extraction and/or adsorbent regeneration, and produces no secondary pollutants during operation. According to certain embodiments, ETAS can achieve multiple levels of hydrophobicity and thus affinity towards organics since an external electrical signal (e.g., potential) can be tuned with high precision, permitting a systematic adjustment of a ratio between hydrophobic and hydrophilic moieties at the surface of the adsorbent. Such systems that respond to external chemico-physical stimuli offer advanced control with a high degree of tunability and flexibility, enabling a deeper understanding and thus optimization of that process. In certain embodiments, the hydrophobicity of an ETAS adsorbent can be modulated with a high spatiotemporal resolution. Some ETAS-integrated devices have operational advantages such as modularity, portability, and low cost. In certain embodiments, the ETAS adsorbent displays an electrically programmable affinity toward neutral, uncharged organic species, enabling the cyclic capture and release of organic molecules.

In some embodiments, the systems described herein may comprise an adsorbent. In certain embodiments, the adsorbent may function as an electrode (e.g., for electrochemistry). According to certain embodiments, the adsorbent is redox active. In certain embodiments, the adsorbent comprises a nanostructure (e.g., a nanosphere, nanowire, nanoparticle, nanorod, nanofiber, etc.). The nanostructure may be a core-shell nanostructure, according to some embodiments. In some aspects, the core-shell nanostructure may comprise a heterogeneous $\pi$-electron-rich nanostructure comprising a polymer shell (e.g., coating) with redox-tunable hydrophobicity, which is explained in more detail herein. Briefly, such core-shell nanostructures allow for the use of small potential differences to create larger differences in the adsorption capacity between reduced and oxidized states of the adsorbent.

According to some embodiments, the adsorbent may comprise a carbon cloth (CC). In certain cases, the CC is a flexible and robust substrate comprising bendable carbon nanofibers and/or microfibers. In some embodiments, the adsorbent comprises carbon nanotubes (CNTs). According to some embodiments, the CNTs may be metallic CNTs. In some embodiments, the adsorbent may comprise activated carbon (AC), single-walled carbon nanotubes (SWCNTs), double-walled carbon nanotubes, DWCNTs, multi-walled carbon nanotubes (MWCNTs), and/or graphene oxide (GO).

In certain embodiments, the adsorbent may comprise a coating (e.g., a coating associated with the adsorbent). For example, in some embodiments, the adsorbent comprises a CC comprising a coating and/or CNTs comprising a coating. According to some embodiments, the coating comprises an organometallic polymer that comprises an aromatic group. An organometallic polymer may be, in some cases, a polymer containing at least one chemical bond between a carbon atom of an organic molecule and a metal, including alkaline metals, alkaline earth metals, transition metals, and metalloids (e.g. a redox polymer with a metallocene moiety). For example, in some cases, the organometallic polymer comprises polyvinylferrocene (PVF). In certain embodiments, the coating comprises a conducting polymer. A conducting polymer may have a $\pi$-conjugated backbone, in certain embodiments. For example, in some cases, the conducting polymer comprises polypyrrole (PPY).

According to certain embodiments, the coating may comprise a hybrid of polyvinylferrocene/polypyrrole (PVF/PPY). In some embodiments, the PVF/PPY hybrid coating may be fabricated via simultaneous electro-polymerization of pyrrole and electro-deposition of PVF. In certain embodiments, the hybrid coating comprising PVF may be subjected to redox-tunable hydrophobicity by oxidation and/or reduction of the ferrocene moieties. The conjugated PPY chains in the hybrid coating may establish electron transport pathways (e.g., to permit electrical control), in some embodiments.

In a certain non-limiting embodiment, the adsorbent may comprise a core of metallic CNTs coated with a conformal hybrid coating of PVF/PPY. The metallic CNTs coated with the hybrid coating of PVF/PPY may be formed by electrochemical deposition and/or non-covalent π stacking interactions between the three components (e.g., CNTs, PVF, and PPY).

According to certain embodiments, methods of separating an uncharged organic species from water using the aforementioned adsorbents are described herein. In some embodiments, the method may comprise applying an electrical potential to an adsorbent.

When the applied electrical potential (E) is lower than the formal potential of ferrocene ($E^0$=0.32 V), at least a portion of the polymer coating (e.g, at least a portion of ferrocene moieties in PVF) is reduced. In some such embodiments, the ETAS adsorbent is resultantly hydrophobic and has the ability to adsorb a neutral organic species from water. In certain embodiments, when $E \gg E^0$, at least a portion of the polymer coating (e.g., at least a portion of ferrocene moieties in PVF) is oxidized. In some such embodiments, ETAS adsorbent becomes relatively hydrophilic and has the ability to desorb a neutral organic species that it has previously adsorbed.

In certain embodiments, the ratio (R) between the hydrophilic and hydrophobic moieties (e.g., oxidized and reduced ferrocene) can be tuned precisely by the applied potential according to the Nernst equation:

$$E = E^0 - \left(\frac{kT}{e}\right)\ln R$$

where k is the Boltzmann constant, T the temperature, and e is the elementary charge. According to some embodiments, the precise tuning of R therefore enables the programmable adjustment of the adsorbent adsorption affinity for an organic species.

According to some embodiments, R may be any of a variety of suitable values. For example, in certain embodiments R may be greater than or equal to 0.0, greater than or equal to 0.1, greater than or equal to 0.2, greater than or equal to 0.3, greater than or equal to 0.4, greater than or equal to 0.5, greater than or equal to 0.6, greater than or equal to 0.7, greater than or equal to 0.8, or greater than or equal to 0.9. In some embodiments, R may be less than or equal to 1.0, less than or equal to 0.9, less than or equal to 0.8, less than or equal to 0.7, less than or equal to 0.6, less than or equal to 0.5, less than or equal to 0.4, less than or equal to 0.3, less than or equal to 0.2, or less than or equal to 0.1. Combinations of the above recited ranges are also possible (e.g., R may be greater than or equal to 0.1 and less than or equal to 0.9, R may be greater than or equal to 0.4 and less than or equal to 0.6).

According to certain embodiments, the applied electrical potential is an applied electrochemical potential. The electrochemical potentials described herein may be applied at standard temperature and pressure (e.g., 20° C. and 1 atm), indicating the described methods and processes are environmentally friendly and not energy intensive. In some embodiments, the applied electrochemical potential may be a reductive potential or an oxidative potential. In certain embodiments, as the applied electrochemical potential is increased from a reducing potential (e.g., 0.0 V) to an oxidizing potential (e.g., 0.6 V), the adsorption capacity of the adsorbent decreases. The adsorbent may become increasingly hydrophilic at higher (e.g., more oxidizing) potentials at which at least a portion of the polymer coating is oxidized. In some embodiments, as the applied electrochemical potential is decreased from an oxidizing potential (e.g., 0.6 V) to a reducing potential (e.g., 0.0 V), the adsorption capacity of the adsorbent increases. According to some embodiments, the adsorbent may become increasingly hydrophobic at lower (e.g., more reducing) potentials at which at least a portion of the polymer coating is oxidized. Certain methods for determining the adsorbent adsorption performance are described herein in greater detail below.

Any of a variety of suitable electrical potentials may be applied to the adsorbent. For example, according to certain embodiments, the applied electrical potential is greater than or equal to 0.0 V, greater than or equal to 0.1 V, greater than or equal to 0.2 V, greater than or equal to 0.3 V, greater than or equal to 0.4 V, greater than or equal to 0.5 V. According to some embodiments, the applied electrical potential is less than or equal to 0.6 V, less than or equal to 0.5 V, less than or equal to 0.4 V, less than or equal to 0.3 V, less than or equal to 0.2 V, or less than or equal to 0.1 V. Combinations of the above recited ranges are also possible (e.g., the applied electrical potential is greater than or equal to 0.0 V and less than or equal to 0.6 V, the applied electrical potential is greater than or equal to 0.1 V and less than or equal to 0.2V). All electrical potentials described herein are referenced to an Ag/AgCl reference electrode.

Certain embodiments are related to applying a first electrical potential (e.g., a reductive potential) to an adsorbent (e.g., to reduce at least a portion of the adsorbent). For example, in some embodiments, upon application of a reductive potential, at least a portion of the adsorbent comprising PVF may be reduced, thereby providing an at least partially reduced adsorbent. FIG. 1A shows a schematic diagram of a method of separating an organic species from a feed stream using an adsorbent with an applied potential, according to one set of embodiments. As shown in FIG. 1A, method 100 of separating an organic species (e.g., an uncharged organic species) from water may comprise applying first electrical potential (e.g., reductive potential) 102 to adsorbent 104.

Any of a variety of suitable reductive potentials may be applied to the adsorbent. According to certain embodiments, the applied reductive potential is greater than or equal to 0.0 V, greater than or equal to 0.05 V, greater than or equal to 0.1 V, or greater than or equal to 0.15 V. In some embodiments, the applied reductive potential is less than or equal to 0.2 V, less than or equal to 0.15 V, less than or equal to 0.1 V, or less than or equal to 0.05 V. Combinations of the above recited ranges are also possible (e.g., the applied electrical potential is greater than or equal to 0.0 V and less than or equal to 0.2 V, the applied electrical potential is greater than or equal to 0.1 V and less than or equal to 0.15 V).

According to some embodiments, the method may comprise contacting an adsorbent with a feed stream. For example, as shown in FIG. 1A, the method may comprise contacting adsorbent 104 with feed stream 106. In certain embodiments, the method may comprise applying the first electrical potential to the adsorbent before and/or while contacting the first adsorbent with the feed stream. In reference to FIG. 1A, the method may comprise applying first electrical potential 102 to adsorbent 104 before and/or while contacting adsorbent 104 with feed stream 106. In some embodiments, the feed stream is successively contacted with an at least partially reduced adsorbent after application of a reducing potential. In some such embodiments, the at least partially reduced adsorbent is at least partially hydrophobic and has the ability to adsorb a neutral organic species from water, which is described in greater detail below. In certain embodiments, the feed stream may comprise water and/or the uncharged organic species.

The feed stream may have any of a variety of suitable volumes. For example, in certain embodiments, the feed stream may have a volume of greater than or equal to 10 mL, greater than or equal to 25 mL, greater than or equal to 50 mL, greater than or equal to 100 mL, greater than or equal to 250 mL, greater than or equal to 500 mL, greater than or equal to 1 L, greater than or equal to 1.5 L, greater than or equal to 2 L, or greater than or equal to 5 L. According to certain embodiments, the feed stream may have a volume of less than or equal to 10 L, less than or equal to 5 L, less than or equal to 2 L, less than or equal to 1.5 L, less than or equal to 1 L, less than or equal to 500 mL, less than or equal to 250 mL, less than or equal to 100 mL, less than or equal to 50 mL, or less than or equal to 25 mL. Combinations of the above recited ranged are also possible (e.g., the feed stream has a volume of greater than or equal to 10 mL and less than or equal to 5 L, the feed stream has a volume of greater than or equal to 50 mL and less than or equal to 500 mL).

Additionally, the feed stream may have any suitable concentration of the organic species. For example, in certain embodiments, the concentration of the organic species in the feed stream may be greater than or equal to 1 mg/L, greater than or equal to 2 mg/L, greater than or equal to 5 mg/L, greater than or equal to 10 mg/L, greater than or equal to 25 mg/L, greater than or equal to 50 mg/L, or greater than or equal to 100 mg/L. In some embodiments, the concentration of the organic species in the feed stream may be less than or equal to 150 mg/L, less than or equal to 100 mg/L, less than or equal to 50 mg/L, less than or equal to 25 mg/L, less than or equal to 10 mg/L, less than or equal to 5 mg/L, or less than or equal to 2 mg/L. Combinations of the above recited ranged are also possible (e.g., the concentration of the organic species in the feed stream may be greater than or equal to 1 mg/L and less than or equal to 150 mg/L, the concentration of the organic species in the feed stream may be greater than or equal to 2 mg/L and less than or equal to 10 mg/L). In addition, the feed stream may comprise more than one organic species (e.g., two, three, four, five organic species).

In some embodiments, the method may comprise adsorbing at least some of the uncharged organic species into the adsorbent upon contacting the adsorbent (e.g., the at least partially reduced adsorbent) with the feed stream. For example, referring to FIG. 1A, the method may comprise adsorbing at least some of organic species 202 into adsorbent 104. According to certain embodiments, the adsorption comprises associating the organic species with the adsorbent by the hydrophobic interaction of the adsorbent. For example, in some aspects, as the adsorbent becomes hydrophobic (e.g., upon application of a reductive potential), the organic species is adsorbed due to the non-affinity of the adsorbent for water in the feed stream. Importantly, in certain embodiments, the hydrophobic interaction of adsorbent is the means for which the Inventors have realized that uncharged organic species can be adsorbed from water.

According to certain embodiments, the adsorption performance (e.g., the adsorption efficiency) of the adsorbent can be determined by evaluating the distribution coefficient ($K_d$) of the organic species with respect to the adsorbent. According to some embodiments, the distribution coefficient may be defined as:

$$K_d(mL/g) = Q_e/C_e$$

where $Q_e$ (mg/g) is the mass of adsorbed organic species per unit mass of polymer coating, and $C_e$ (mg/L) is the concentration of the organic species in the feed stream at equilibrium. In certain embodiments, the $K_d$ of the organic species with respect to the adsorbent decreases as the applied electrical potential increases.

The $K_d$ of the organic species with respect to the adsorbent may be any of a variety of suitable values. For example, in certain embodiments, the $K_d$ of the organic species with respect to the adsorbent is greater than or equal to $10^3$ mL/g, greater than or equal to $10^4$ mL/g, greater than or equal to $10^5$ mL/g, greater than or equal to $10^6$ mL/g, or greater than or equal to $10^7$ mL/g at an applied electrical potential of 0.0 V. According to some embodiments, the $K_d$ of the organic species with respect to the adsorbent is less than or equal to $10^8$ mL/g, less than or equal to $10^7$ mL/g, less than or equal to $10^6$ mL/g, less than or equal to $10^5$ mL/g, or less than or equal to $10^4$ mL/g at an applied electrical potential of 0.0 V. Combinations of the above recited ranges are also possible (e.g., the $K_d$ of the organic species with respect to the adsorbent is greater than or equal to $10^3$ mL/g and less than or equal to $10^6$ mL/g at an applied electrical potential of 0.0 V, the $K_d$ of the organic species with respect to the adsorbent is greater than or equal to $10^5$ mL/g and less than or equal to $10^6$ mL/g at an applied electrical potential of 0.0 V).

In a non-limiting embodiment, the $K_d$ of the organic species with respect to adsorbent comprising PVF/PPY is $1.4 \times 10^5$ mL/g at an applied electrical potential of 0.0 V.

Figure 1B:
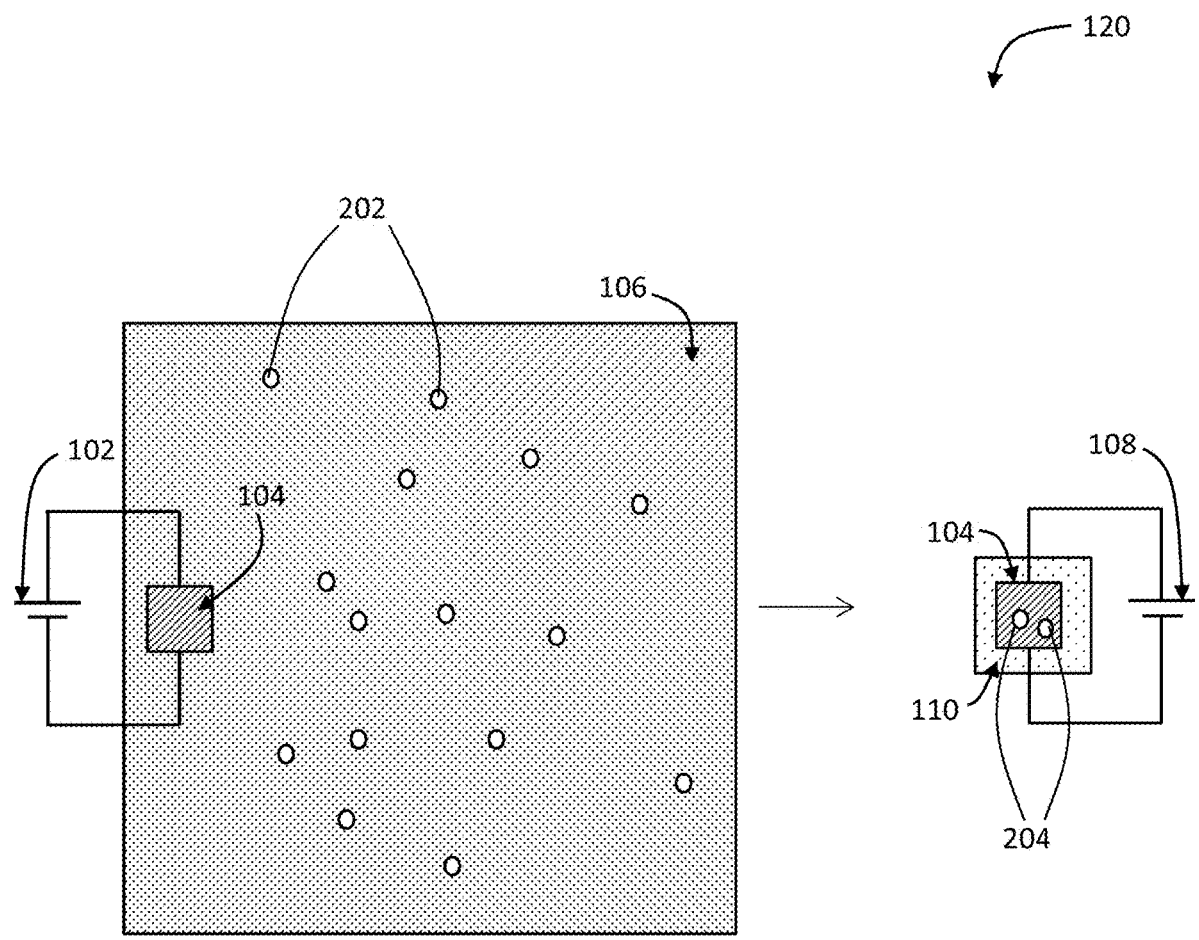
FIG. 1B is a schematic diagram of a method of separating an organic species from a feed stream using an adsorbent with a plurality of applied potentials, and desorbing the adsorbed organic species into a receiving stream, according to one set of embodiments.

Certain embodiments are related to applying a second electrical potential (e.g., an oxidative potential) to an adsorbent (e.g., to oxidize at least a portion of the adsorbent). For example, in some embodiments, upon application of an oxidative potential, at least a portion of the adsorbent comprising PVF may be oxidized, thereby providing an at least partially oxidized adsorbent. FIG. 1B shows, is a schematic diagram of a method of separating an organic species from a feed stream using an adsorbent with a plurality of applied potentials, and desorbing the adsorbed organic species into a receiving stream, according to one set of embodiments. In some embodiments, method 210 may comprise applying a second electrical potential 108 to first adsorbent 104. According to certain embodiments, the second electrical potential may be applied to the adsorbent after the steps of: applying the first electrical potential to adsorbent, contacting the first adsorbent with a feed stream, and adsorbing at least some of an uncharged organic species.

Any of a variety of suitable oxidative potentials may be applied to the adsorbent. According to certain embodiments, the applied oxidative potential is greater than or equal to 0.3 V, greater than or equal to 0.35 V, greater than or equal to 0.4 V, greater than or equal to 0.45 V, greater than or equal to 0.5 V, or greater than or equal to 0.55 V. In some embodiments, the applied reductive potential is less than or equal to 0.6 V, less than or equal to 0.55 V, less than or equal to 0.5 V, less than or equal to 0.45 V, less than or equal to 0.4 V, or less than or equal to 0.35 V. Combinations of the above recited ranges are also possible (e.g., the applied electrical potential is greater than or equal to 0.3 V and less than or equal to 0.6 V, the applied electrical potential is greater than or equal to 0.35 V and less than or equal to 0.45 V).

In certain embodiments, the method may comprise contacting an adsorbent with a receiving stream. For example, as shown in FIG. 1B, the method may comprise contacting adsorbent 104 with receiving stream 110. In certain embodiments, the method may comprise applying the second electrical potential to the adsorbent before and/or while contacting the first adsorbent with the receiving stream. For example, in reference to FIG. 1B, the method may comprise applying second electrical potential 108 to adsorbent 104 before and/or while contacting adsorbent 104 with receiving stream 110. According to certain embodiments, the receiving stream is successively contacted with an at least partially oxidized adsorbent after application of an oxidizing potential. In some such embodiments, the at least partially oxidized adsorbent is at least partially hydrophilic and has the ability to desorb a neutral organic species (e.g., that the adsorbent has previously adsorbed). In some embodiments, the receiving steam may comprise water and initially no uncharged organic species (e.g., pure water).

The receiving stream may have any of a variety of suitable volumes. For example, in certain embodiments, the receiving stream may have a volume of greater than or equal to 1 mL, greater than or equal to 2 mL, greater than or equal to 3 mL, greater than or equal to 5 mL, greater than or equal to 10 mL, greater than or equal to 15 mL, greater than or equal to 25 mL, or greater than or equal to 50 mL. According to certain embodiments, the receiving stream may have a volume of less than or equal to 50 mL, less than or equal to 25 mL, less than or equal to 15 mL, less than or equal to 10 mL, less than or equal to 5 mL, less than or equal to 3 mL, or less than or equal to 2 mL. Combinations of the above recited ranged are also possible (e.g., the receiving stream has a volume of greater than or equal to 1 mL and less than or equal to 50 mL, the receiving stream has a volume of greater than or equal to 3 mL and less than or equal to 10 mL).

In some embodiments, the volume of the feed stream is greater than the volume of the receiving stream. For example, as shown in FIG. 1B, the volume of feed stream 106 is greater than the volume of receiving stream 110. In certain embodiments, the volume of the feed stream may be from 1.1 to 200 times greater than the volume of the receiving stream, or 2 to 50 times greater than the volume of the receiving stream, or 10 to 30 times greater than the volume of the receiving stream. In a non-limiting embodiment, the volume of the feed stream may be 100 mL and the volume of the receiving stream may be 5 mL.

According to certain embodiments, upon contacting the adsorbent (e.g., the at least partially oxidized adsorbent) with a receiving stream, the method may comprise desorbing at least some of the uncharged species (e.g., into the receiving steam). For example, referring to FIG. 1B, the method may comprise desorbing at least some of adsorbed organic species 204 from first adsorbent 104. In certain embodiments, the desorption comprises dissociating the organic species from the adsorbent by the hydrophilic interaction of the adsorbent. For example, in some aspects, as the adsorbent becomes hydrophilic (e.g., upon application of an oxidative potential), the organic species that was previously adsorbed is desorbed due to the affinity of the adsorbent for water in the receiving stream. In certain embodiments, the hydrophilic interaction of adsorbent is the means for which the Inventors have realized that uncharged organic species can be desorbed from the adsorbent (e.g., and separated from water).

In certain embodiments, the method steps described herein may be repeated a plurality of times. For example, in certain embodiments, the method may comprise applying a first electrical potential to an adsorbent, contacting the adsorbent with a feed stream comprising water and the uncharged organic species, and adsorbing at least some of the uncharged organic species into the adsorbent. Additionally, in certain embodiments, the method may further comprise applying a second electrical potential to the adsorbent, contacting the adsorbent with a receiving stream, and desorbing at least some of the adsorbed uncharged organic species from the adsorbent. In certain embodiments, the method steps described above may be repeated from 2 to 500 times, or from 5 to 250 times, or from 10 to 100 times.

According to certain embodiments, at least some of the organic species may be transferred from the feed stream to the receiving stream. For example, in certain embodiments, the organic species is adsorbed from the feed stream by the adsorbent, and desorbed into the receiving stream from the adsorbent. Any of a variety of suitable amounts of the organic species may be transferred from the feed stream to the receiving stream. For example, at least 50%, at least 60%, at least 70%, at least 80%, at least 90%, at least 95%, at least 98%, or at least 99% of the organic species is transferred from the feed stream to the receiving stream.

Additionally, the receiving stream may have any suitable concentration of the organic species after the organic species is transferred from the feed stream to the receiving stream. For example, in certain embodiments, the concentration of the organic species in the receiving stream after the organic species is transferred from the feed stream to the receiving stream may be greater than or equal to 1 mg/L, greater than or equal to 2 mg/L, greater than or equal to 5 mg/L, greater than or equal to 10 mg/L, greater than or equal to 25 mg/L, greater than or equal to 50 mg/L, or greater than or equal to 100 mg/L. In some embodiments, the concentration of the organic species in the receiving stream after the organic species is transferred from the feed stream to the receiving stream may be less than or equal to 150 mg/L, less than or equal to 100 mg/L, less than or equal to 50 mg/L, less than or equal to 25 mg/L, less than or equal to 10 mg/L, less than or equal to 5 mg/L, or less than or equal to 2 mg/L. Combinations of the above recited ranged are also possible (e.g., the concentration of the organic species in the receiving stream after the organic species is transferred from the feed stream to the receiving stream may be greater than or equal to 1 mg/L and less than or equal to 150 mg/L, the concentration of the organic species in the receiving stream after the organic species is transferred from the feed stream to the receiving stream may be greater than or equal to 2 mg/L and less than or equal to 10 mg/L).

Figure 4A:
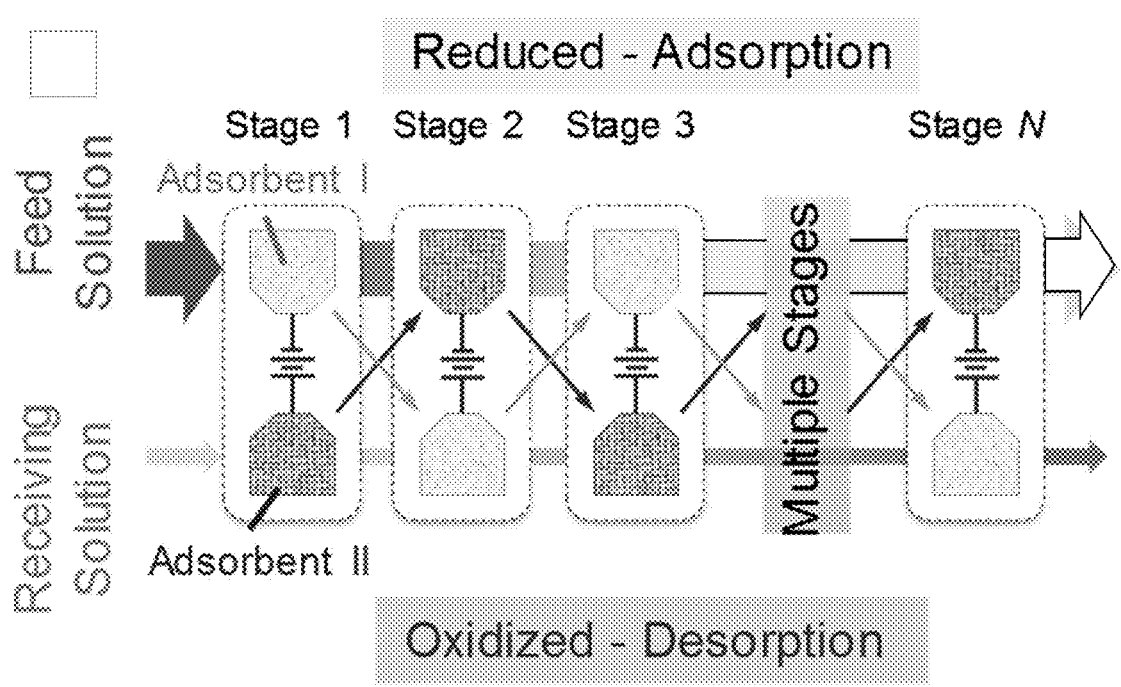
FIG. 4A is a schematic diagram of a method of a ETAS multi-stage batch process, according to one set of embodiments.

According to some embodiments, the ETAS adsorbents described herein can be used in a multi-stage cyclic batch process. Accordingly, in certain embodiments, the system may comprise a first adsorbent and a second adsorbent. In certain embodiments, the first adsorbent and the second adsorbent can be subjected to alternating electrical potentials (e.g., alternating reductive potentials and oxidative potentials) across multiple stages. According to some embodiments, by cyclically alternating the polarity of the first adsorbent and the second adsorbent across multiple stages, the gradual transfer of the organic species is permitted from the feed stream to the receiving stream. An example of a ETAS multi-stage batch process is shown in FIG. 4A. In some embodiments, at stage 1, the first adsorbent is reduced and contacts the feed stream for adsorbing the organic species, whereas the second adsorbent is oxidized and contacts the receiving stream for desorbing the organic species. In certain embodiments, at stage 2, the second adsorbent is reduced and contacts the feed stream for adsorbing the organic species, whereas the first adsorbent is oxidized and contacts the receiving stream for desorbing the organic species. In certain embodiments, the stages would be repeated across multiple stages, until stage N.

Figure 1C:
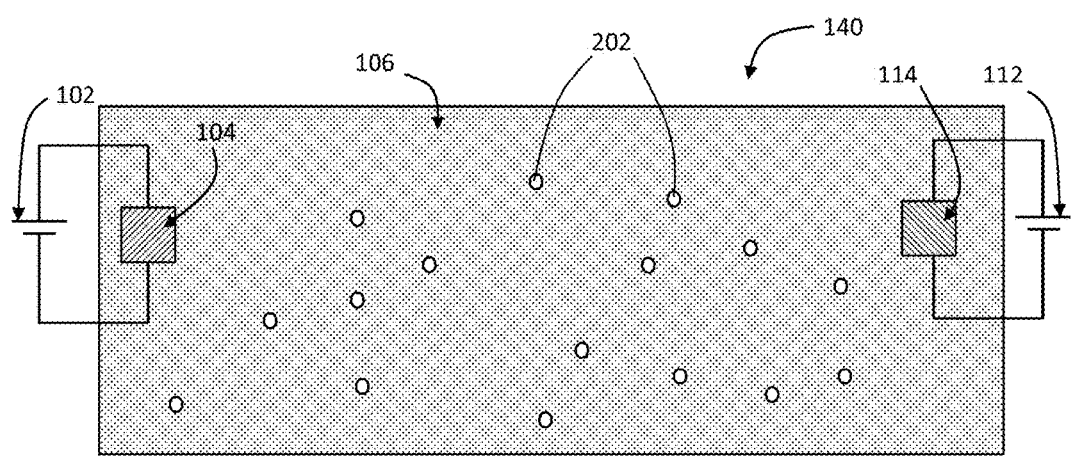
FIG. 1C is a schematic diagram of a cyclic batch process method of separating an organic species from a feed stream using a first adsorbent and a second adsorbent with a plurality of applied potentials, and desorbing the adsorbed organic species into a receiving stream, according to one set of embodiments.
Figure 1C:
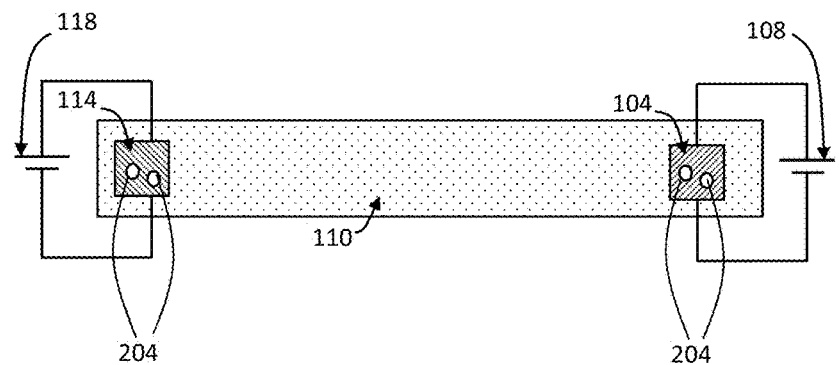
Figure 2:
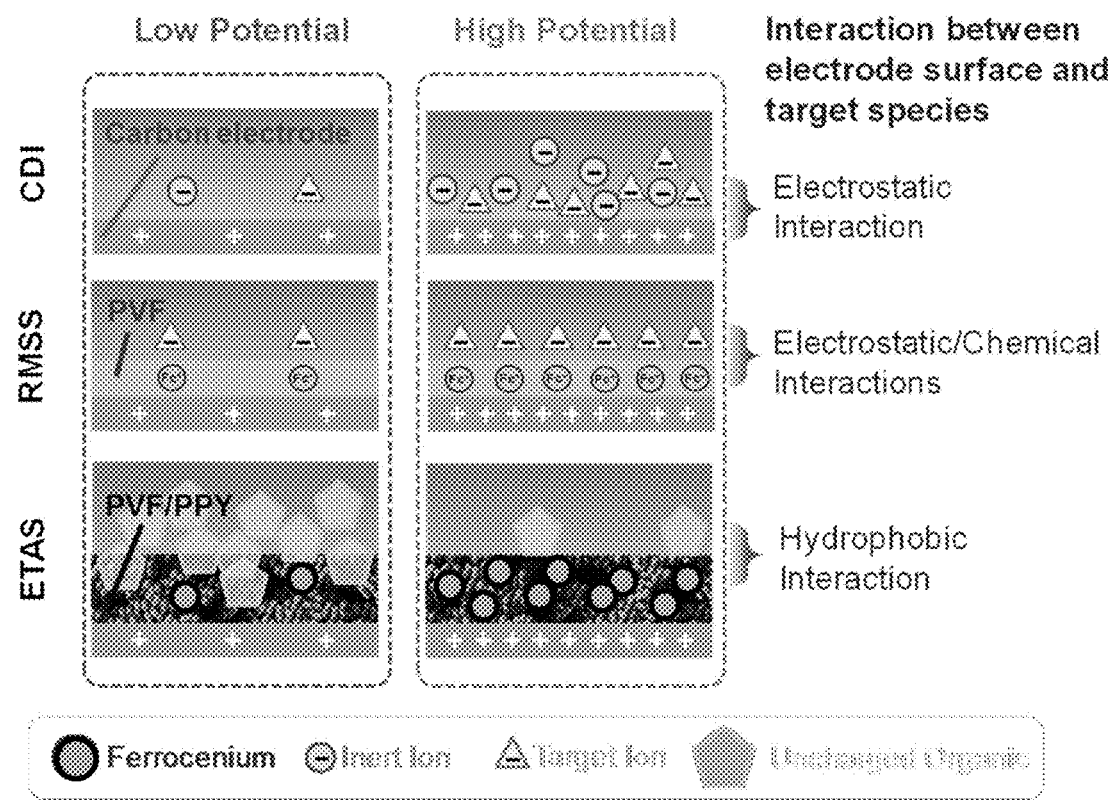
FIG. 2. is a schematic illustration of the ETAS concept, in comparison with capacitive deionization (CDI) and redox-mediated selective separation (RMSS), according to one set of embodiments.

In some embodiments, at a first stage, the first adsorbent is subjected to a reductive potential, as described above. In certain embodiments, at the first stage, the method may further comprise applying the second electrical potential (e.g., an oxidative potential) to a second adsorbent (e.g., thereby providing an at least partially oxidized adsorbent), contacting the second at least partially oxidized adsorbent with a receiving stream, and desorbing at least some of an adsorbed uncharged organic species from the second adsorbent. For example, FIG. 1C shows, is a schematic diagram of a cyclic batch process method of separating an organic species from a feed stream using a first adsorbent and a second adsorbent with a plurality of applied potentials, and desorbing the adsorbed organic species into a receiving stream, according to one set of embodiments. As shown in FIG. 1C, method 140 may comprise applying second electrical potential (e.g., oxidative potential) 118 to second adsorbent 114, contacting second adsorbent 114 with receiving stream 110, and desorbing at least some of adsorbed organic species 204 (e.g., uncharged organic species) 204 from second adsorbent 114.

In some embodiments, at a second stage, the first adsorbent is subjected to an oxidative potential, as described above. In certain embodiments, at the second stage, the method may further comprise applying the first electrical potential to the second adsorbent, contacting the second adsorbent with a feed stream, and adsorbing at least some of the uncharged organic species into the second adsorbent. For example, as shown in FIG. 1C., method 140 may comprise applying first electrical potential (e.g., reductive potential) 112 to second adsorbent 114, contacting second adsorbent 114 with feed stream 106, and adsorbing at least some of the organic species (e.g., uncharged organic species) 202 into second adsorbent 114.

In certain embodiments, the method may comprise applying the first electrical potential to the second adsorbent before and/or while contacting the second adsorbent with the feed stream comprising water and the uncharged organic species. In certain embodiments, the method may comprise applying the second electrical potential to the second adsorbent before and/or while contacting the second adsorbent with the receiving stream comprising water. In additional embodiments, applying the first electrical potential to the second adsorbent may be done while applying the second electrical potential to the first adsorbent.

According to certain embodiments, the multi-stage cyclic batch process can be repeated for any suitable number (N) of stages. For example, in some embodiments, the multi-stage cyclic batch process may be repeated from 2 to 500 times, or from 5 to 250 times, or from 10 to 100 times.

In some embodiments, the applied first electrical potential (e.g., reductive potential) and the applied second electrical potential (e.g. oxidative potentials) may differ by between or equal to 0.0 V and 0.6 V, by between or equal to 0.2 V to 0.4 V, or by between or equal to 0.2 V to 0.3 V.

According to certain embodiments, the energetic efficiency ($\eta$) of the ETAS multi-stage cyclic batch method can be defined as the minimum work (e.g., thermodynamically reversible work, $W_{rev}$) needed to achieve a given change between the feed stream and the receiving stream, divided by the actual energy consumed in the ETAS process (e.g., electrochemical work, $W_{ec}$):

$$\eta = W_{rev} / W_{ec}$$

$$W_{rev} = RT \sum_i v_i n_i [y_i \ln y_i + (1 - y_i)\ln(1 - y_i)],$$

-continued $$W_{ec} = F \sum_{j=1}^{N} [c_{swing,j}(E_{a,j} - E_{c,j})],$$

where R is the ideal gas constant, T is the solution temperature, i represents the feed stream and receiving stream, v is 1 for the receiving stream and −1 for the feed streams, n is the total moles in each stream, y is the molar fraction of the organic species, F is the Faraday constant, j represents the stage number, N is the total number of stages, $c_{swing}$ is the moles of electrons transferred during the electrical swing, and $E_a$ and $E_c$ are the potentials employed in the anodic and cathodic chambers, respectively.

In certain embodiments, a smaller difference between the applied first electrical potential and the applied second electrical potential (e.g., 0.1 V) results in a higher $\eta$ as compared to a larger difference between the applied first electrical potential and the applied second electrical potential (e.g., 0.6 V).

According to certain embodiments, the $\eta$ may be any of a variety of suitable values. For example, in certain embodiments, $\eta$ may be between or equal to 1% and 80%. For example, in certain embodiments $\eta$ is greater than or equal to 1%, greater than or equal to 5%, greater than or equal to 10%, greater than or equal to 20%, greater than or equal to 30%, greater than or equal to 40%, greater than or equal to 50%, greater than or equal to 60%, or greater than or equal to 70%. According to some embodiments, $\eta$ may be less than or equal to 80%, less than or equal to 70%, less than or equal to 60%, less than or equal to 50%, less than or equal to 40%, less than or equal to 30%, less than or equal to 20%, or less than or equal to 10%, or less than or equal to 5%. Combinations of the above recited ranges are also possible (e.g., $\eta$ is greater than or equal to 30% and less than or equal to 60%).

In some embodiments, the degree of separation ($\psi_f$) of the ETAS multi-stage cyclic batch method is described by the extent of organic species removal $\psi_f = C_{f,out}/C_{f,in}$, where $C_{f,out}$ is the organic species concentration of the feed stream after a certain number of stages, and $C_{f,in}$ is the initial organic species concentration of the feed stream.

In certain embodiments, a larger difference between the applied first electrical potential and the applied second electrical potential (e.g., 0.6 V) results in a higher $\psi_f$ as compared to a smaller difference between the applied first electrical potential and the applied second electrical potential (e.g., 0.1 V).

According to certain embodiments, the overall effectiveness of the ETAS multi-stage cyclic batch method can be determined by the ratio of the volume of the receiving stream to the volume of the feed stream ($\theta$). In certain embodiments, $\theta$ is between or equal to 0.01 and 0.1. For example, in certain embodiments, $\theta$ is greater than or equal to 0.01, greater than or equal to 0.02, or greater than or equal to 0.05. According to some embodiments, $\theta$ is less than or equal to 0.1, less than or equal to 0.05, or less than or equal to 0.02.

In certain embodiments, the systems described herein may comprise additional adsorbents (e.g., a third adsorbent, a fourth adsorbent, etc.). In certain embodiments, such systems that employ additional adsorbents may be used for the large scale purification of water in a continuous or semi-continuous mode.

In some embodiments, the organic species is an uncharged organic species. According to certain embodiments, the organic species may be a pesticide, pharmaceutical compound, a carcinogenic compound, and/or a dye. In certain embodiments, the organic species is Sudan Orange G™ (SOG), which is dye commonly used in the textile industry and one of the primary sources of water contamination worldwide. In some embodiments, the organic species may be 2,4-dichlorophenol (DCP), 2-naphthol (NT), and/or 1-naphthylamine (NA), which are known carcinogenic pollutants, and intermediates for herbicide manufacturing and synthesis of industrial dyes. In certain embodiments, the organic species may be bisphenol A (BA) and/or bisphenol S (BS), which are anthropogenic pollutants that appear to be endocrine disruptors with long-term environmental persistence. In some embodiments, the organic species may be metolachlor (MC), which is considered to be one of the leading pesticides responsible for groundwater contamination. According to certain embodiments, the organic species may be ethinyl estradiol (EE) and/or propranolol hydrochloride (PH), which are widely used pharmaceuticals, with the former being a common contraceptive that has led to the collapse of fish populations, and the latter being a β-blocker for treatment of hypertension. In some embodiments, the organic species may be methyl orange (MO) and/or rhodamine B (RB), which are common industrial dyes identified as municipal water contaminates, particularly in developing countries. According to certain embodiments, the organic species may be a mixture of any of the aforementioned organic species.

According to certain embodiments, the adsorbent may have a adsorption/desorption selectivity factor (α) for a target organic species, defined as:

$$\alpha\ (\%) = \frac{K_d^{target} - K_d^{competitor}}{K_d^{competitor}} \times 100$$

wherein $K_d^{target}$ is the distribution coefficient of the target organic species with respect to the adsorbent and $K_d^{competitor}$ is the of the distribution coefficient of the competitor organic species with respect to the adsorbent. In certain embodiments, a value for α of 100% indicates a high adsorption selectively towards the target organic species, whereas a value for α of 1% indicates a low adsorption selectivity towards the target organic species. According to some embodiments, a value for α of −100% indicates a high desorption selectively towards the target organic species, whereas a value for α of −1% indicates a low desorption selectivity towards the target organic species. In certain embodiments, the $K_d$ of an organic species with respect to the adsorbent may change depending on the first applied electrical potential and/or second applied electrical potential. Accordingly, in some embodiments, the affinity of the ETAS adsorbent towards two competing organics species (e.g., adsorption and/or desorption) can be tuned by electrical means.

In certain embodiments, the adsorbent may be characterized by scanning electron microscopic (SEM) and/or transmission electron microscopic (TEM) imaging. For example, according to certain embodiments, the adsorbent may be characterized by SEM and/or TEM in order to confirm the diameter of the adsorbent components (e.g., the diameter of the CNTs and/or the diameter of the polymer coating). For example, in a non-limiting embodiment, characterization of the adsorbent comprising CNTs coated with the PVF/PPY hybrid polymer coating by TEM revealed a CNT diameter of 50 nm. In another non-limiting embodiment, characterization of the adsorbent comprising CC coated with PVF/PPY revealed the hybrid polymer coating comprised polymeric nanospheres with diameters between 20 nm to 50 nm.

In some embodiments, the adsorbent may be characterized by energy dispersive X-ray spectroscopy (EDS) elemental mapping. For example, in certain embodiments, the adsorbent may be characterized by EDS elemental mapping in order to confirm the existence and distribution of certain elements in the coating (e.g., N and/or Fe).

According to certain embodiments, the adsorbent may be further characterized by cyclic voltammetry (CV) to evaluate the electrical performance stability of the adsorbent. For example, in some cases, the adsorbent may be subjected to a suitable number of oxidizing/reducing cycles (e.g., 100, 200, 300, 400, 500, 1000 cycles) across a suitable potential window (e.g., 0.0 V to 1.0 V). In certain embodiments, the upper-limit and lower-limit of the potential window may correlate to the applied reductive potential and applied oxidative potential, as described above. According to some embodiments, the integrated area of the cyclic voltammograms of the adsorbent may show negligible loss of current (e.g., less than 3%, less than 2%, less than 1%) after the subjection to the suitable number of oxidizing/reducing cycles.

In a non-limiting embodiment, the adsorbent may be subjected to CV scans at a scan rate of 0.1 V/s between 0.0 V and 0.8 V for 300 cycles. In some such embodiments, the adsorbent shows negligible loss of the current signal (<1% decrease in the integrated CV area), indicating good electrical performance stability.

In some embodiments, the coating may exhibit a significantly high conductivity. A coating that is highly conductivity may be useful, in certain embodiments, to permit programmable electrical manipulation instead of mere redox control. In certain embodiments, the coating may have a conductivity of greater than or equal to 1 S/cm, greater than or equal to 10 S/cm, greater than or equal to 20 S/cm, greater than or equal to 30 S/cm, greater than or equal to 40 S/cm, greater than or equal to 50 S/cm, greater than or equal to 75 S/cm, greater than or equal to 100 S/cm, or greater than or equal to 150 S/cm. In certain embodiments, the coating may have a conductivity of less than or equal to 200 S/cm, less than or equal to 150 S/cm, less than or equal to 100 S/cm, less than or equal to 75 S/cm, less than or equal to 50 S/cm, less than or equal to 40 S/cm, less than or equal to 30 S/cm, less than or equal to 20 S/cm, or less than or equal to 10 S/cm. Combinations of the above recited ranges are also possible (e.g., the coating may have a conductivity of greater than or equal to 1 S/cm and less than or equal to 200 S/cm, the coating may have a conductivity of greater than or equal to 10 S/cm and less than or equal to 30 S/cm). In a non-limiting embodiment, the PVF/PPY hybrid coating has a conductivity of between or equal to 17 S/cm to 31 S/cm. According to certain embodiments, the conductivity may be measured by the four-probe method.

According to certain embodiments, the coating may be highly porous. A coating that is highly porous may be useful, in certain embodiments, to sufficiently adsorb an organic species. For example, in some embodiments, the coating may have a Brunauer-Emmett-Teller (BET) surface area of greater than or equal to 10 m$^2$/g, greater than or equal to 20 m$^2$/g, greater than or equal to 50 m$^2$/g, greater than or equal to 100 m$^2$/g, greater than or equal to 150 m$^2$/g, greater than or equal to 200 m$^2$/g, greater than or equal to 250 m$^2$/g, or greater than or equal to 300 m$^2$/g. In certain embodiments, the coating may have a BET surface area of less than or equal to 400 m$^2$/g, less than or equal to 300 m$^2$/g, less than or equal to 250 m²/g, less than or equal to 200 m²/g, less than or equal to 150 m²/g, less than or equal to 100 m²/g, less than or equal to 50 m²/g, or less than or equal to 20 m²/g. Combinations of the above recited ranges are also possible (e.g., the coating may have a BET surface area of greater than or equal to 10 m²/g and less than or equal to 400 m²/g, the coating may have a BET surface area of greater than or equal to 100 m²/g and less than or equal to 200 m²/g). In a non-limiting embodiment, the PVF/PPY hybrid coating on CC has a BET surface area of 168 m²/g. In an additional non-limiting embodiment, the PVF/PPY hybrid coating on CNTs has a BET surface area of 243 m²/g.

In certain embodiments, the feed stream may comprise additional components (e.g., additives). For example, in some embodiments, the feed stream may comprise a salt (e.g., sodium chloride). Additionally, in certain embodiments, the feed stream may be from a source of water such as an ocean, lake, pond, stream, river, or reservoir. The ETAS systems and methods described herein may be used accordingly to purify water from such sources.

The following examples are intended to illustrate certain embodiments of the present invention, but do not exemplify the full scope of the invention.

Example 1

Figure 3A:
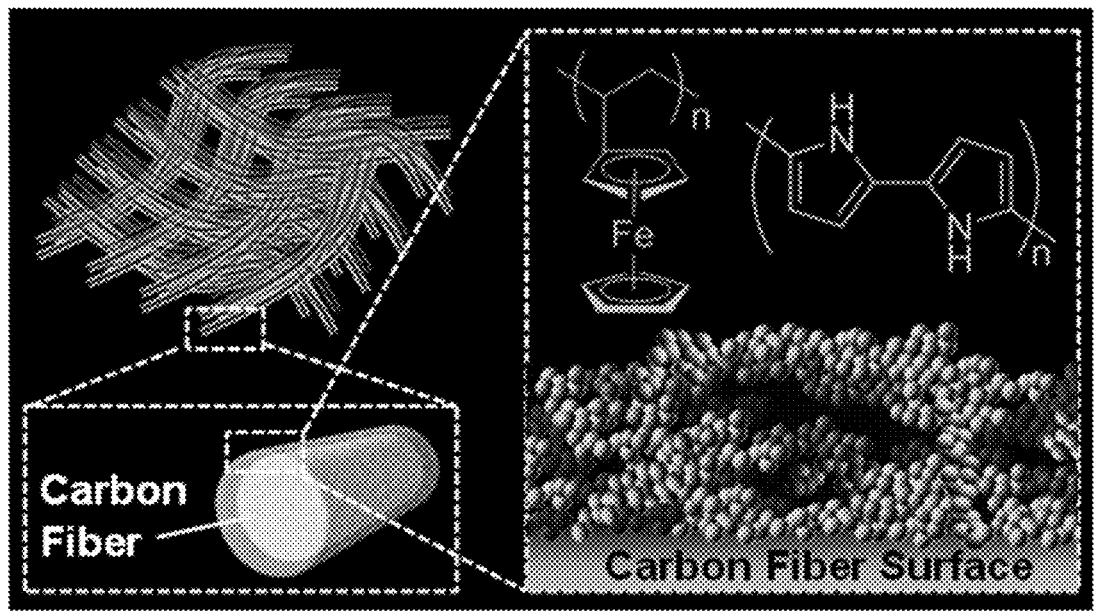
FIG. 3A is a schematic illustration of the ETAS adsorbent comprising a flexible CC substrate coated with a PVF/PPY hybrid coating, according to one set of embodiments.
Figure 3B:
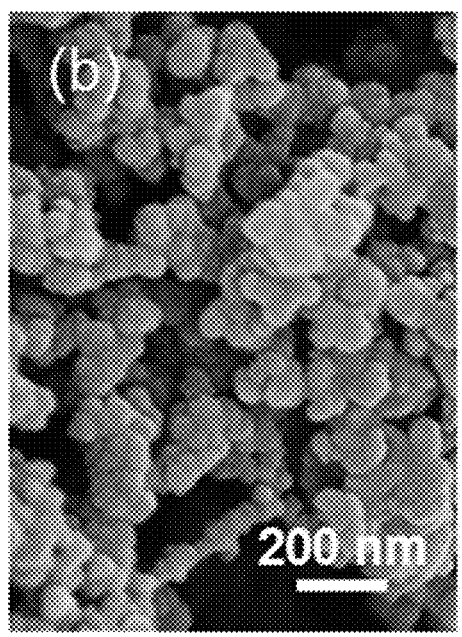
FIG. 3B is an SEM image of a PVF/PPY hybrid coating, according to one set of embodiments.
Figure 3C:
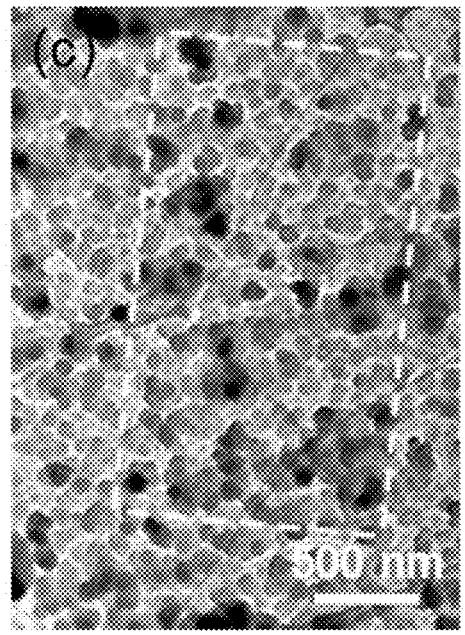
FIG. 3C is a TEM image of a PVF/PPY hybrid coating, according to one set of embodiments.
Figure 3D:
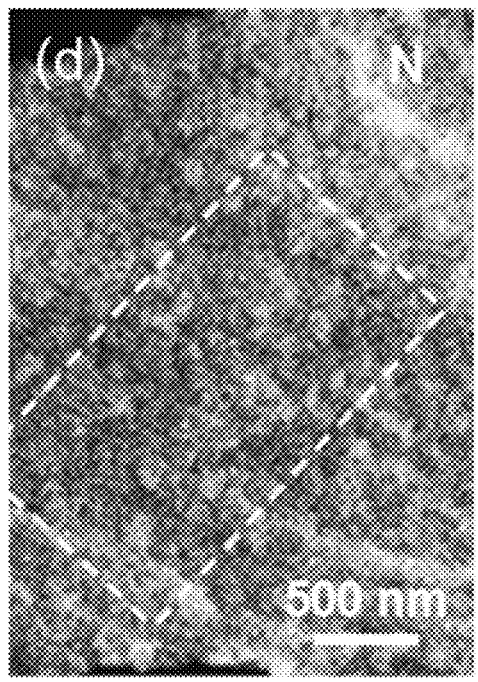
FIG. 3D is an EDS N map of a PVF/PPY hybrid coating, according to one set of embodiments.
Figure 3E:
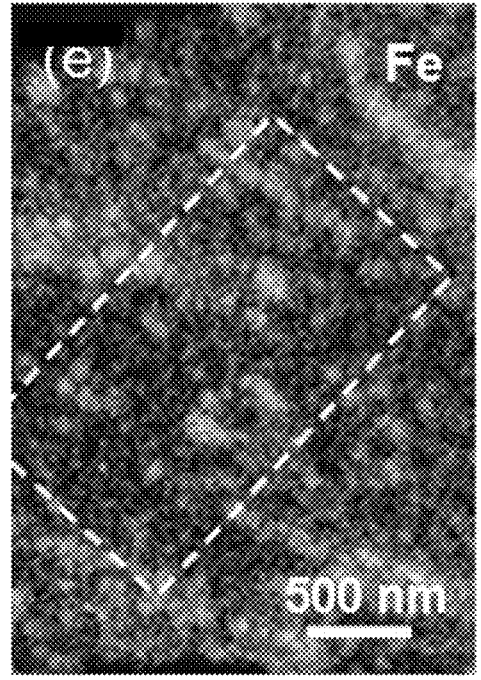
FIG. 3E is an EDS Fe map of a PVF/PPY hybrid coating, according to one set of embodiments.

The following example described the fabrication and functionality of a non-limiting embodiment of an ETAS adsorbent. The design and fabrication of an ETAS adsorbent is nontrivial. The adsorbent may exhibit all the following characteristics: (i) an oxidation-state dependent affinity towards neutral organics, (ii) high porosity for sufficient adsorption capacity, and (iii) high conductivity to permit programmable electrical manipulation instead of merely redox control by chemical species. A carbon cloth (CC) with a conformal hybrid coating of a polyvinylferrocene/polypyrrole (PVF/PPY) was fabricated via simultaneous electropolymerization of pyrrole and electro-deposition of PVF (see FIG. 3A). In the binary polymer film, the ferrocene moieties in PVF rendered redox-tunable hydrophobicity (e.g., the oxidized ferrocene is significantly more hydrophilic than its reduced form), while the conjugated PPY chains established electron transport pathways to permit electrical control. The CC, composed of bendable carbon microfibers, served as a flexible and robust conductive substrate. PVF, a localized state conductor with discrete redox centers, had a low conductivity (~$10^{-7}$ S/cm), while the PVF/PPY hybrid exhibited a significantly higher conductivity (24±7 S/cm) measured by the four-probe method. Scanning electron microscopic (SEM) (see FIG. 3B) and transmission electron microscopic (TEM) (see FIG. 3C) imaging revealed that the PVF/PPY polymer film was comprised of nano-spheres with diameters of around 20 to 50 nm. Energy dispersive X-ray spectroscopic (EDS) elemental mapping of N and Fe (see FIG. 3D and FIG. 3E) indicated the presence, with uniform spatial distribution, of both PPY and PVF in the hybrid polymer coating.

This ETAS adsorbent allows electrochemical control over adsorption of neutral organics: when the applied potential (E) is lower than the formal potential of ferrocene ($E^0$=0.32 V), most ferrocene moieties are reduced, the ETAS adsorbent is hydrophobic, and organics can be captured from water. For E>>$E^0$, most ferrocene moieties are oxidized, and the ETAS adsorbent becomes relatively hydrophilic, releasing neutral organics into a water stripping phase. The ratio (R) between the hydrophilic and hydrophobic moieties (i.e., oxidized and reduced ferrocene) can be tuned precisely by the applied potential according to the Nernst equation, $$E = E^0 - \left(\frac{kT}{e}\right)\ln R,$$

where k is the Boltzmann constant, T the temperature, and e the elementary charge, and thus enabling programmable adjustment of the adsorption affinity for organics.

Figure 18A:
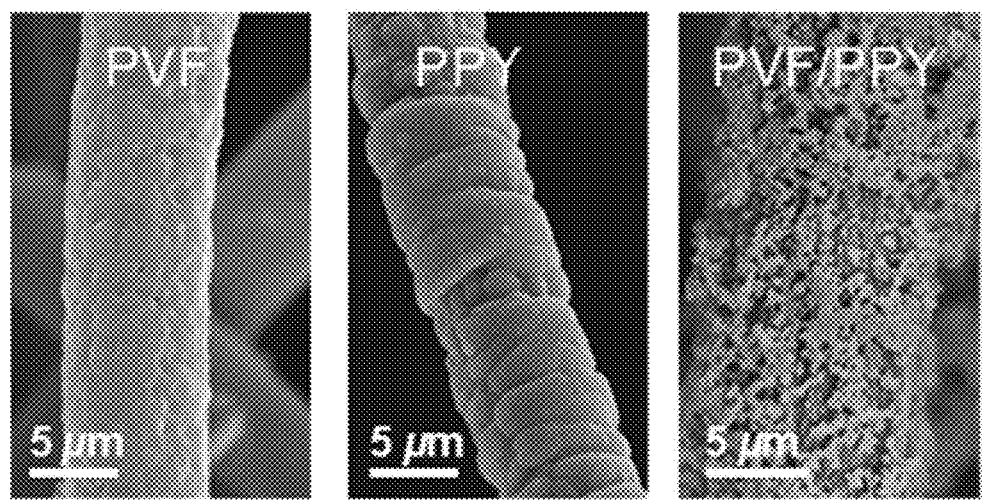
FIG. 18A shows SEM images of a PVF/PPY hybrid coating, PVF, and PPY coated on carbon fibers, according to one set of embodiments.
Figure 18B:
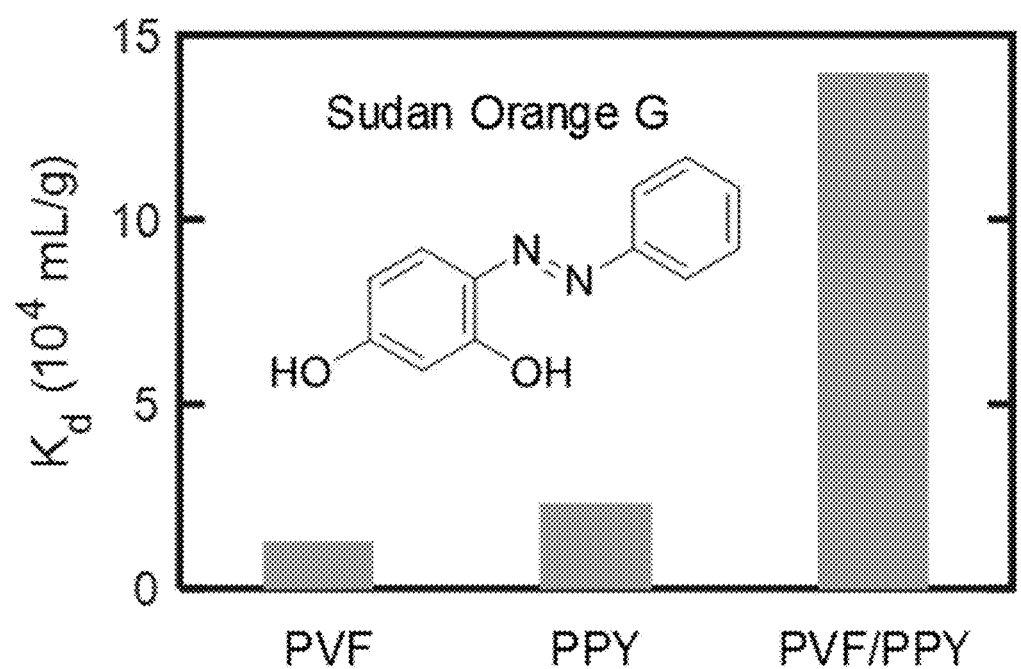
FIG. 18B shows $K_d$ values of PVF, PPY and a PVF/PPY hybrid coating, according to one set of embodiments.

The ETAS separation efficacy was investigated using a model water pollutant, Sudan Orange G™ (SOG), an uncharged organic dye molecule commonly used in the textile industry, which is the primary source of water contamination worldwide. The adsorptive performance of PVF/PPY, PPY alone, and PVF alone was compared for SOG based on the distribution coefficient, defined as $K_d$(mL/g)=$Q_e$/$C_e$, where $Q_e$ (mg/g) and $C_e$ (mg/L) are the mass of adsorbed SOG per unit mass of polymer and the SOG concentration in the liquid phase at equilibrium, respectively. Significantly better adsorptive performance was found with PVF/PPY ($K_d$=1.4×10⁵ mL/g, obtained at $C_e$=2.5 mg/L) than with PVF ($K_d$=1.3×10⁴ mL/g) or PPY ($K_d$=2.3×10⁴ mL/g), due to the more porous structure of the hybrid (see FIGS. 18A-18B). The Brunauer-Emmett-Teller (BET) surface areas of PVF, PPY, and PVF/PPY were 18, 36, 168 m²/g, respectively. The $K_d$ values around 10⁵ mL/g show superb adsorbent performance.

Figure 3F:
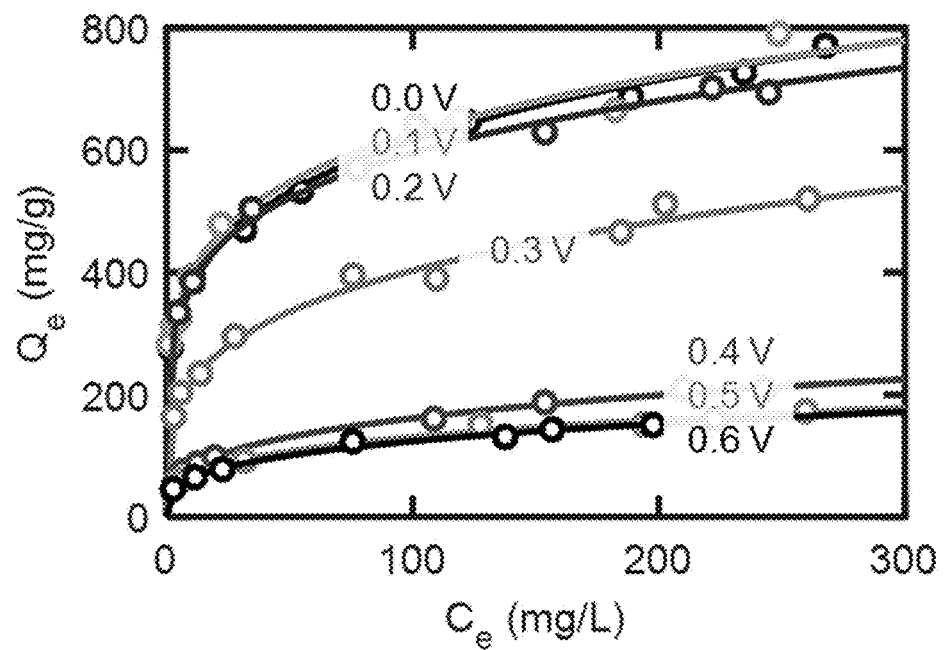
FIG. 3F shows adsorption isotherms of a PVF/PPY hybrid coating at different potentials, according to one set of embodiments, where the open symbol correspond to experimental data and the solid lines correspond to Freundlich fits.
Figure 17:
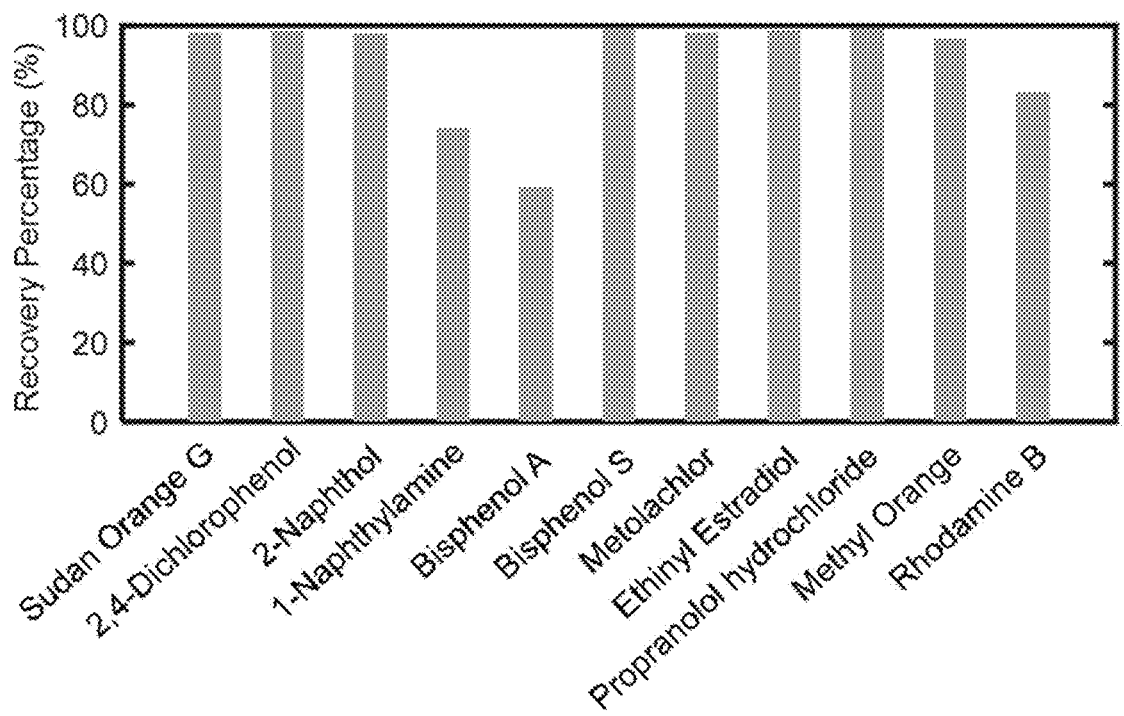
FIG. 17 shows the recovery percentage of organic pollutants tested, according to one set of embodiments.

FIG. 3F shows that the adsorption isotherm (i.e., $Q_e$ versus $C_e$) of PVF/PPY for SOG could be adjusted systematically through application of different electrochemical potentials. When the applied potential increased from 0 to 0.6 V (all potentials are referenced to Ag/AgCl), the adsorption capacity of PVF/PPY decreased monotonically. The adsorbent became increasingly hydrophilic at higher potentials at which more ferrocene moieties were oxidized. Such electrochemical tunability of the adsorption behavior is important for regeneration of the adsorbent without the use of solvent stripping, and permits cyclic operation of the ETAS-based separation process. Cyclic voltammetric (CV) scans at 0.1 V/s between 0.0 and 0.8 V showed that PVF/PPY could be oxidized and reduced for 300 cycles with negligible loss of the current signal (<1% decrease in the integrated CV area), indicating good electrochemical stability of the hybrid during the cyclic operation. Control experiments show that application of an oxidative potential (0.6 V) did not result in degradation of SOG (see FIG. 17).

Example 2

Figure 4B:
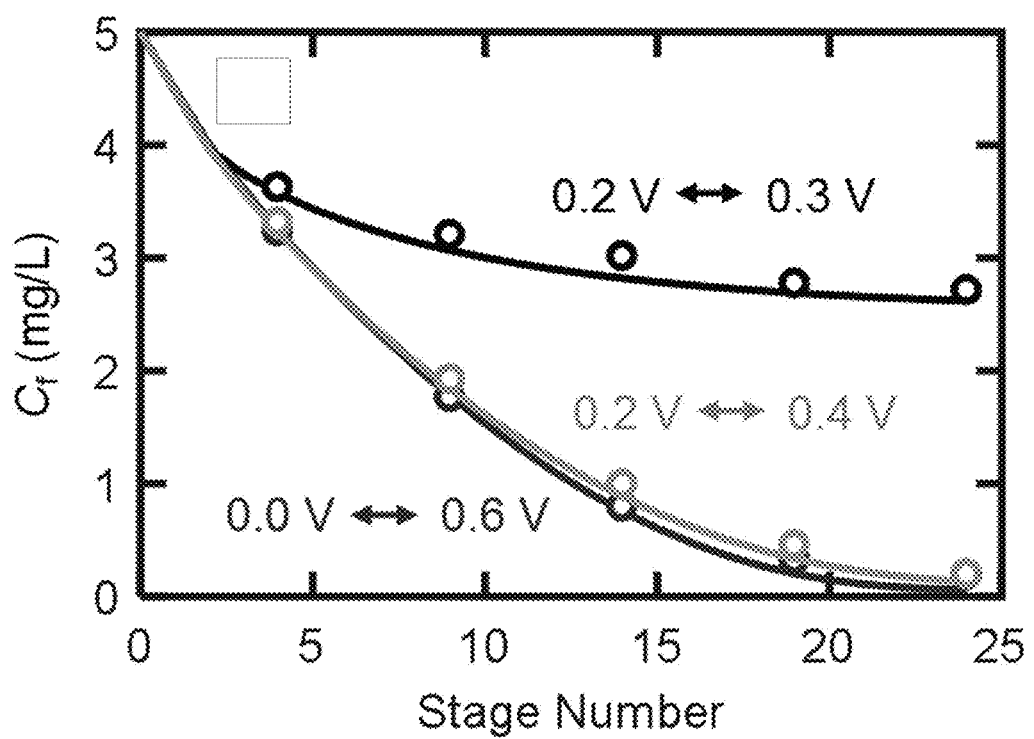
FIG. 4B is a plot showing the concentration $C_f$ of an organic species, 2,4-Dihydroxyazobenzene (Sudan Orange G™ (SOG)), in a feed stream a number of stages, according to one set of embodiments.
Figure 4C:
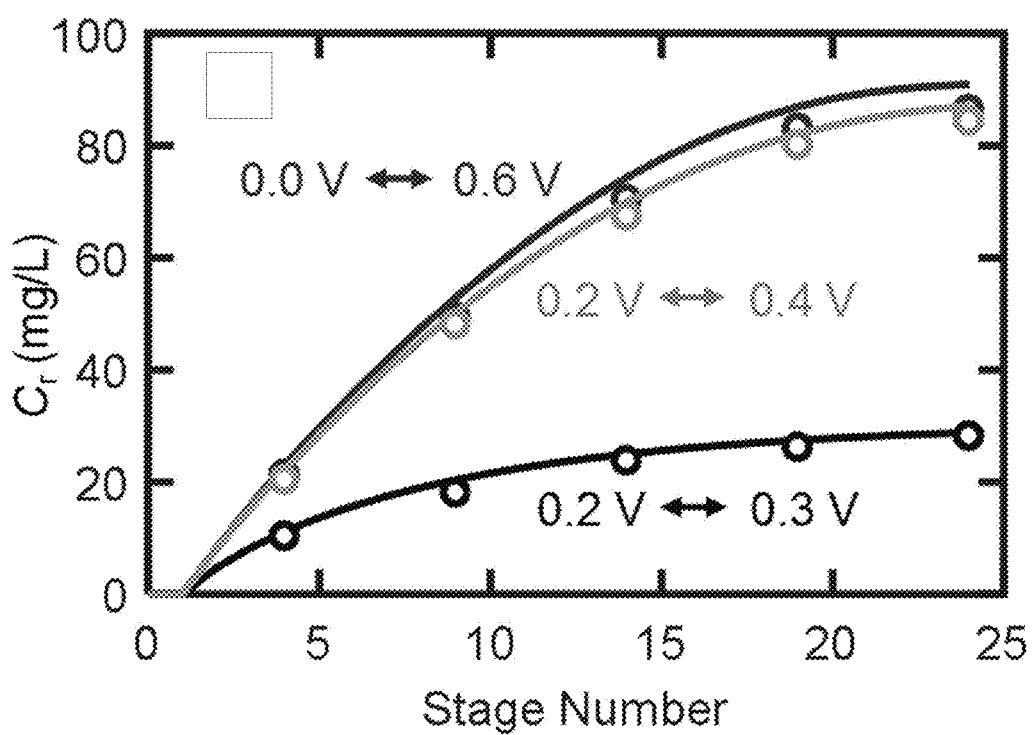
FIG. 4C is a plot showing the concentration $C_r$ of an organic species, 2,4-Dihydroxyazobenzene (Sudan Orange G™ (SOG)), in an receiving stream a number of stages, according to one set of embodiments.

The following example described the multi-stage cyclic operation batch process of an ETAS adsorbent system (see FIG. 4A). The organic species SOG was removed gradually from a 100 mL feed stream with an initial SOG concentration of 5 mg/L and transferred to a 5 mL receiving stream (e.g., water with no SOG initially). The mass of PVF/PPY on each electrode was 0.12 mg. Two PVF/PPY adsorbents were subjected to alternating oxidation-reduction cycles: at stage 1, the first adsorbent was reduced and the second adsorbent was oxidized, and at stage 2, the polarity of the two adsorbents was reversed. Such a cyclic operation was repeated until stage 24, permitting gradual transfer of SOG from the feed stream to the receiving stream. The feed stream was successively contacted with the reduced adsorbent (e.g., the first adsorbent at stage 1, 3, 5 . . . 23; the second adsorbent at stage 2, 4, 6 . . . 24), whereas the receiving stream was successively contacted with the oxidized adsorbent (i.e., the second adsorbent at stage 1, 3, 5 . . . 23; the first adsorbent at stage 2, 4, 6 . . . 24). FIGS. 4B and 4C show the SOG concentrations in the feed stream and receiving stream ($C_f$ and $C_r$, respectively), versus the number of stages, using three different potential pairs of a reductive potential to increase the hydrophobicity of PVF/PPY for capturing SOG and an oxidative potential to decrease the hydrophobicity of PVF/PPY for releasing SOG. The directly measured experimental data (open symbols) agreed with the calculated results (solid lines) obtained by numerical solution of the coupled Freundlich isotherms obtained at the paired potentials. This agreement indicates that the ability of ETAS to transfer the pollutant from the feed stream to the receiving stream was the result of the potential-modulated affinity tuning. The net effect of the ETAS cyclic operation was the transfer of SOG from a dilute solution to a concentrated solution. Such a process is not a thermodynamically spontaneous process, and requires additional electrochemical work, which is related to the choice of the potential pair. At any given stage, a larger difference in the potential pair (0.0 V-0.6 V or 0.2 V-0.4 V) yielded lower $C_f$ and higher $C_r$ than did a smaller difference (0.2 V-0.3 V). This indicates that a larger potential difference was more effective in removing SOG from the feed stream and concentrating it in the receiving stream.

Example 3

The following example describes the energetic analysis of a non-limiting embodiment of an ETAS adsorbent system. A quantitative study was made on the effects of potential pairing and operating conditions on the energetic costs of ETAS. The overall separation process has two in-streams (feed-in: rich in SOG; receiving-in: pure water) and two out-streams (feed-out: lean in SOG; receiving-out: rich in SOG). The energetic efficiency ($\eta$) for this ETAS separation process is defined as the minimum work (i.e., thermodynamically reversible work, $W_{rev}$) needed to achieve a given change between the out-streams and the in-streams, divided by the actual energy consumed in the ETAS process (i.e., electrochemical work, $W_{ec}$):

$$\eta = W_{rev}/W_{ec},$$

$$W_{rev} = RT \sum_i v_i n_i [y_i \ln y_i + (1-y_i)\ln(1-y_i)],$$

$$W_{ec} = F \sum_{j=1}^{N} [c_{swing,j}(E_{a,j} - E_{c,j})],$$

where R is the ideal gas constant, T is the solution temperature, i represents each of the in-streams and out-streams, v is 1 for out-streams and −1 for in-streams, n is the total moles in each stream, y is the molar fraction of the pollutant, F is the Faraday constant, j represents the stage number, N is the total number of stages, $c_{swing}$ is the moles of electrons transferred during the electrical swing, and $E_a$ and $E_c$ are the potentials employed in the anodic and cathodic chambers, respectively. The values of all physical parameters in the energy calculations are listed in Table 1.

TABLE 1

Values of physical parameters used in the calculations of energetic efficiencies.

| Description | Value |
|---|---|
| Temperature (T) | 298 K |
| ideal gas constant (R) | 8.314 J/(K mol) |
| Faraday's constant (F) | 96485 C/mol |
| density of water | 1000 g/L |
| molecular weight of water | 18 g/mol |
| molecular weight of SOG | 214 g/mol |
| isotherm parameters ($K_F$, $b_F$) of the PVF/PPY system at the following potentials: | ($K_F$, $b_F$) |
| 0 V | (231, 4.67) |
| 0.1 V | (253, 5.07) |
| 0.2 V | (247, 5.21) |
| 0.3 V | (122, 3.80) |
| 0.4 V | (40.7, 3.31) |
| 0.5 V | (35.3, 3.59) |
| 0.6 V | (31.2, 3.34) |
| the number of electrons transferred per unit mass of PVF/PPY during the anode-cathode switching with the following potential pairs: | |
| 0.0 V/0.6 V | 1.61 mmol/g |
| 0.2 V/0.4 V | 0.82 mmol/g |
| 0.2 V/0.3 V | 0.23 mmol/g |
| isotherm parameters ($K_F$, $b_F$) of the PVF/PPY system at the following potentials: | ($K_F$, $b_F$) |
| 0.2 V | (487, 6.72) |
| 0.25 V | (357, 5.83) |
| 0.3 V | (271, 5.32) |
| 0.35 V | (152, 5.31) |
| 0.4 V | (123, 5.43) |
| the number of electrons transferred per unit mass of PVF/PPY/CNT during the anode-cathode switching with the following potential pairs: | |
| 0.2 V/0.25 V | 0.41 mmol/g |
| 0.2 V/0.3 V | 0.73 mmol/g |
| 0.2 V/0.35 V | 1.04 mmol/g |
| 0.2 V/0.4 V | 1.40 mmol/g |
| 0.25 V/0.3 V | 0.31 mmol/g |
| 0.25 V/0.35 V | 0.64 mmol/g |
| 0.25 V/0.4 V | 0.98 mmol/g |
| 0.3 V/0.35 V | 0.34 mmol/g |
| 0.3 V/0.4 V | 0.65 mmol/g |

Figure 4D:
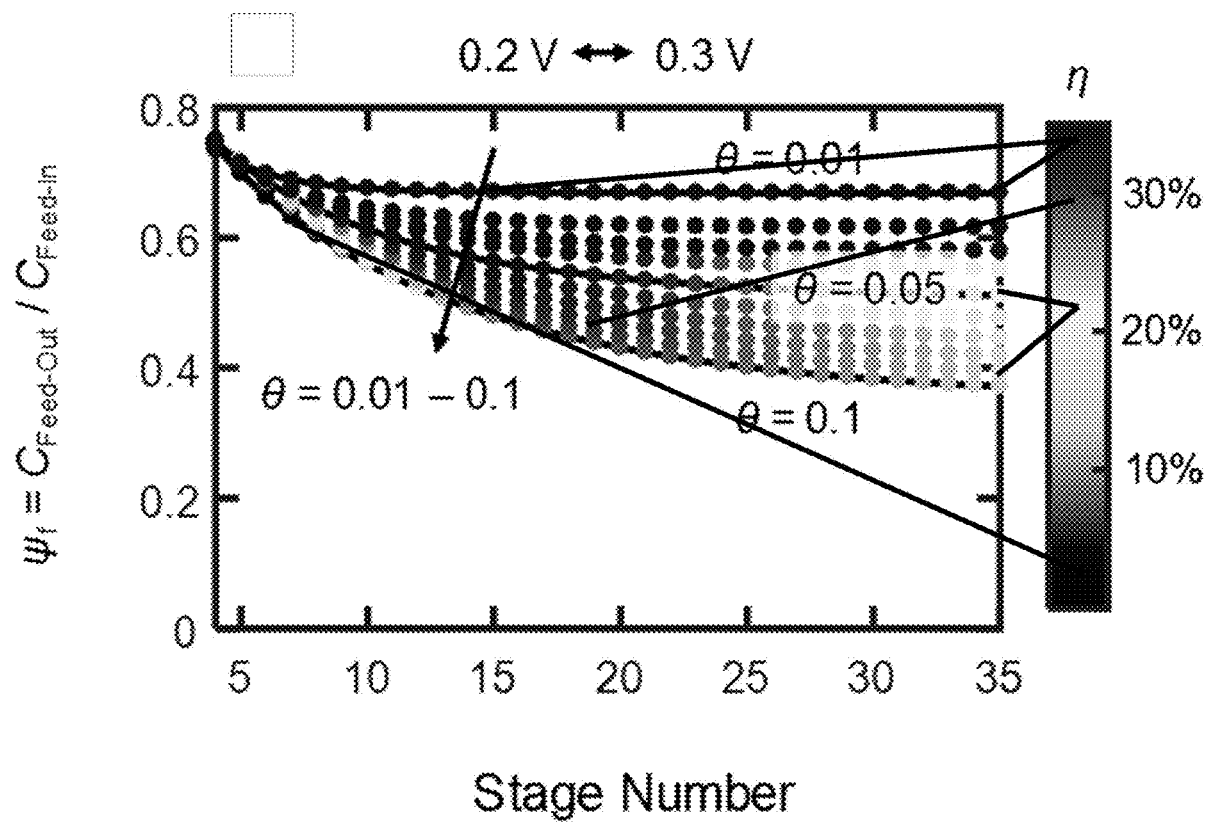
FIG. 4D-4F is a $\psi_f$-$\theta$-$\eta$ chart of a PVF/PPY hybrid coating for a selected potential pair of 0.2 V-0.3 V, according to one set of embodiments.
Figure 4E:
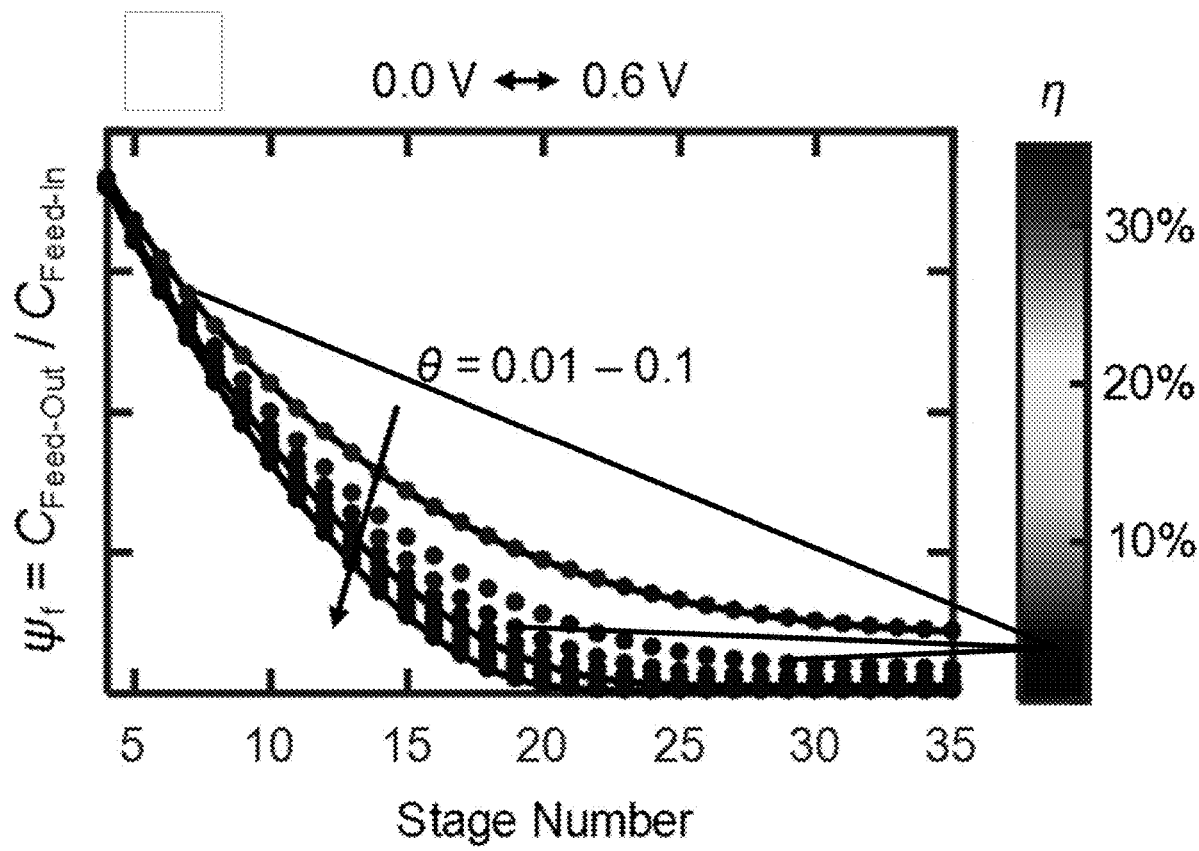
Figure 4F:
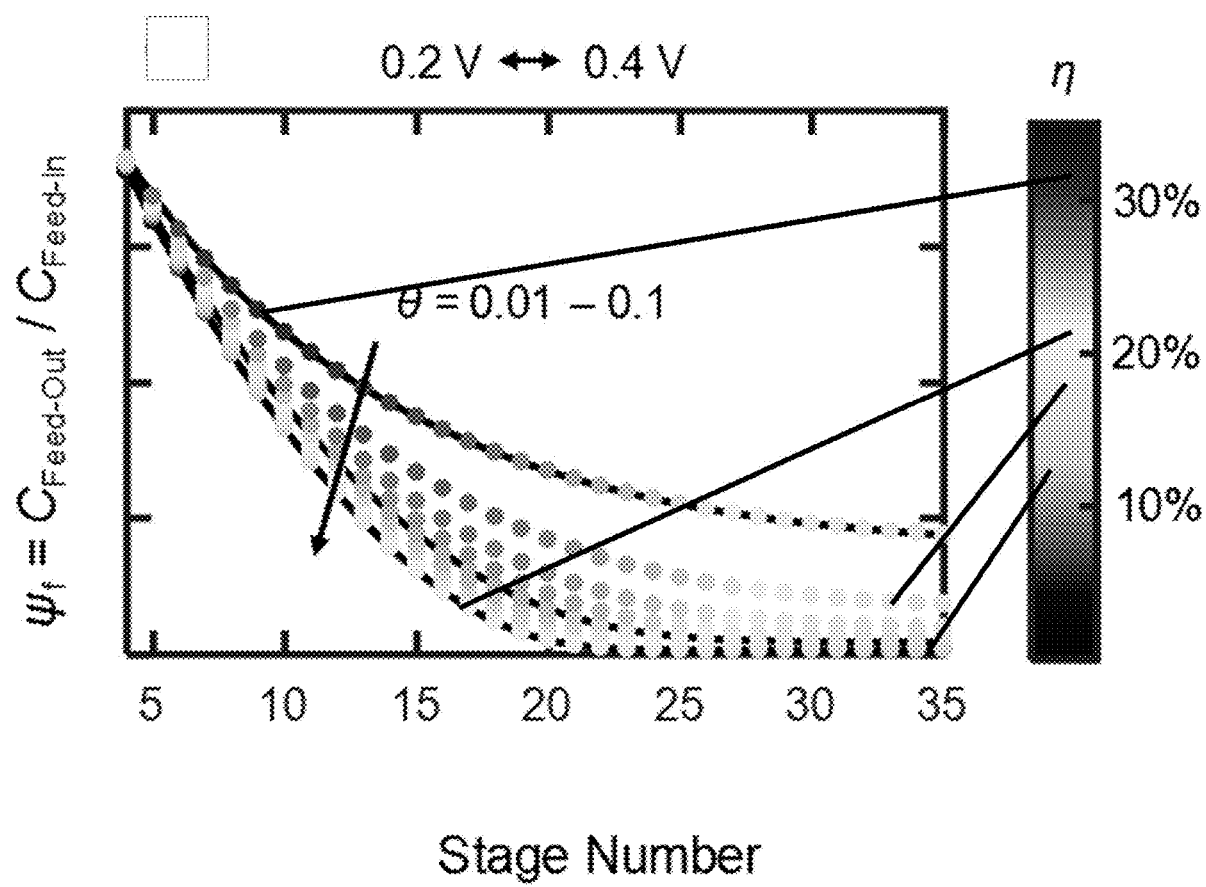

The energetic efficiencies should be compared at the same degree of separation and under identical operating conditions. The degree of separation is described by the extent of pollutant removal $\psi_f = C_{f,out}/C_{f,in}$, where $C_{f,out}$ is the SOG concentration of the feed stream after a certain number of stages, and $C_{f,in}$ is the initial SOG concentration of the feed stream. The ratio of the receiving stream and feed stream volumes, $\theta$, is an important parameter determining the overall effectiveness of the separation process; in practice this ratio can be easily tuned and usually needs to be specified to achieve a desired degree of pollutant enrichment in the receiving stream. The $\psi_f$-$\theta$-$\eta$ chart (see FIGS. 4D-4F) is introduced as the key metric for quantitative assessment of ETAS performance in terms of the coupled energetic efficiency and separation degree. To compare ETAS performance using different potential pairs, for each chart, the same range of $\theta$ values (from 0.01 to 0.1) and the same number of stages (up to 35) are employed. For a given range of stage numbers and $\theta$, it is desired to have a small $\psi_f$ and a large $\eta$ simultaneously. On comparison of FIGS. 4D-4F, it is evident that a smaller difference in the paired potentials yielded a higher energetic efficiency. However, the 0.2 V-0.3 V pair had a lower degree of separation than did the 0.2 V-0.4 V and 0.0 V-0.6 V pairs, while the 0.2 V-0.4 V pair yielded the best performance among the three cases in terms of the optimal combination of energetic efficiency and separation degree; even though the 0.0 V-0.6 V pair had essentially the same separation performance as the 0.2 V-0.4 V pair, the larger potential swing led to a higher energetic penalty. Based on the $\psi_f$-θ-η chart, it is also apparent that with a lower feed to receiving ratio (i.e., a smaller θ), a higher energy efficiency is obtained, but more stages are required to reach a given separation extent.

Example 4

Figure 5A:
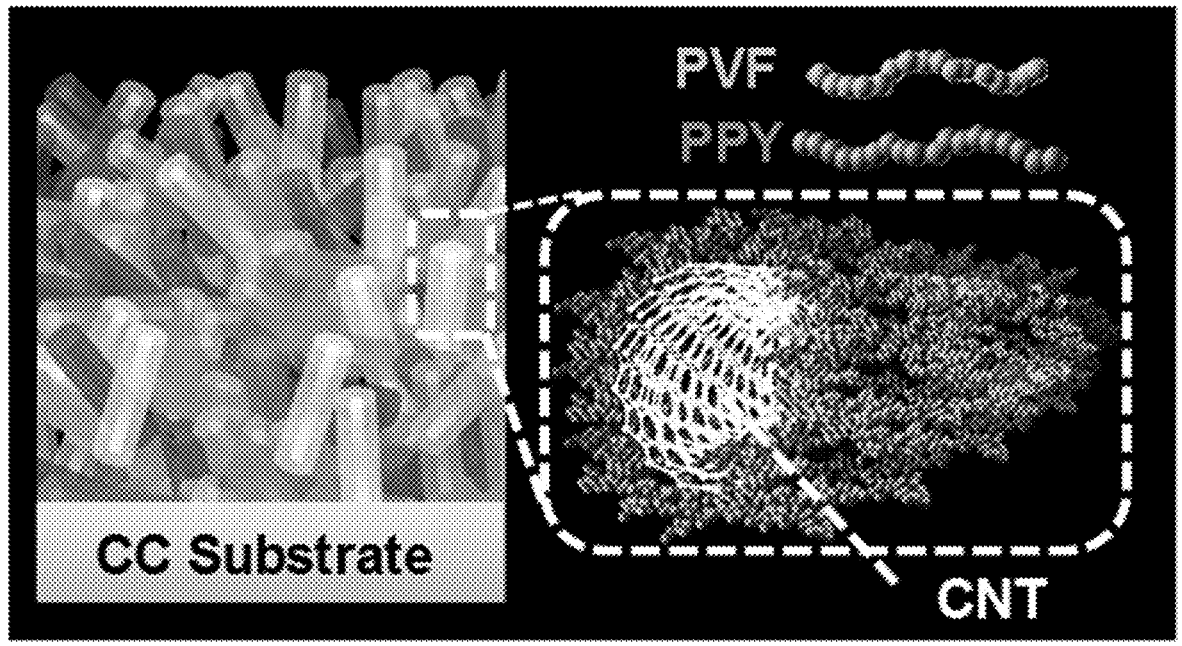
FIG. 5A is a schematic illustration of a core-shell nanostructure comprising PVF/PPY/CNT deposited on a CC substrate; according to one set of embodiments.
Figure 5B:
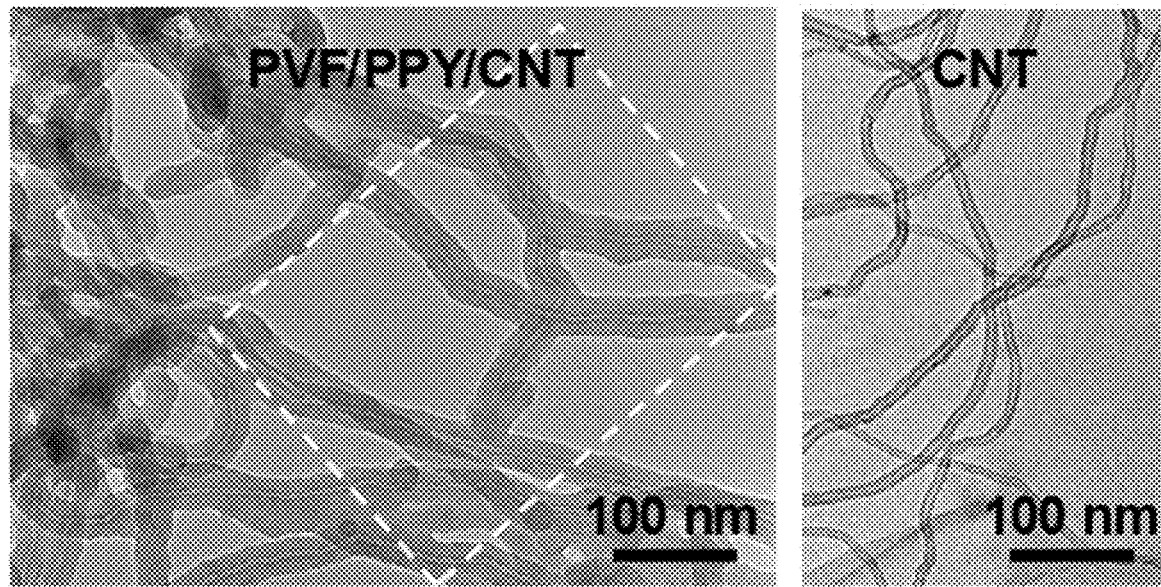
FIG. 5B shows TEM images of PVF/PPY/CNT (left) compared to pristine CNT (right), according to one set of embodiments.
Figure 5C:
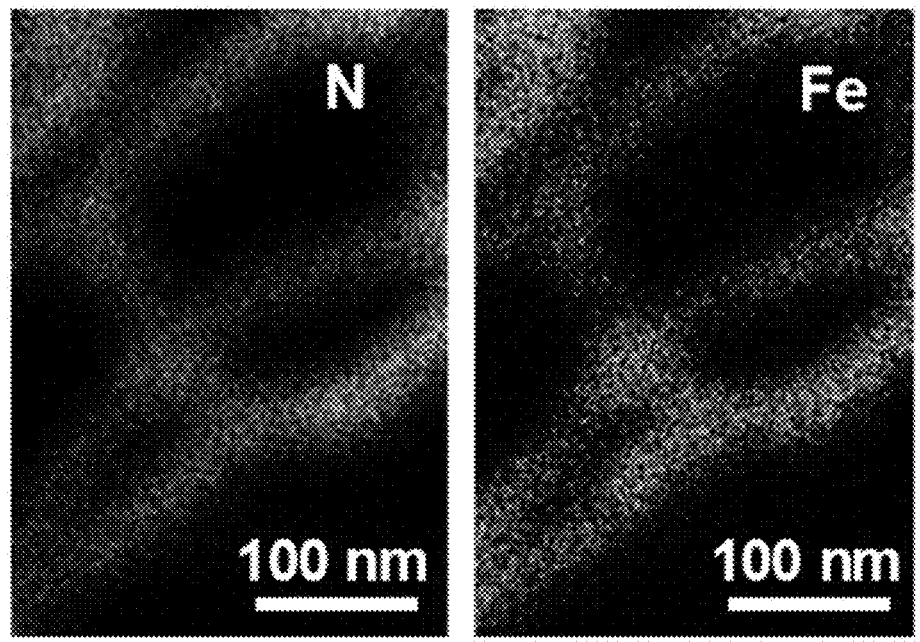
FIG. 5C shows EDS elemental mapping of N (left) and Fe (right) for PVF/PPY/CNT for the area in FIG. 5B indicated by the dashed rectangle, according to one set of embodiments.
Figure 5D:
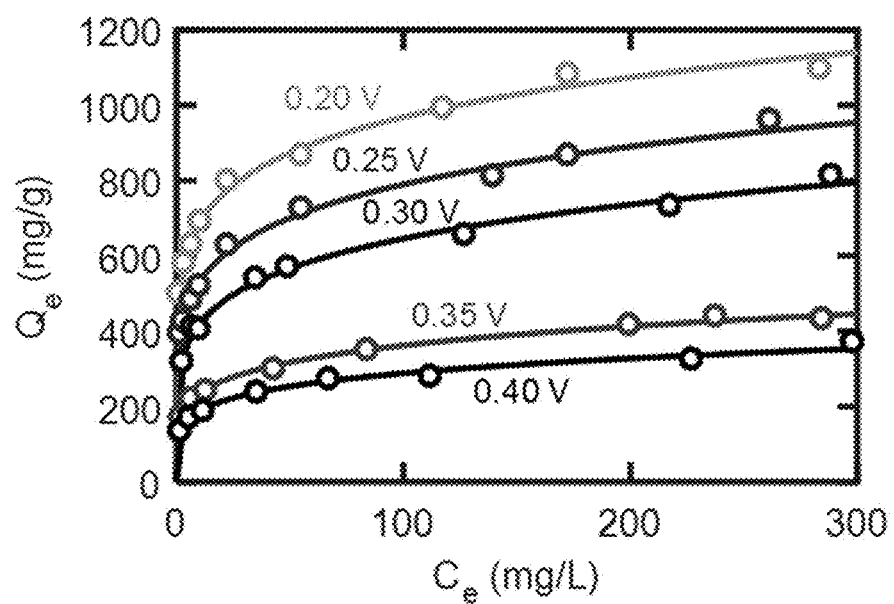
FIG. 5D shows adsorption isotherms of PVF/PPY/CNT obtained at different potentials from 0.2 to 0.4 V, according to one set of embodiments.
Figure 5E:
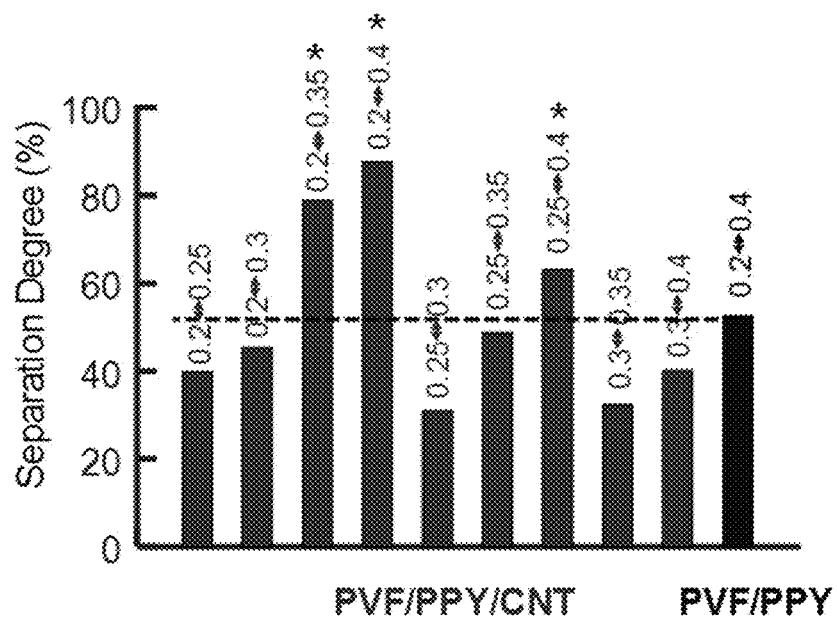
FIG. 5E is a comparison of separation degree ($=1-\psi_f$) between PVF/PPY/CNT and PVF/PPY for selected potential pairs at $\theta=0.01$ with the number of stages=10, according to one set of embodiments.
Figure 5F:
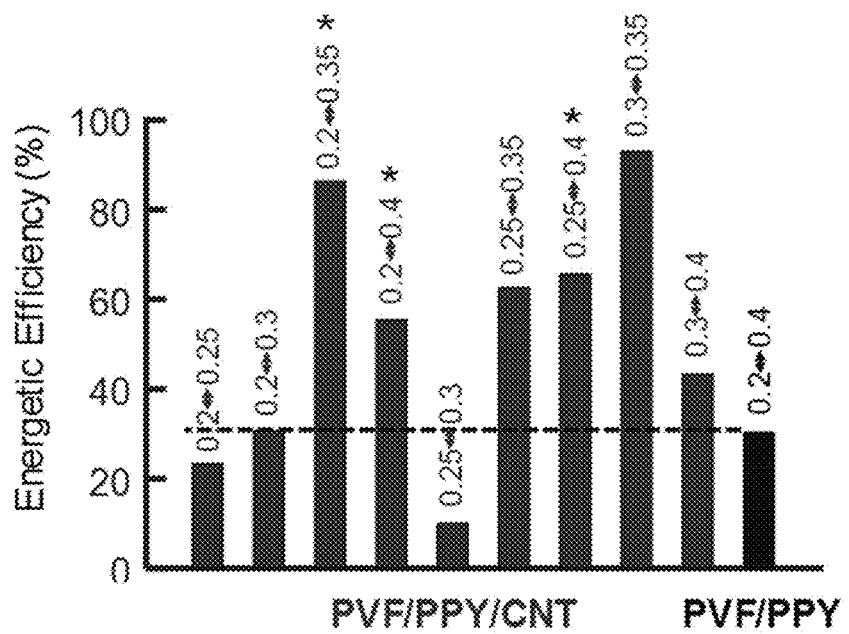
FIG. 5F is a comparison of energetic efficiency ($\eta$) between PVF/PPY/CNT and PVF/PPY for selected potential pairs at $\theta=0.01$ with the number of stages=10, according to one set of embodiments.
Figure 19:
FIG. 19 shows a high-resolution transmission electron microscopic (HRTEM) image of pristine multi-walled carbon nanotubes prior to modification by PVF/PPY, according to one set of embodiments.
Figure 20:
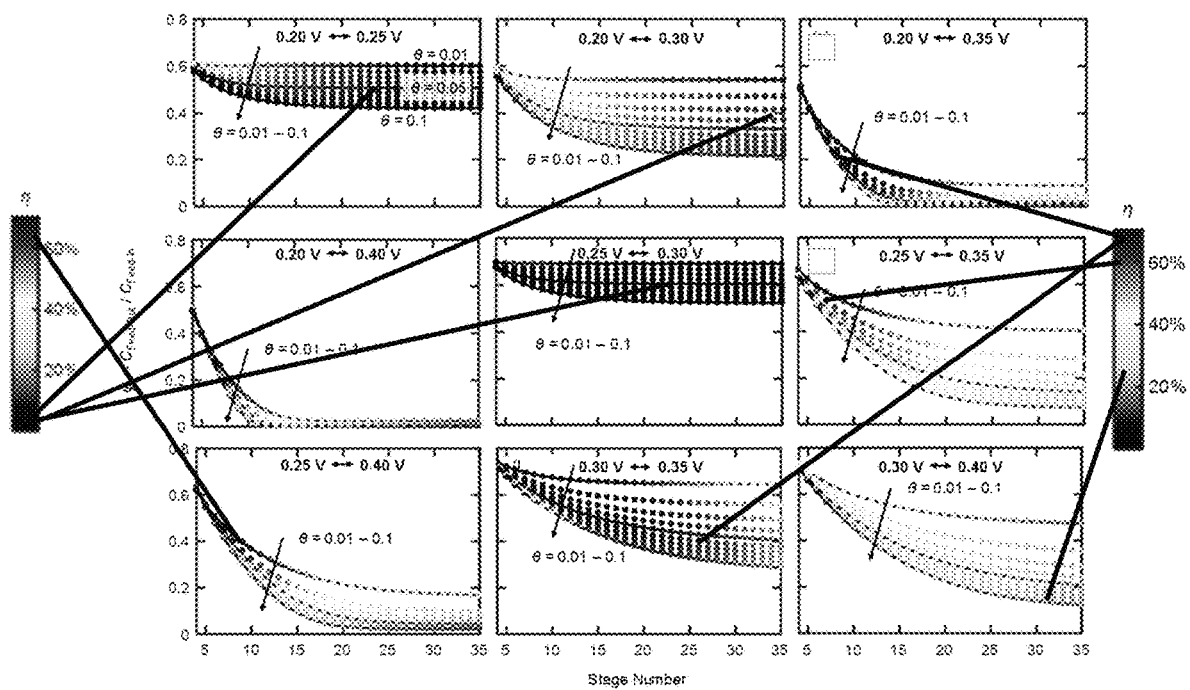
FIG. 20 shows $\psi_r$-$\theta$-$\eta$ charts of PVF/PPY/CNT for the a range of potential pairs, according to one set of embodiments.

This example describes the fabrication and functionality of an alternate non-limiting embodiment of an ETAS adsorbent. The separation effectiveness and the energetic efficiency of an ETAS process were improved simultaneously through a generalizable materials design approach in which a ternary heterogeneous nanostructure consisted of a metallic π-electron-rich CNT core and a binary polymer shell with redox-tunable hydrophobicity. Such a core-shell nanostructure allows for the use of a smaller potential difference to create a larger difference in the adsorption capacity between the reduced and oxidized states. The model ternary nanostructure was developed (see FIG. 5A), and comprised a metallic carbon nanotube (CNT) core with a conformal coating of PVF/PPY (denoted PVF/PPY/CNT), formed by the non-covalent π-stacking interaction between the three components. To construct the ETAS adsorbent, PVF/PPY/CNT were immobilized on a CC substrate by electrochemical deposition. TEM imaging (see FIG. 5B) shows that PVF/PPY/CNT exhibited a larger average tube diameter (~50 nm) than that of the unmodified CNT (tube diameter: ~10-15 nm, wall thickness: ~2-4 nm (see FIG. 19). These TEM analyses suggested a conformal polymer coating existed around the nanotubes in the ternary hybrid. EDS elemental mapping of N and Fe (see FIG. 5C) further confirmed that this polymer coating consisted of PPY and PVF. The adsorption isotherm of PVF/PPY/CNT for SOG shows a pronounced dependence on the applied potential (see FIG. 5D). FIGS. 5E-5F show the separation degree (=1−$\psi_f$) and energetic efficiency (η), respectively, of PVF/PPY/CNT for selected potential pairs at θ=0.01 with the number of stages=10. The complete $\psi_f$-θ-η charts of PVF/PPY/CNT are shown in FIG. 20. It is evident that for PVF/PPY/CNT, among the different potential pairs, 0.2 V-0.35 V rendered the best performance that yields both a high separation degree and a high energetic efficiency. Compared to the best-performing case with PVF/PPY operating under 0.2 V-0.4 V, PVF/PPY/CNT operating under 0.2 V-0.35 V, 0.2 V-0.4 V, and 0.25-0.4 V (marked with * in FIGS. 5E-5F) exhibited simultaneously enhanced separation degree and energetic efficiency.

Figure 5G:
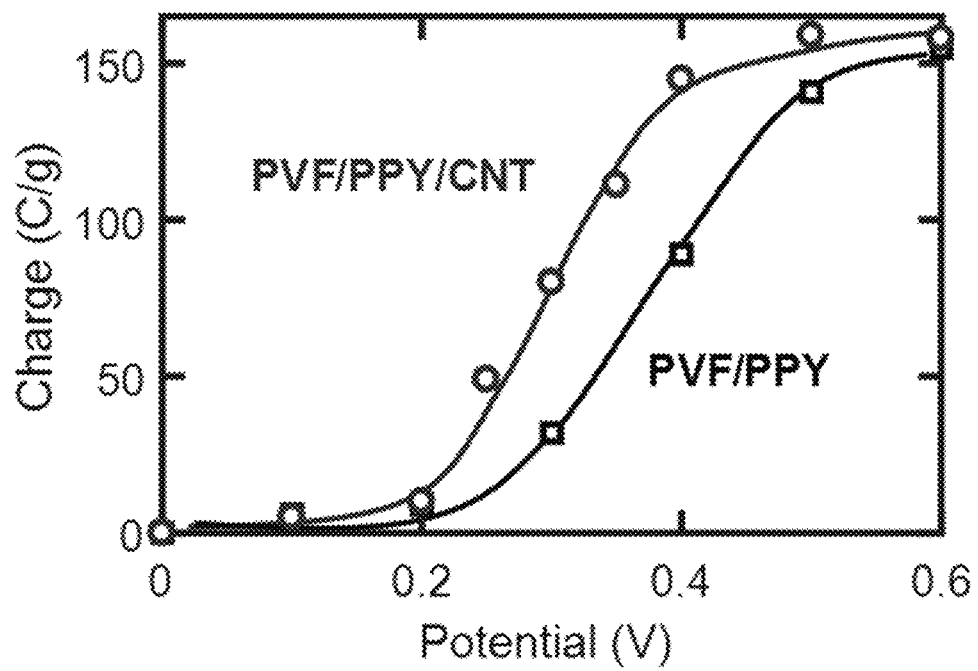
FIG. 5G is a plot of charge versus the applied potential for the PVF/PPY hybrid coating and PVF/PPY/CNT, according to one set of embodiments.
Figure 5H:
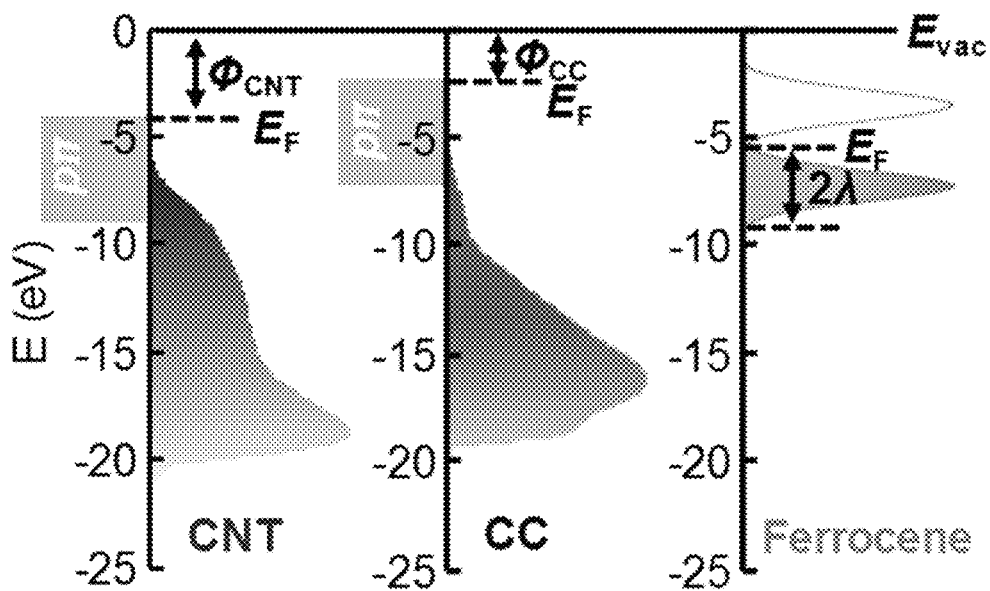
FIG. 5H is an energy diagram for CNT, CC, and ferrocene, according to one set of embodiments.
Figure 5I:
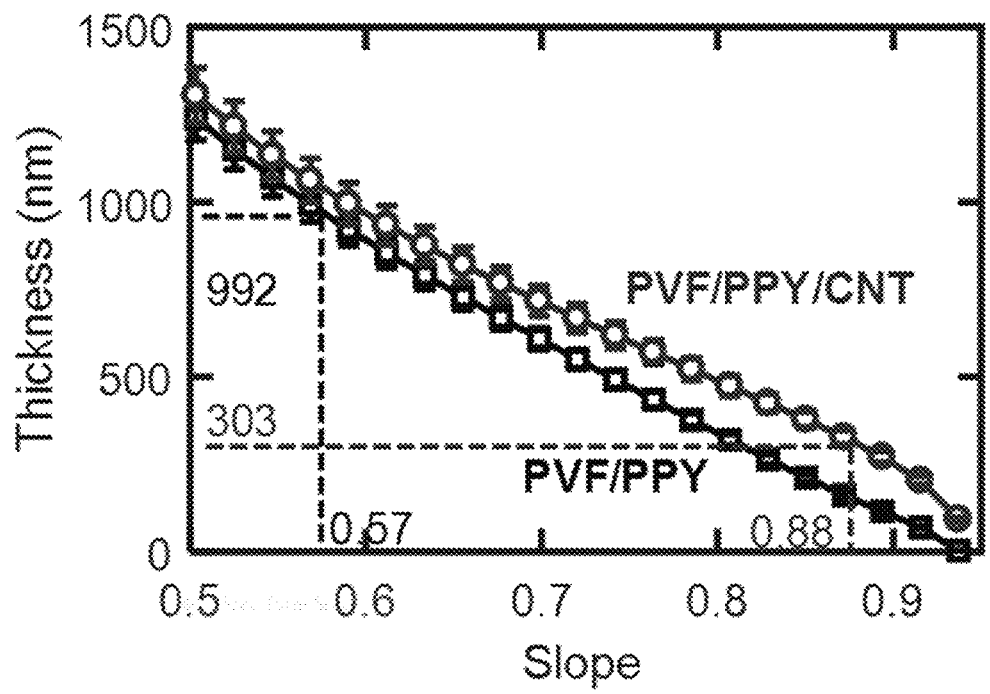
FIG. 5I shows the relationship between the polymer film thickness and the SW value, according to one set of embodiments.
Figure 21:
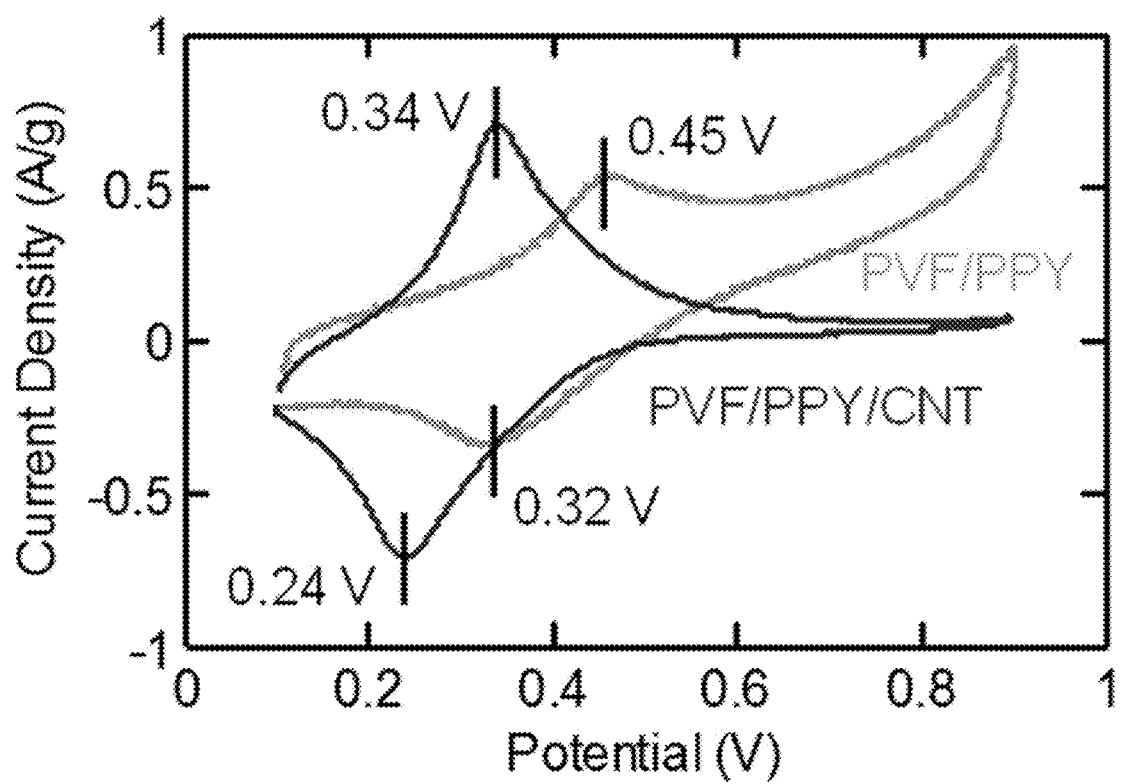
FIG. 21 shows cyclic voltammetric profiles of a PVF/PPY hybrid coating and PVF/PPY/CNT, according to one set of embodiments.
Figure 22:
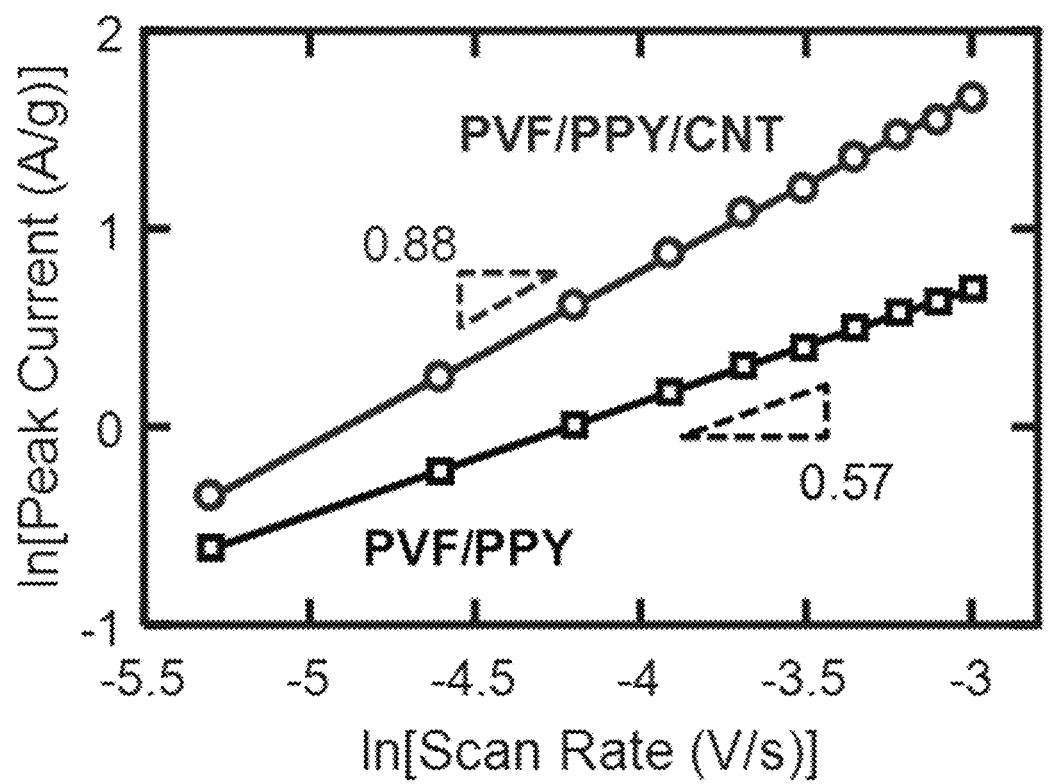
FIG. 22 shows a logarithm of the CV peak current versus logarithm of the scan rate, according to one set of embodiments.
Figure 23:
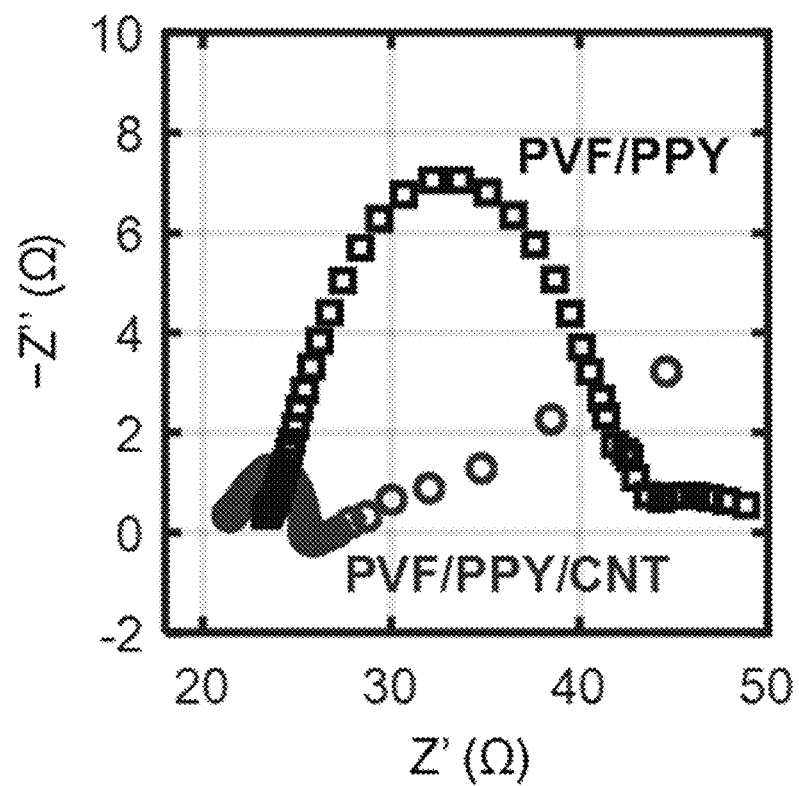
FIG. 23 shows the electrochemical impedance spectra (EIS) for a PVF/PPY hybrid coating and PVF/PPY/CNT, according to one set of embodiments.

The better ETAS performance with PVF/PPY/CNT than with PVF/PPY could be due to the following reasons. First, compared to PVF/PPY, PVF/PPY/CNT had higher adsorption capacities mainly due to its larger BET surface area (243 m$^2$/g) than that of PVF/PPY (168 m$^2$/g). The enhanced adsorption capabilities enabled a higher degree of separation during ETAS operation. Second, incorporation of a conductive CNT core affected the electrochemical behavior of the molecule with redox-tunable hydrophobicity (e.g., ferrocene), resulting in enhanced energetic efficiencies. The relationship between the charge passed upon oxidation from 0 V to the applied potential (see FIG. 5G) shows that ferrocene moieties were oxidized at lower potentials in PVF/PPY/CNT than in PVF/PPY. CV measurements (see FIG. 21) also confirmed a lower ensemble-averaged E$^0$ of ferrocene in PVF/PPY/CNT (0.29 V) than in PVF/PPY (0.39 V). These results show that compared to PVF/PPY, PVF/PPY/CNT could be used with lower potentials to achieve the same extent of increase in hydrophilicity, yielding higher energetic efficiencies. With a uniform spatial distribution of ferrocene sites throughout the polymer film (as evidenced by EDS), a thicker film led to a larger population of ferrocene moieties that were either buried more deeply in an organic PPY environment or were located farther away from the conductive surfaces (either CC or CNT); hence a thicker polymer film results in a higher ensemble-averaged E$^0$ value. The thickness of a polymer film with uniformly distributed redox centers can be inferred from the slope ($S_{iv}$) of a ln(CV peak current)-ln(scan rate) plot obtained with a redox polymer electrode (RPE) model to simulate current responses. PVF/PPY/CNT had a larger $S_{iv}$ value (0.88) than did PVF/PPY (0.57) (see FIG. 22), indicating that the former had a more surface-limiting charge transport behavior and thus a thinner polymer film. The RPE simulation requires a knowledge of the heterogeneous electron transfer kinetics at the polymer/electrode interface. As illustrated by the energy diagram (see FIG. 5H), CNT had a larger valence band density of states (DOS) near the Fermi level ($E_F$) compared to CC (pπ states, 0 eV-5 eV downward from $E_F$, measured by ultraviolet photoelectron spectroscopy). This larger DOS shows that CNT could support faster electron transfer kinetics than CC. Gerischer-Marcus theoretical calculations using the valence band DOS show that the use of CNT instead of CC as the electrode surface yielded a 5.4-fold increase in the standard electron transfer rate constant ($k^0_{ET}$). Incorporation of this difference in $k^0_{ET}$ into the RPE simulation produced the $S_{iv}$ versus thickness relation (see FIG. 5I), from which it can be estimated that PVF/PPY/CNT had a smaller average film thickness (303±16 nm) than PVF/PPY (992±48 nm). Additionally, electrochemical impedance spectroscopic measurements (see FIG. 23) show that compared to PVF/PPY, PVF/PPY/CNT has smaller charge-transfer resistance and solution resistance, showing that the presence of conductive, nanosized CNTs may facilitate both electron transport and ion diffusion in the ternary hybrid system.

Example 5

The following example describes the simulation of a multi-unit stop-flow operation of a plurality of ETAS adsorbents. The multi-stage cyclic operation batch process shown in FIG. 4A was a single-unit batch operation in which a single pair of adsorbents was cycled between the feed and receiving streams. For practical applications at large scale, such separations are usually implemented in a continuous or semi-continuous mode with multiple separation units. To examine the potential utility of ETAS on a large scale, simulations of ETAS performance under multi-unit stop-flow operation were performed using multiple pairs of electrodes. Such simulations allow an assessment to be made of the effects of parameters such as receiving-to-feed volume ratio (θ), electrode mass per volume of feed (ξ), number of units ($N_{unit}$), etc., to optimize the overall design of a separation process. Moreover, the potential benefits of exploiting counter-current operations, which are generally more effective than co-current operations, can be evaluated.

Figure 6A:
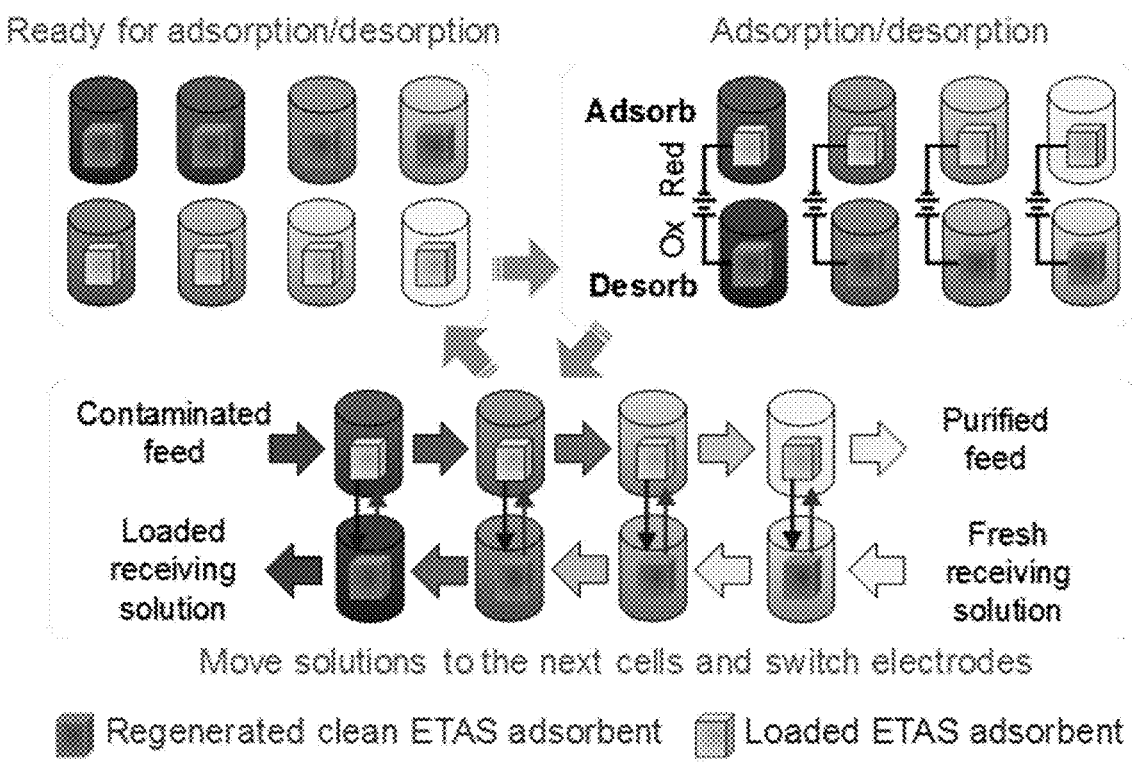
FIG. 6A is a schematic of the multi-unit stop-flow operation in a counter-current fashion, according to one set of embodiments.
Figure 8:
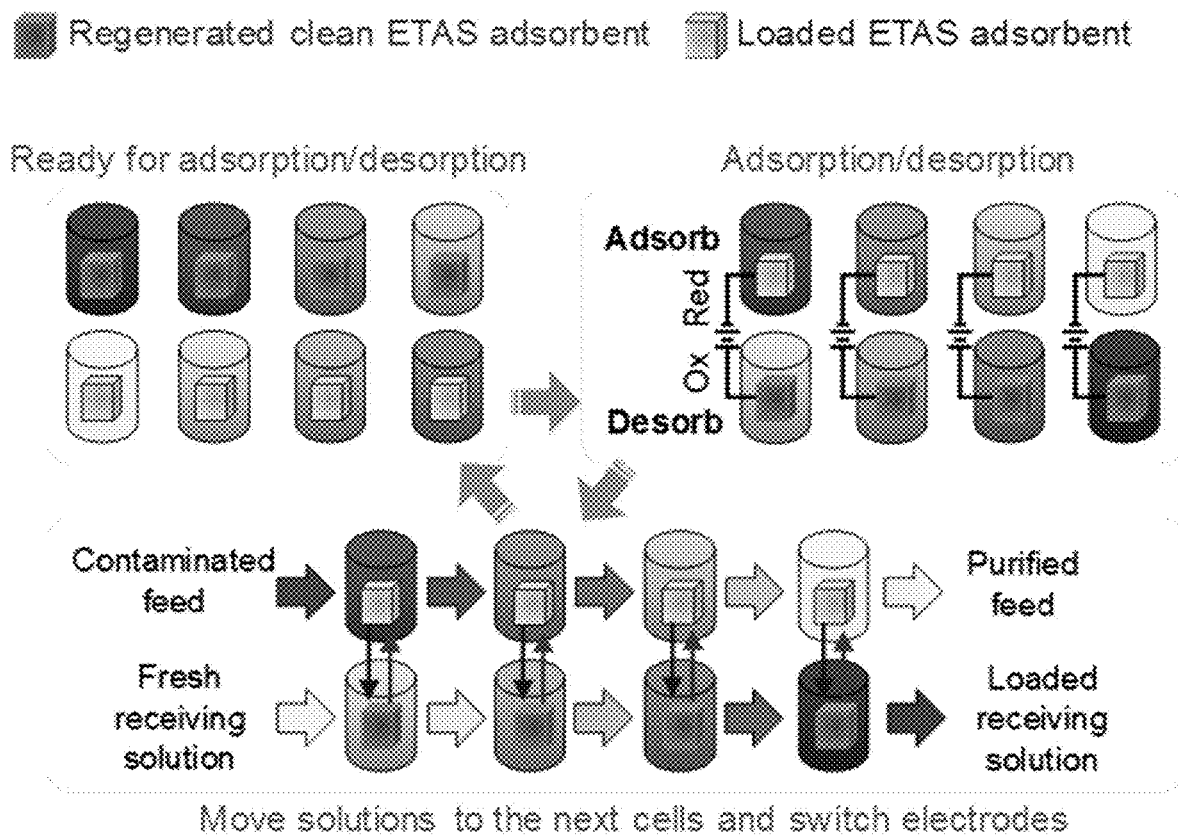
FIG. 8 is a schematic of the multi-unit stop-flow operation in a co-current fashion, according to one set of embodiments.

The simulated multi-unit stop-flow operation is illustrated in FIG. 6A for a counter-current process. The co-current process is shown in FIG. 8. The simulation results are shown in FIGS. 6B-6C for PVF/PPY adsorbents switching between 0.2 V and 0.4 V, expressed in terms of the final concentrations in the feed stream and receiving stream normalized by the initial feed concentration (left axis; $\psi_{ct}$ and $\psi_{co}$ are for counter-current and co-current operations, respectively) with three separation units for different $\theta$ and $\xi$ values. The right axis of each panel shows the relative difference in concentration between the counter-current and co-current operations, defined as $(\psi_{ct}-\psi_{co})/\psi_{co}\times 100$. Simulations with other $N_{unit}$ values yield similar trends (see FIG. 10). The removal efficiency improves with larger electrode mass loadings, $\xi$. The closer the receiving stream volume is to the feed steam volume, the better is the removal effectiveness; this is related to the capacity of the receiving stream for the solute.

Little difference in performance under co- and counter-current conditions was observed. This is a reflection of the shapes of the isotherms, in which the difference in loadings ($\Delta Q$) for the electrodes in the adsorption and desorption cells at any stage is almost independent of stage number (see FIG. 11). Simulations were performed for an ETAS adsorbent having linear sorption isotherms $Q_e$ (mg/g)=$100C_e$ (mg/L) and $Q_r$=$20C_e$ (mg/L) for the reduced and oxidized states, respectively, with the same set of $\theta$, $N_{unit}$, and $\xi$ values for the nonlinear sorption isotherm case. It is evident that in the linear sorption isotherm case (see FIGS. 6D-6E) the counter-current operation results in markedly improved separation effectiveness over the co-current case, with a lower final feed stream concentration and a higher final receiving stream concentration.

Example 6

Figure 7A:
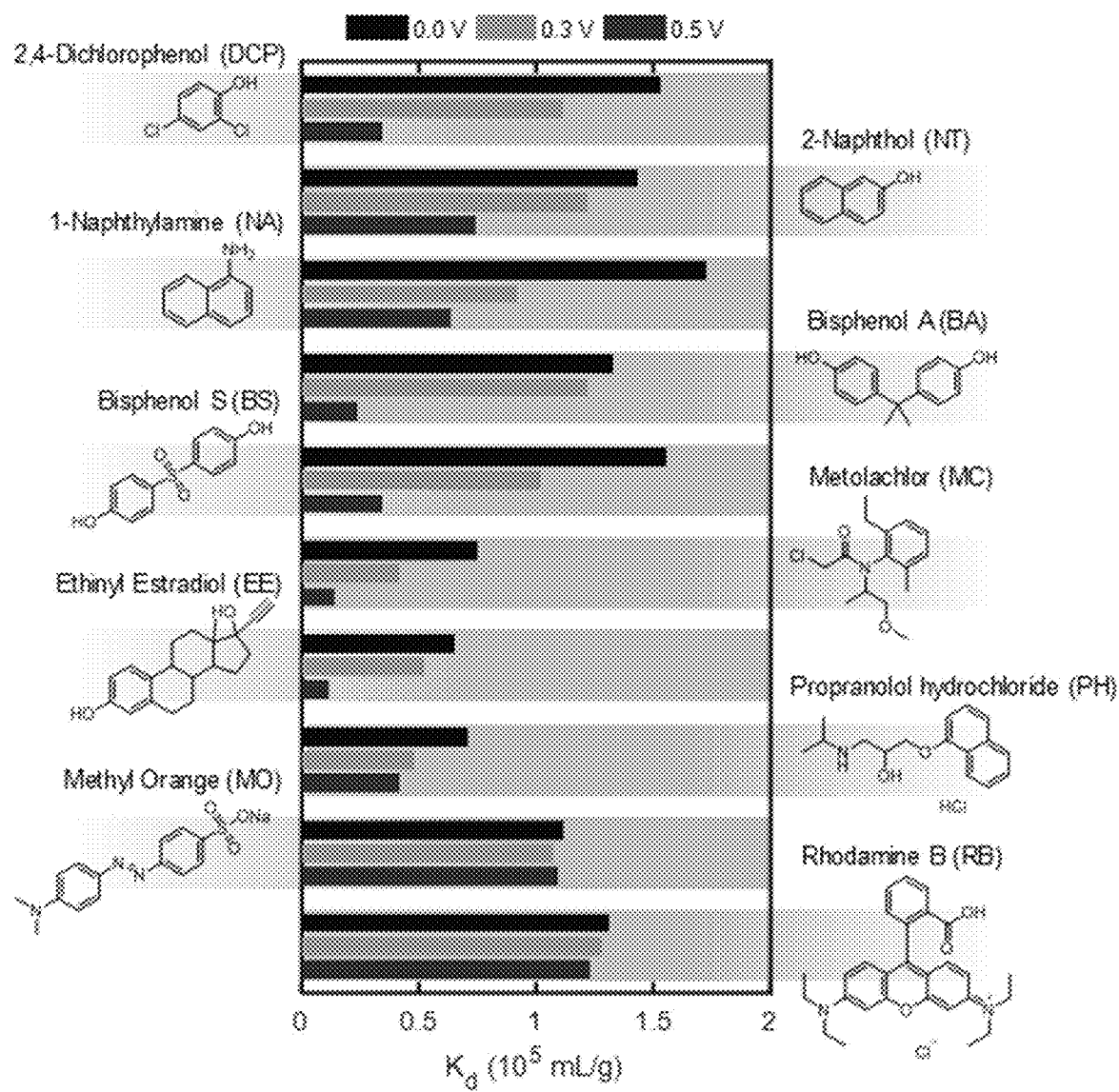
FIG. 7A shows $K_d$ values of a range of uncharged organic pollutants obtained at 0.0 V, 0.3 V, and 0.5 V, according to one set of embodiments.

The following example describes the generality of ETAS adsorbents for the adsorption/desorption of a wide range of organic species. The ETAS adsorbents are applicable to a range of neutral or near-neutral organic water pollutants of varying molecular structure, hydrophobicity, and functionality, including pesticides, pharmaceuticals and carcinogenic aromatics. 2,4-dichlorophenol (DCP), 2-naphthol (NT), and 1-naphthylamine (NA) are known carcinogenic pollutants, and intermediates for herbicide manufacturing and synthesis of industrial dyes. Bisphenol A (BA) and bisphenol S (BS) are anthropogenic pollutants that appear to be endocrine disruptors with long-term environmental persistence. Metolachlor (MC) is considered to be one of the leading pesticides responsible for groundwater contamination. Ethinyl estradiol (EE) and propranolol hydrochloride (PH) are widely used pharmaceuticals, with the former being a common contraceptive that has led to the collapse of fish populations, and the latter being a β-blocker for treatment of hypertension. Methyl orange (MO) and Rhodamine B (RB) are common industrial dyes identified as municipal water contaminates, particularly in developing countries. FIG. 7A shows the $K_d$ values of these organic pollutants measured at three different potentials (0.0 V, 0.3 V, 0.5 V) using PVF/PPY adsorbents. Pronounced $K_d$ dependences on the applied potential for DCP, NT, NA, BA, BS, MC, EE and PH were observed, indicating that ETAS is suitable for the mitigation of these organic species.

Figure 7B:
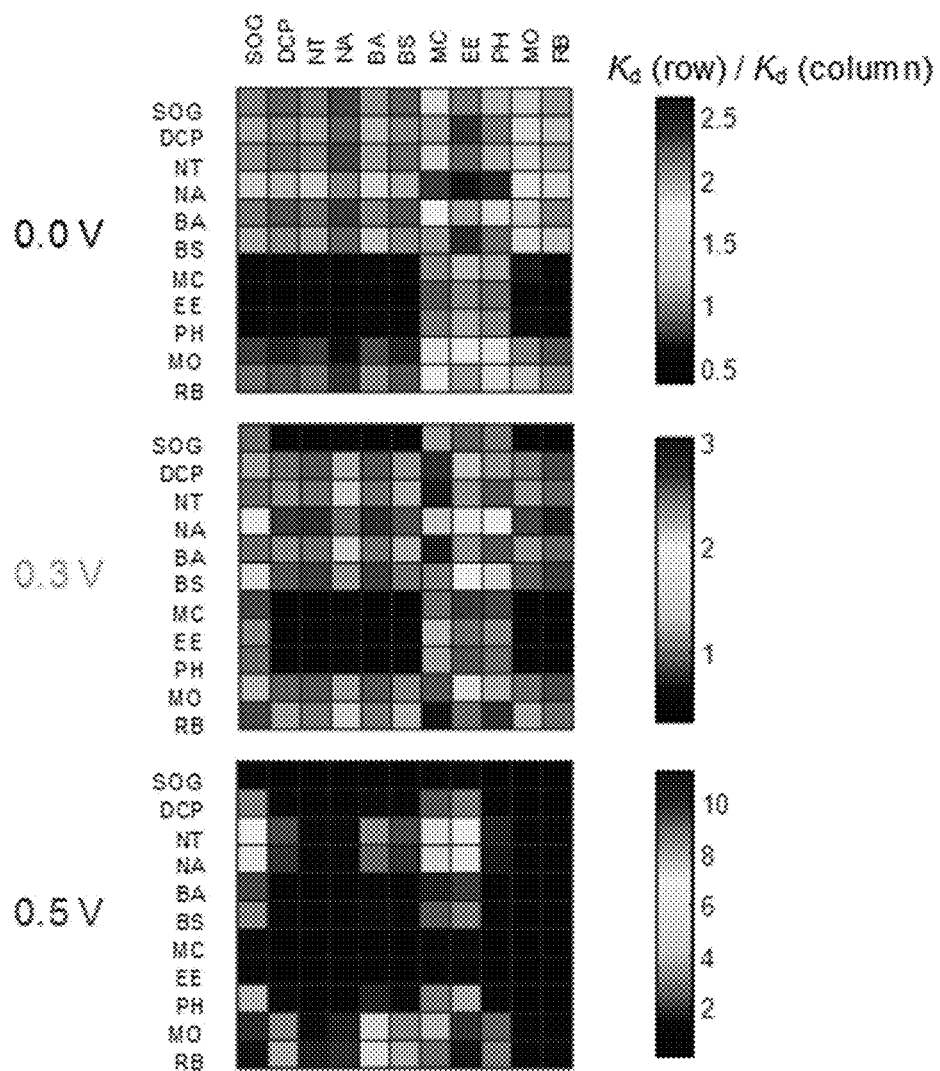
FIG. 7B shows heat maps of the ratio of $K_d$ values between two different organics for 0.0, 0.3 and 0.5 V, according to one set of embodiments.
Figure 7C:
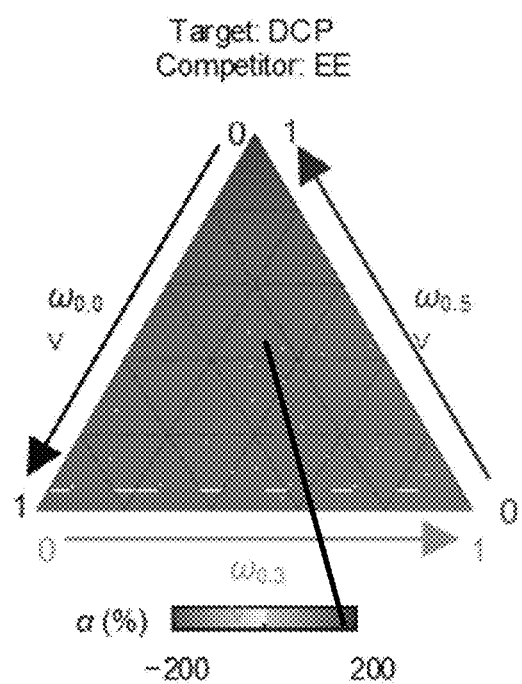
FIG. 7C shows $\alpha$ values as a function of $\omega_{0.0\ V}$, $\omega_{0.3\ V}$, and $\omega_{0.5\ V}$ for the target organic species DCP and competitor organic species EE, according to one set of embodiments.
Figure 7D:
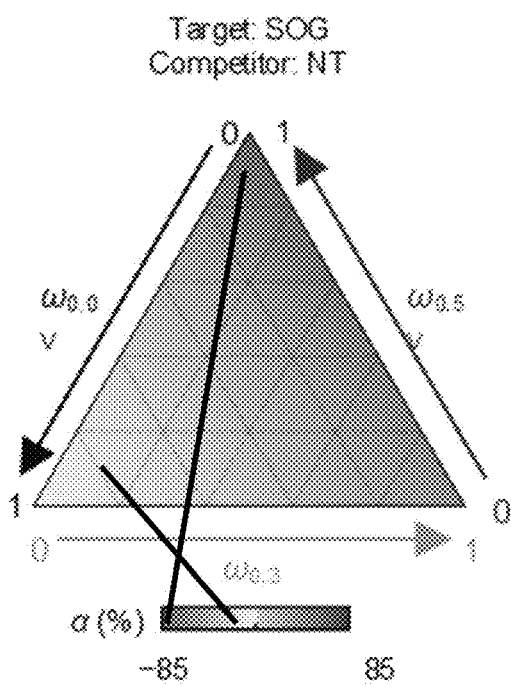
FIG. 7D shows $\alpha$ values as a function of $\omega_{0.0\ V}$, $\omega_{0.3\ V}$, and $\omega_{0.5\ V}$ for the target organic species SOG and competitor organic species NT, according to one set of embodiments.
Figure 7E:
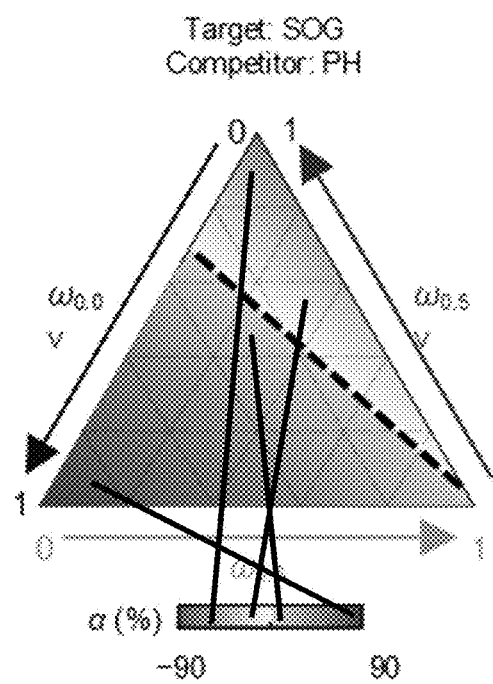
FIG. 7E shows $\alpha$ values as a function of $\omega_{0.0\ V}$, $\omega_{0.3\ V}$, and $\omega_{0.5\ V}$ for the target organic species SOG and competitor organic species PH, according to one set of embodiments.
Figure 7F:
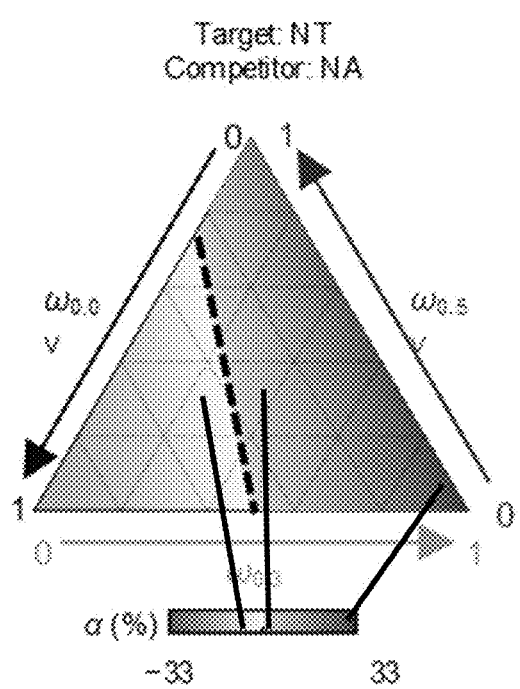
FIG. 7F shows $\alpha$ values as a function of $\omega_{0.0\ V}$, $\omega_{0.3\ V}$, and $\omega_{0.5\ V}$ for the target organic species NT and competitor organic species NA, according to one set of embodiments.

The difference in $K_d$ between different organics reflects the selectivity of the adsorbent towards them. FIG. 7B shows the heat map of the ratio of $K_d$ between any two organics at three potentials. A ratio significantly different from 1 indicates a high selectivity. Moreover, the ratio and the spatial pattern of the heat map change with the potential. The affinity of the ETAS adsorbent can therefore be tuned towards two competing organics by electrical means, which is a novel strategy for selectivity control. Since the potential of an electrode can be changed locally and independently, the overall selectivity of an ETAS adsorptive system composed of multiple electrodes can be modulated by applying different potentials to different electrodes. To illustrate this point, the selectivity factor ($\alpha$) for target organics was calculated in the presence of a competitor organic, defined as:

$$\alpha\ (\%) = \frac{K_d^{target} - K_d^{competitor}}{K_d^{competitor}} \times 100,$$

as functions of the fraction of electrodes at 0.0, 0.3, and 0.5 V ($\omega_{0.0\ V}$, $\omega_{0.3\ V}$ and was $\omega_{0.5\ V}$). A negative $\alpha$ indicates the target species can be selectively desorbed and a positive $\alpha$ indicates the target species can be selectively adsorbed. FIGS. 7C-7F shows a few representative examples of selectivity maps (e.g., values as functions of $\omega_{0.0\ V}$, $\omega_{0.3\ V}$ and $\omega_{0.5V}$), constructed in a way similar to the typical three-component phase diagram. DCP can be selectively desorbed compared to EE (see FIG. 7C), and SOG can be selectively adsorbed compared to NT (see FIG. 7D). In the presence of PH, SOG can be either selectively adsorbed or desorbed (see FIG. 7E): selective adsorption or desorption of SOG is achieved with $\omega_{0.0\ V}$=1 or $\omega_{0.5\ V}$=1. The NT against NA example shows a different potential dependence than the SOG against PH (see FIG. 7F): selective adsorption or desorption of NT is achieved with $\omega_{0.3\ V}$=1 or $\omega_{0.0\ V}$=1. Such selectivity control is a unique and novel strategy because it is achieved through the use of electrically responsive materials, in which the external stimuli (potential or current) can be delivered to different electrodes locally and independently, without issues associated with mass diffusion or heat dissipation (often encountered when using chemical and thermal stimuli) that hampers such precise delivery over location.

Example 7

The following example describes the experimental procedures used for the functionality of ETAS adsorbents. Adsorption isotherms were obtained by adjusting the concentration of organic pollutants in solution and measuring the subsequent sorption using contact times of ~12-15 hours. The concentrations of organic pollutants were determined by UV-Vis spectroscopy or fluorescence spectroscopy. The masses of the polymer materials deposited on the CC substrates were determined by thermogravimetric analysis (TGA) with a final temperature of 900° C. and a heating rate of 5° C./minute. Samples for TGA measurements were dried in a vacuum oven at 60° C. for 8 to 12 hours. For the case of PVF/PPY/CNT ternary hybrid, the mass ratio between the polymer components and the CNT component were determined by TGA using free-standing PVF/PPY/CNT films peeled off stainless steel substrates. In the ETAS cyclic operation using a multi-stage batch process for the transfer of SOG from a feed stream to a receiving stream, the volumes of the feed stream and the receiving stream were 100 and 5 mL, respectively. At stage zero (e.g., before the ETAS cyclic operation), the SOG concentrations of the feed stream and the receiving stream were 5 and 0 mg/L, respectively. During each stage, the PVF/PPY adsorbent with a nominal surface area of 1 cm² and polymer mass of 0.12 mg at a selected potential was put in contact with either the feed or the receiving stream for ~5 hours, which was sufficiently long to reach adsorption equilibrium for small quantities of adsorbents used in the multi-stage process.

Example 8

The following example describes the materials used in the fabrication and/or functionialization of the ETAS adsorbents. Pyrrole, chloroform, methanol, conductive multi-walled carbon nanotubes (diameter: 6-9 nm, purity: 95%), sodium perchlorate, tetrabutylammonium perchlorate, Sudan Orange G™ (SOG), 2,4-dichlorophenol, 2-naphthol, 1-naphthylamine, bisphenol A, bisphenol S, metolachlor, ethinyl estradiol, propranolol hydrochloride, methyl orange, and rhodamine B were purchased from Sigma Aldrich, and were used as received throughout the study, without further purification or chemical modification unless otherwise noted. Polyvinylferrocene with a molecular weight of 50,000 g/mol was obtained from Polysciences and used as received. A platinum wire auxiliary electrode and an Ag/AgCl (3 M NaCl) reference electrode were purchased from BASi and stored as instructed. Flexible carbon cloths were obtained from FuelCellStore and used as received without pretreatment prior to electrochemical functionalization by electroactive polymers.

Example 9

The following example describes the instrumentation used for the fabrication and/or functionalization of the ETAS adsorbents. Scanning electron microscopic measurements were carried out using JEOL-6010LA SEM for general imaging and JEOL-6700 for high-resolution imaging. Samples for SEM were sputter-coated with a layer of gold/palladium (~10 nm) using a Desk II cold sputter/etch unit. Transmission electron microscopic measurements and energy dispersive X-ray spectroscopic elemental analysis were performed using JEOL 2010 Advanced High Performance TEM. The surface area measurements were carried out using Micromeritics ASAP2020 to determine nitrogen adsorption/desorption isotherm (ASAP2020, Micromeritics) followed by data fitting using the Brunauer-Emmett-Teller (BET) method. Samples for BET analysis were free-standing polymer films peeled off stainless-steel electrodes. Thermogravimetric analysis experiments were carried out using a TA Q50 instrument. Absorption spectra were collected using a Varian Cary 6000i UV-Vis spectrometer. Fluorescence spectroscopic measurements were performed using a Horiba Jobin Yvon spectrofluorometer. All electrochemical experiments were performed using a VersaSTAT4 potentiostat (Princeton Applied Research) with a three electrode configuration using an Ag/AgCl (3 M NaCl) electrode (BASi) and a platinum wire as the reference electrode and the counter electrode, respectively. All potential values reported in this work are referenced to the Ag/AgCl electrode. Ultraviolet photoemission spectra (UPS) were obtained using Physical Electronics PHI 5000 VersaProbe with a He(I) emission lamp (21.20 eV photon energy).

Example 10

The following example describes the fabrication of the ETAS adsorbents. Two types of ETAS adsorbents, carbon cloth (CC)-supported PVF/PPY and PVF/PPY/CNT, were prepared from electrochemical deposition under different conditions. The CC-supported PVF/PPY was prepared by simultaneous electro-polymerization of pyrrole and electro-precipitation of PVF using a precursor solution that contained 2 mg/mL PVF, 200 mM pyrrole, and 0.1 M tetrabutylammonia perchlorate in $CHCl_3$. Such a co-precipitation process occurred due to the strong π stacking interactions between the aromatic monomer (i.e., pyrrole) and the cyclopentadiene ring of ferrocene moieties in PVF, generating a nanoporous electro-active binary polymeric surface suitable for ETAS applications. The deposition was performed by chronoamperometry at a potential of 0.7 V versus Ag/AgCl for a specified period of time (usually 10 minutes). To prepare the CC-supported PVF/PPY/CNT, 0.1 mg/mL metallic carbon nanotubes was added into the precursor solution followed by sonication for 2 hours prior to electrochemical deposition. The CNT surface consisting of $sp^2$-carbon atoms exhibited non-covalent interactions with PVF and pyrrole, leading to a stable suspension with well-dispersed CNTs after the sonication treatment. The electrochemical deposition was carried out at a potential of 0.7 V versus Ag/AgCl for a specified period of time (usually 15 minutes). Two control samples, CC-supported PVF and CC-supported PPY, were also prepared to compare the adsorption capabilities for organic pollutants. CC-supported PVF was prepared by applying a potential of 0.7 V for 10 minutes versus Ag/AgCl in a chloroform solution containing 2 mg/ml PVF and 0.1 M tetrabutylammonium perchlorate. The CC-supported PPY was prepared by electrochemical polymerization of pyrrole at a potential of 0.6 V versus Ag/AgCl for 10 minutes in an aqueous solution containing 200 mM pyrrole and 0.1 M sodium perchlorate.

The pH values were measured before and after applying a high potential of 0.6 V to either the PVF/PPY adsorbent or the PVF/PPY/CNT adsorbent, and it was found that the pH of the solution remained at a value of about 6.9. This observation is reasonable since in the ETAS operation, a constant potential was applied instead of a constant current. The redox processes that may lead to water oxidation or proton reduction (thus resulting in a change in pH) occur during the very brief initial charging period (within a few seconds), while the adsorption/desorption process takes a much longer time (a few hours). In other modes of electrochemical separation (e.g., application of a constant current), the water oxidation or proton reduction process is taking place over the entire course of the process, and thus could cause a significant change in the pH of the solution.

Example 11

The following example describes a redox polymer electrode model simulation. The current responses of a redox-active thin film during potential sweeping processes depend on the thickness of the film, or more specifically, the distances of redox sites from the electrode surface. In order to quantitatively describe such a dependence, a modified redox polymer electrode (RPE) model was used to simulate the voltammetric responses of PVF/PPY hybrid films with varying thicknesses. Briefly, the RPE model assumes that i) at the interface between the electrode surface and the redox-active film, the electron exchange process involves the redox moieties near the electrode, and is described by the Butler-Volmer kinetics, and ii) charge transport in the bulk film is described by diffusion kinetics. Such a model has been used for redox polymer films, and also specifically for PVF films. The redox polymer film is divided into a number of layers with an equal concentration of redox sites contained in each layer, and instantaneous amperometric responses were simulated when the potential of the electrode was linearly scanned. The experimentally observable parameters were the peak currents at different scan rates during cyclic voltammetric scans. Slopes obtained from linear fits of the log(peak current)-log(scan rate) data contained information about the thicknesses of the PVF/PPY hybrid films on the carbon cloth substrate or the carbon nanotube scaffold. From the RPE simulations, relations between the slope and the thickness of the ferrocene-containing film were obtained. The parameters used include: the standard heterogeneous electron transfer rate constant of ferrocene ($k^0=96$ s$^{-1}$ for PVF/PPY on CC) derived from direct measurements of ferrocene monolayers self-assembled on gold and the difference in the density of electronic states between carbon fiber and gold, and 518 s$^{-1}$ for PVF/PPY on the carbon nanotube due to enhanced electron transfer kinetics calculated using Gerisher-Marcus theory), transfer coefficient ($\alpha$) for the Butler-Volmer kinetic equation (a value of 0.5 is usually assumed for ferrocene), charge transport diffusion coefficient for PVF films with $ClO_4^{-1}$ as the anion ($D_{ct}=1.06\times10^{-9}$ cm$^2$/s)$^9$, formal potential of ferrocene ($E^0=0.39$ V for PVF/PPY on CC, and $E^0=0.29$ V for PVF/PPY on CNT, determined from CV measurements), the thickness for each layer in the RPE model (2 nm), Faraday constant (F=96485.3 C/mol), and the ideal gas constant (R=8.314 J/mol K). Understanding the charge transport processes using the RPE simulations sheds light on the multi-layer nature of a redox-active polymer film, as well as permits a better design and construction of RPEs for several applications in addition to ETAS, such as electrical energy storage, molecular sensing, and electrochemically controlled catalysis.

Example 12

The following example describes the Gerischer-Marcus calculations. Gerischer-Marcus (GM) theory describes the heterogeneous electron transfer kinetics using a formulism that considers the energy distribution of a redox species and the density of states in the electron phase, based on the following equation:

$$k_{ET} = \xi \int_{-\infty}^{\infty} \theta(E) f(E) \rho_F(E) W_{ox}(\lambda, E) dE$$

$$W_{ox}(\lambda, E) = \frac{1}{\sqrt{4\pi k_B T \lambda}} \exp\left(-\frac{(E - E_{F,redox} - \lambda)^2}{4 k_B T \lambda}\right)$$

where $k_{ET}$ is the electron transfer rate constant at a given overpotential, $\xi$ is the prefactor that appear in the GM formalism, $\theta(E)$ is the proportionality function, $\rho_F(E)$ is the density of states in the valence band of the electrode near the Fermi level, f(E) is the standard Fermi-Dirac distribution function, $W_{ox}(\lambda, E)$ is a Gaussian function that depicts the energy-level distribution of the unoccupied states of the ferrocene/ferrocenium couple, $k_B$ is the Boltzmann constant, $E_{F,redox}$ is the Fermi level of the ferrocene/ferrocenium couple, and $\lambda$ is the solvent reorganization energy for ferrocene (a value of 0.5 eV was used in the calculation). It is often assumed that $\theta(E)$ does not depend on the energy level, and $\xi$ is independent of the underlying electrode material; therefore, these two parameters cancel out when calculating the relative electron transfer rate constants. $\rho_F$ for CC and CNT was approximated by the intensities of the valence bands near $E_F$, measured by ultraviolet photoelectron spectroscopy (see FIG. 5H).

Example 13

The following example describes the simulations of multi-unit stop-flow operations. Because the experimentally measured concentrations in the feed stream and receiving stream were represented well by simulations of the equilibrium sorption processes with experimentally determined potential-dependent sorption isotherms used for the electrodes at each stage (see FIGS. 4B-4C), sorption isotherms obtained with the electrodes can be used with confidence to predict the performance of other staged separation processes of interest. The separation is mediated by the ETAS adsorbent, which cycles between the two streams, picking up solute from the feed stream and releasing it to the receiving stream. Simulations of these processes would allow an assessment to be made of the effects of parameters such as receiving-to-feed volume ratio, electrode mass per volume of feed, number of separation units ($N_{unit}$), etc., to optimize the overall design of a separation process for a given task. The systems simulated here are illustrated in FIG. 8 for a co-current multi-unit process, and in FIG. 6A for a counter-current multi-unit process. Both processes are operated in a stop-flow fashion.

Figure 9:
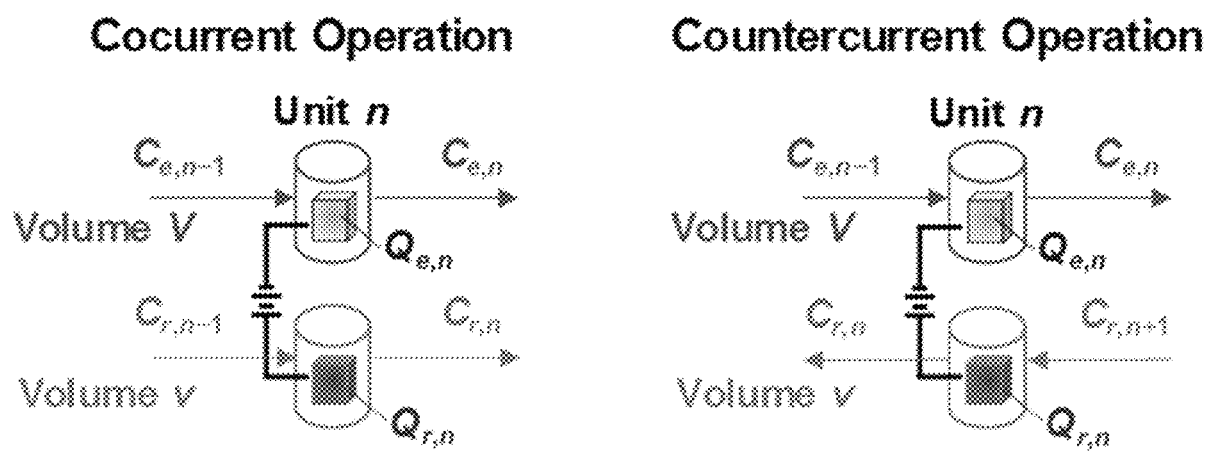
FIG. 9 shows schematics of the material balances at equilibrium of the co-current operation (left) and counter-current operation (right), according to one set of embodiments.

All cells are filled, and appropriate potentials are applied until equilibrium adsorption or desorption is reached. The solutions are then all transferred to the next cells. For instance, the feed stream from unit n is fed to the cell in unit n+1 and the receiving stream in unit n is fed to the cell in unit n+1 (for the counter-current operation, it is fed to unit n−1). At any given stage, the electrode that had been in equilibrium with the feed stream is transferred to the cell containing the new receiving stream, while the depleted electrode in the receiving stream cell is relocated to the feed stream cell. The electrodes are then activated again to drive the adsorption from the feed stream and desorption to the receiving stream at each unit. The material balances associated with each phase can be used to evaluate the equilibrium concentrations at each unit at the end of each cycle (see FIG. 9).

For the co-current case, volume V of the feed stream is fed to unit 1, with concentration $C_{e0}$, where it contacts electrode $E_1$ with loading $Q_{r1}$. This solution comes to equilibrium with the electrode, which now has loading $Q_{e1}$. The total mass of electrode is m. In the meantime, the electrode that was in contact with the feed volume in the previous cycle is now contacted with the stripping phase of volume v and initial concentration $C_{r0}$, and comes to equilibrium with the electrode, with loading $Q_{r1}$. In the next step, the feed stream that was in unit 1 is transferred to unit 2, where it contacts a second electrode $E_2$ that had been in equilibrium with the stripping solution with loading $Q_{r2}$. When the feed stream is equilibrated with the electrode, it is passed to unit 3, and the electrode is then exposed to the stripping solution with initial concentration $C_{r1}$. This procedure can be repeated for a given number of units, $N_{unit}$. To study the effects of important operating parameters, the material balances are expressed in terms of $\theta$ (=v/V) and $\xi$ (=m/v). For any intermediate unit n, the material balances at equilibrium are:

$$C_{en} = C_{e,n-1} - \left(\frac{v}{V}\right)\left(\frac{m}{v}\right)(Q_{en} - Q_{rn})$$
$$= C_{e,n-1} - \theta\xi(Q_{en} - Q_{rn})$$
$$C_{rn} = C_{r,n-1} + \left(\frac{m}{v}\right)(Q_{en} - Q_{rn})$$
$$= C_{r,n-1} + \xi(Q_{en} - Q_{rn})$$

with $Q_{en}=Q_{en}(C_{en})$ and $Q_{rn}=Q_{rn}(C_{rn})$ given by the sorption isotherms determined experimentally under different potential conditions.

In the counter-current case, the feed stream equations are unchanged, but the stripping solution is such that the solution to unit n comes from unit n+1, rather than from unit n−1. Thus, for the nth unit:

$$C_{e,n} = C_{e,n-1} - \theta \xi (Q_{en} - Q_{rn})$$

$$C_{r,n+1} = C_{r,n} - \xi (Q_{en} - Q_{rn})$$

Figure 10:
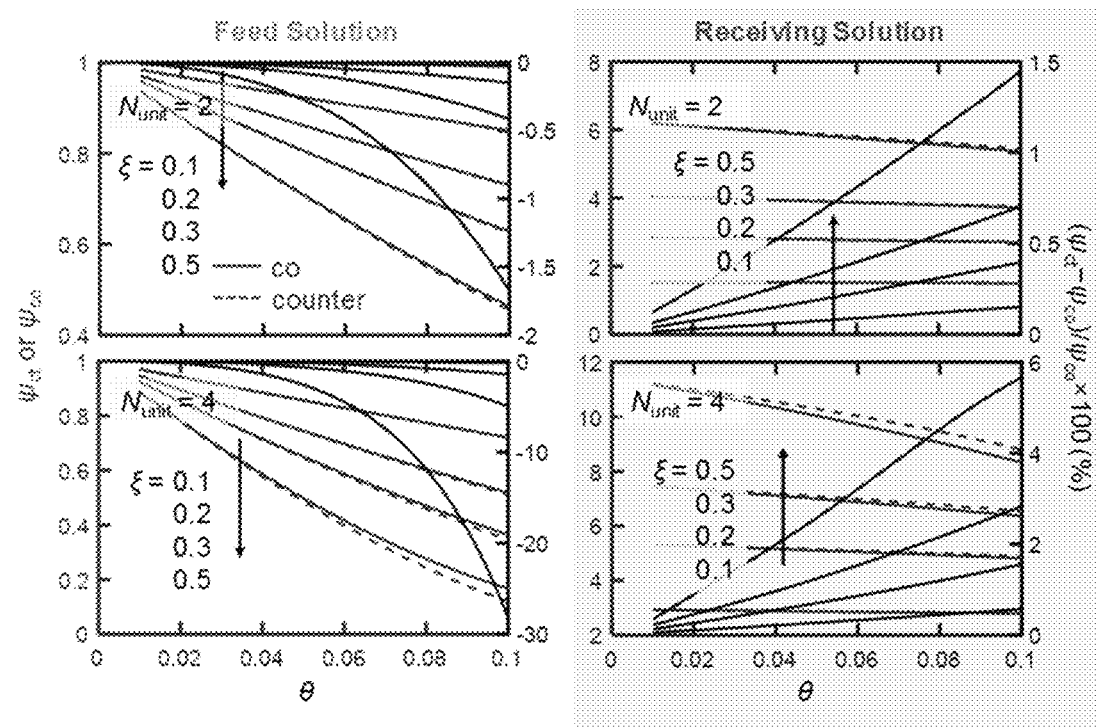
FIG. 10 shows simulated w values with different $N_{unit}$, $\theta$, and $\xi$ for the nonlinear sorption isotherm case of the feed stream and receiving stream, according to one set of embodiments.
Figure 11A:
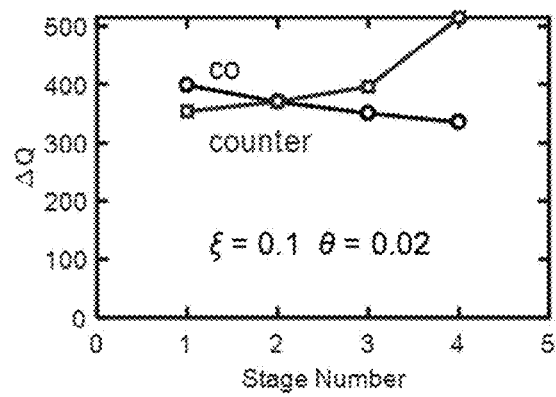
FIG. 11A shows $\Delta Q$ versus stage number for a range of selected $\xi$ and $\theta$ values, according to one set of embodiments.
Figure 11A:
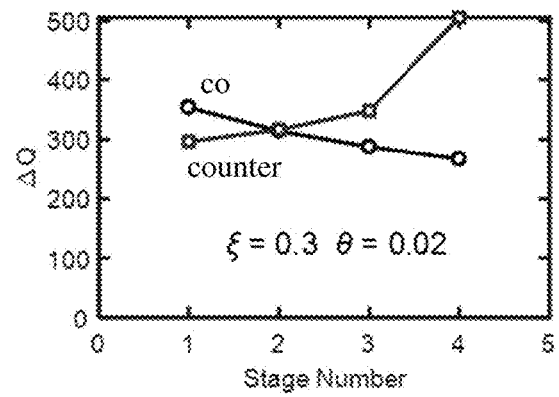
Figure 11A:
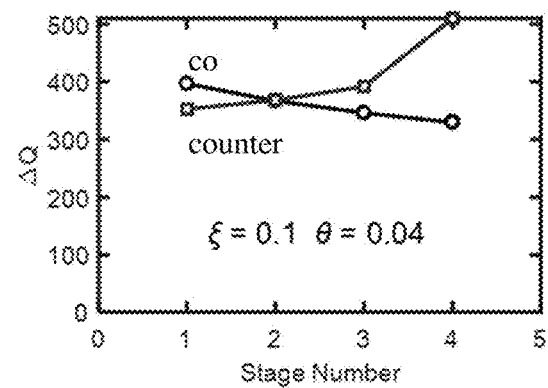
Figure 11A:
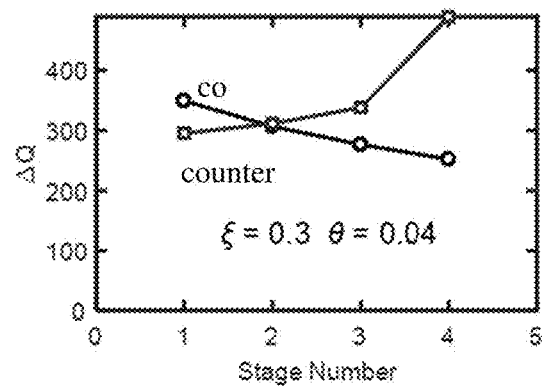
Figure 11B:
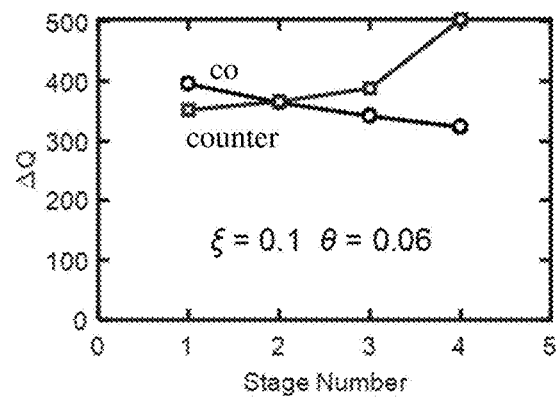
FIG. 11B shows $\Delta Q$ versus stage number for a range of selected $\xi$ and $\theta$ values different than FIG. 11A, according to one set of embodiments
Figure 11B:
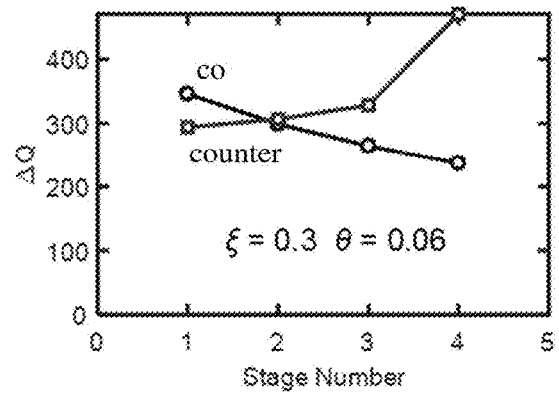
Figure 11B:
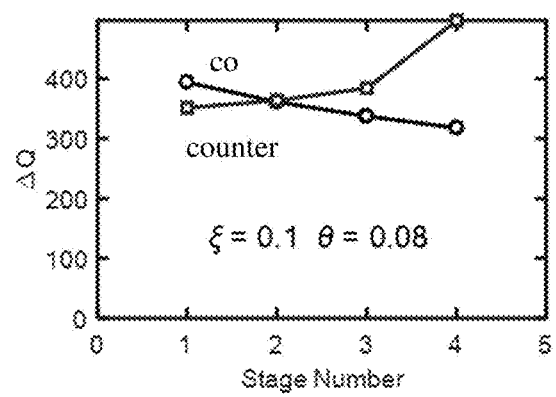
Figure 11B:
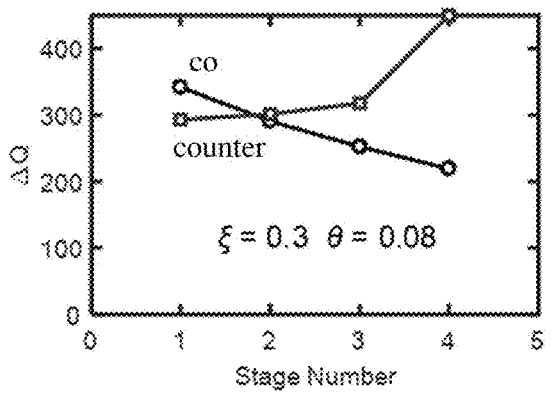

The equations must be solved iteratively. An initial guess for $C_{r1}$ must be made, and then the equations solved for all stages. Convergence is achieved when the guessed $C_{r1}$ leads to the prescribed concentration for the stripping solution added to unit N, which is generally 0. The simulation results are shown in FIGS. 6B-6C and FIG. 10 for PVF/PPY adsorbents switching between 0.2 and 0.4 V, expressed in terms of the final concentrations in the feed and receiving phases normalized by the initial feed concentration ($\psi$, left axis), for different $N_{unit}$, $\theta$ and $\xi$ values. The right axis of each panel shows the relative difference in concentration between the counter-current and co-current operations, defined as $(\psi_{ct} - \psi_{co})/\psi_{co} \times 100$, where $\psi_{ct}$ and $\psi_{co}$ are for counter-current and co-current operations, respectively.

Little difference in performance is observed under co- and counter-current conditions. This is a reflection of the shapes of the isotherms, in which the difference in loadings for the electrodes in the adsorption and desorption cells at any stage is almost independent of unit number; e.g., $Q_{en} - Q_{rn} = \Delta Q \approx$ constant. Under these conditions the mass balance equations reduce to:

$$C_{en} = C_{e,n-1} - \theta \xi \Delta Q$$

$$C_{rn} = C_{r,n-1} + \xi \Delta Q$$

or, for counter-current operations:

$$C_{r,n+1} = C_{r,n} - \xi \Delta Q.$$

Thus, there is no effect of $C_{rn}$ on $C_{en}$, and vice versa, so it is immaterial whether the system is in co-current or counter-current operation. The actual values of $\Delta Q$ are shown in FIG. 11.

Figure 12:
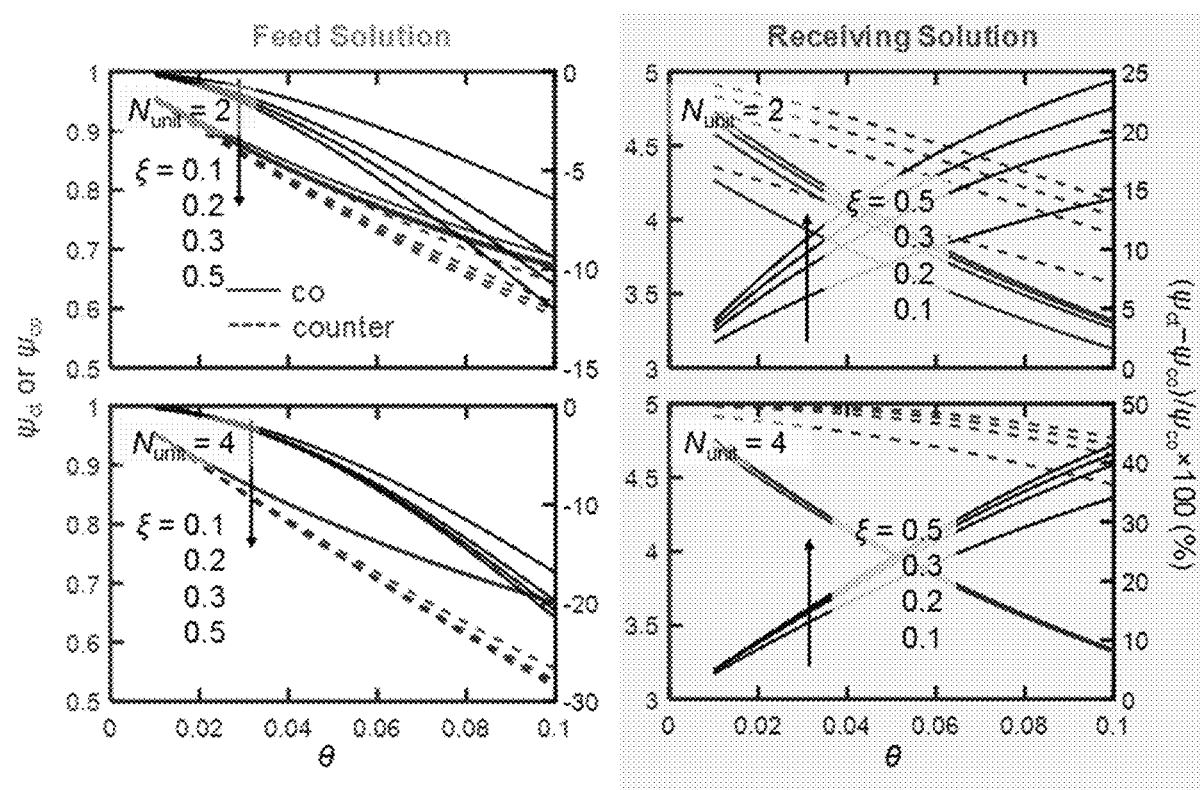
FIG. 12 shows simulated $\psi$ values with different $N_{unit}$, $\theta$, and $\xi$ for the linear sorption isotherm case, according to one set of embodiments.

Simulations were performed for an ETAS adsorbent having linear sorption isotherms $Q_e$ (mg/g)=100$C_e$ (mg/L) and $Q_r$=20$C_e$ (mg/L) for the reduced and oxidized states, respectively, with the same set of $N_{unit}$, $\theta$, and $\xi$ values used for generation of the curves in the nonlinear sorption case. It is evident that in the linear sorption isotherm case (see FIGS. 6D-6E and FIG. 12), the counter-current operation results in markedly improved separation effectiveness over the co-current case, with a lower final feed stream concentration and a higher final receiving stream concentration.

These simulations indicate that experimentally determined, potential-dependent sorption isotherms can be used to predict ETAS separation effectiveness under different operating conditions and device configurations. For a given separation task with specified requirements such as feed or receiving phase concentration, number and geometry of operation units (related to capital cost) etc., the proposed simulation scheme based on multi-unit stop-flow operation mode could be used as a general framework for rational design and optimization of separation processes for large-scale operation.

Example 14

The following example describes a comparison of the ETAS adsorbents with alternative separation technologies. A detailed figure-of-merit comparison is provided between ETAS and the competing separation technology that targets uncharged organics, which is the conventional temperature swing adsorption/desorption methods. Other separation technologies such as distillation and liquid-liquid extraction are not suitable for the recovery/removal of these uncharged organic compounds. The volatilities of these organics are too low for distillation processes to work, and the possible counter-contamination of feed streams with organic solvents makes it unsuitable to employ liquid-liquid extraction to separate these organics. The adsorbent materials used in conventional adsorption processes for removing organic pollutants are carbon nanomaterials, such as activated carbon (AC), carbon nanotubes (CNTs), graphene-based materials, and porous metal oxides as adsorbent materials.

The economics and sustainability of a separation technology should be assessed in the context of an entire chemical process; important factors that need to be considered include the fabrication and replacement costs of key components (e.g., sorbent materials, membrane modules), the capital cost of the equipment, and the energy cost.

Carbon materials (such as AC used in thermal-swing separation processes) and organic polymeric materials (such as electrochemically active polymers used in ETAS adsorbents) are considered inexpensive materials with low manufacturing costs, compared to other materials such as metal oxides. The industrial scale manufacturing of carbon materials such as AC and CNTs has long been realized, so the production cost of these materials at large scale should be considerably lower than that for the ETAS adsorbents, which are new material systems and their synthesis has been demonstrated on a bench scale. The replacement cost of sorbents materials are associated with their performance stability. The performance stability of carbon-based adsorbents after multiple thermal swing cycles should be compared to the performance stability of electrochemically active polymers-based adsorbents after multiple electrical swing cycles. The regeneration efficiency of carbon adsorbents depends highly on the regeneration conditions, and usually ranges from 70% to almost 100% (e.g., after one thermal swing cycle, the adsorbent performance degrades to ~70% to 100% compared to its initial state). For example, for AC-based adsorbents, air activation at 633 K results in a regeneration efficiency of 68% and steam activation at 1123 K can achieve a regeneration efficiency of 94%. Therefore, the optimized regeneration condition for spent carbon adsorbents would make them reusable for multiple cycles. However, during the regeneration process, it is common to have carbon loss of ~5% (mass percentage). As a conservative estimation, assuming a regeneration efficiency of 100% and carbon loss of 5%, the performance of carbon adsorbents would decrease by 50% after 13 cycles. On the other hand, for electrochemically active polymers-based adsorbents, their performance stability after multiple electrical swings can be faithfully estimated by investigating the relation between the charge capacity and the number of electrical swing cycles. Over the course of multiple electrical swing cycles (e.g., repeated charging/discharging cycles), several factors might affect the performance stability of electrochemically active polymers, including structural pulverization, shrinkage of polymer backbones, and polymer leaching from conductive substrates. A good stability of the charge capacity indicates the structural integrity of the electrochemically active polymer system. For the PVF/PPY hybrid coating, electrical swing between 0.0 V and 0.8 V versus Ag/AgCl for 300 cycles resulted in only ~1% charge capacity loss, indicating good stability of the ETAS adsorbent when subject to repeated electric swing cycles.

The capital cost for separation equipment is usually significant; commonly, 50-90% of the capital of chemical plants is invested into separation units. The adsorption step in both ETAS and thermal-swing adsorption/desorption processes is usually implemented at ambient temperature and pressure, and thus the capital cost of the adsorbers should be comparable between these two separation technologies. However, the thermal-swing separation technology requires high temperatures for the desorption/regeneration step (usually at 500° C.-900° C.); such high temperature operation demands the employment of costly materials for the equipment such as stainless steel-based alloys, and therefore considerably raises the capital cost of the desorber and its associated pipe networks. In contrast, the regeneration/desorption step in ETAS is carried out under ambient conditions, therefore presumably requiring significantly less capital investment for the equipment. Additionally, ETAS shares common features with other electrochemical separation technologies such as capacitive deionization, and the often-cited advantages of electrochemical equipment include modularity and low cost. Moreover, ETAS can be implemented in a multi-stage cyclic fashion (as demonstrated in FIGS. 4A-4F) using a single separation unit to achieve a specified separation degree, whereas the conventional adsorption process usually requires multiple separation units to achieve the target separation degree. The operation with multiple separation units also increases the capital cost. Hence, considering the factors discussed above, ETAS incurs less capital cost than thermal-swing separation technologies.

Figure 13A:
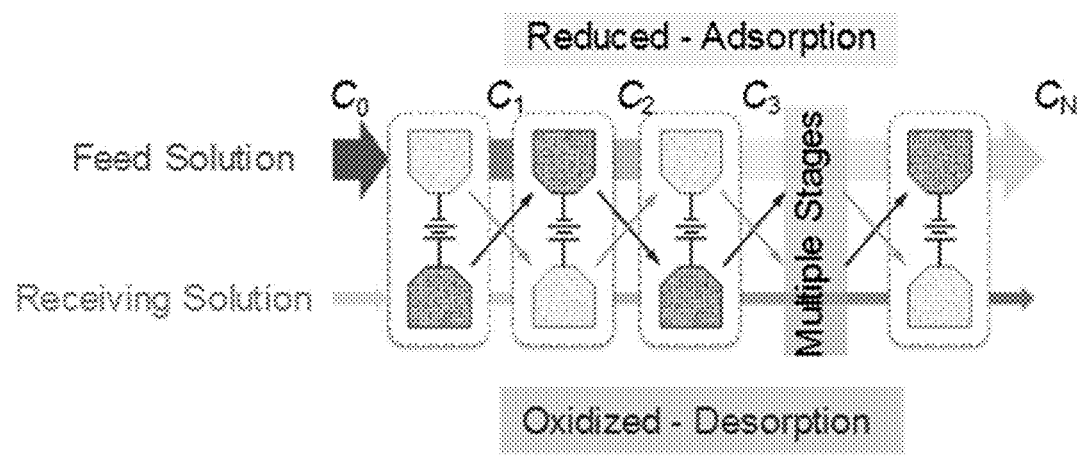
FIG. 13A is a schematic of the schemes used to quantify the energy consumption as a function of separation degree for the ETAS process, according to one set of embodiments.
Figure 13B:
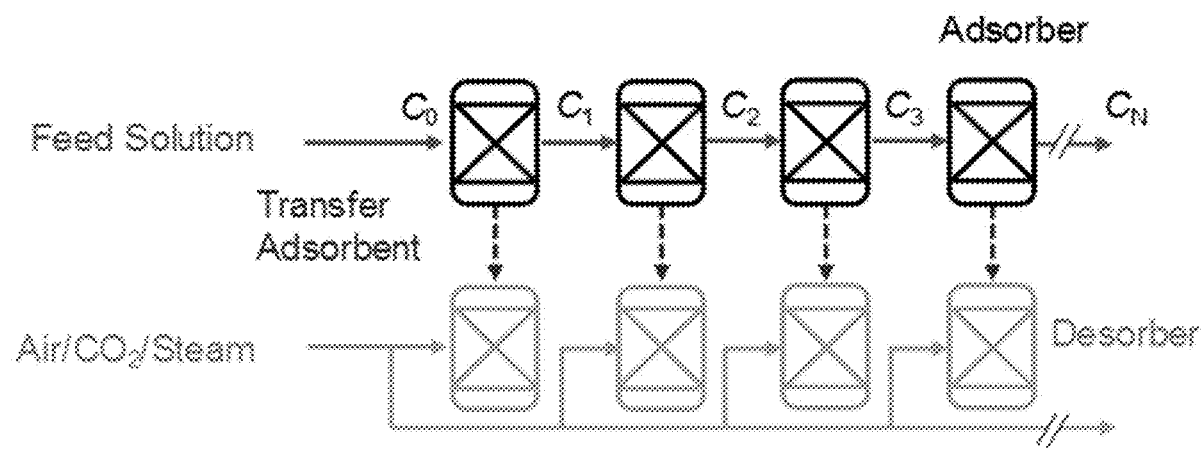
FIG. 13B is a schematic of the schemes used to quantify the energy consumption as a function of separation degree for the thermal swing adsorption/desorption process, according to one set of embodiments.

The primary factor that governs the difference in the economic viability between ETAS and the conventional thermal swing separation technology should be the energy cost. In ETAS, the energy cost comes from the electrical swing over the course of ETAS operation whereas in the conventional thermal swing adsorption/desorption process, the primary energy consumption stems from the thermal regeneration of spent adsorbent materials. The energy consumption is compared quantitatively between ETAS and the thermal swing separation technology based on the scheme illustrated in FIG. 13.

For ETAS operation, by numerically solving the coupled experimentally determined isotherms at the paired oxidation-reduction potentials, the pollutant concentration can be obtained after the Nth stage ($C_N$), while in the meantime, the electrical energy consumed can be quantified. In ETAS, both adsorption and desorption occur at ambient temperature, so the only energy consumption is from the electricity used for the electrical swing. In the thermal swing separation process, adsorption occurs at ambient temperature while desorption (e.g., the regeneration of spent adsorbents) occurs at high temperature. The pollutant concentration after the Nth adsorption unit can be calculated. If fresh adsorbents are used in each adsorber, there will be the following relationship between $C_N$ and $C_{N-1}$ using the mass balance of the pollutant during adsorption:

$$(C_{N-1} - C_N)\frac{V_W}{m_{adsorbent,N}} = f_{isotherm}(C_N) \quad (S1)$$

where $V_W$ is the volume of water in the feed $m_{adsorbent,N}$ is the mass of the adsorbent in the Nth adsorber, $f_{isotherm}(x)$ is the adsorption isotherm function, which can assume a variety of forms. For example, for a Langmuir isotherm, $$f_{isotherm}(x) = \frac{K_L x}{1 + a_L x}$$

where $K_L$ and $a_L$ are the Langmuir constants; for a Freundlich isotherm, $$f_{isotherm}(x) = K_F x^{b_F}$$

where $K_F$ and $b_F$ are the Freundlich constants.

Here, Equation S1 needs to be used to solve for $C_N$ given the value of $C_{N-1}$. Equation S1 is generally nonlinear, and therefore $C_N$ cannot be solved for analytically. $C_N$ can be numerically solved for if $C_{N-1}$ is known. Experimentally $C_0$ is known, and then $C_1$, $C_2$, $C_3$, . . . , $C_N$ can be iteratively solved for.

Depending on the specific condition for the regeneration step, the thermal energy consumption for activation of a unit mass of adsorbent is estimated as $m_a C_a \Delta T$, where $m_a$ is the mass of the regeneration agent (e.g., air, $CO_2$ or steam), $C_a$ is the heap capacity of the regeneration agent, and $\Delta T$ is the increase in temperature needed to reach the required temperature in the desorber.

Therefore, for ETAS, a relation between the electrical energy consumed and the separation degree $(C_1-C_N)/C_N \times 100$ can be obtained; for the conventional thermal swing separation process, a similar relation between the thermal energy consumed and the separation degree can also be obtained, given the information about the adsorption isotherm of the adsorbent materials.

The characteristics of an adsorption isotherm are dependent on the physio-chemical properties of the adsorbent material and the nature of the target organic pollutants to be separated. To estimate the energy consumption for the thermal swing separation process, a literature survey was conducted on several recently reported carbon materials (such as AC, CNTs, and graphene-based materials) used for water treatment by adsorption for removing various types of organics, and used the reported adsorption isotherm data to calculate the energy consumption.

Figure 14A:
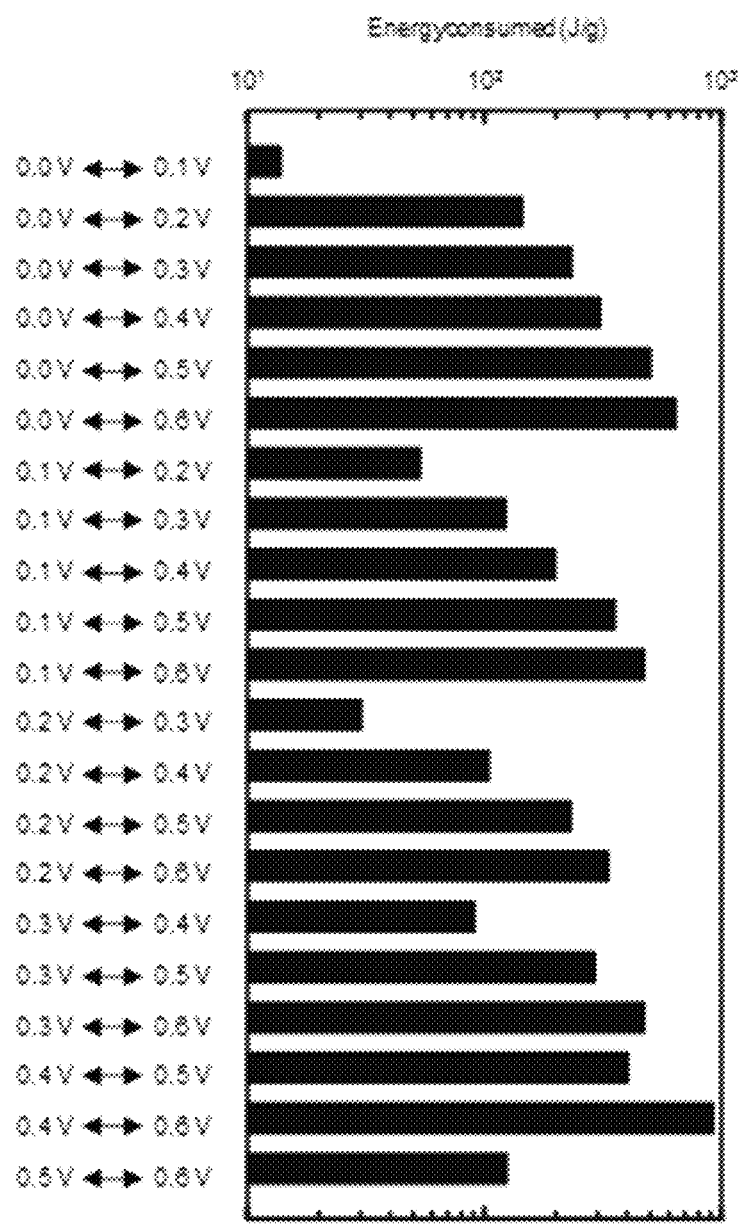
FIG. 14A shows the calculated energy consumption per gram of SOG removed (J/g) for the ETAS multi-stage cyclic operation with different potential pairs using an adsorbent comprising a hybrid coating of PVF/PPY, according to one set of embodiments.
Figure 14B:
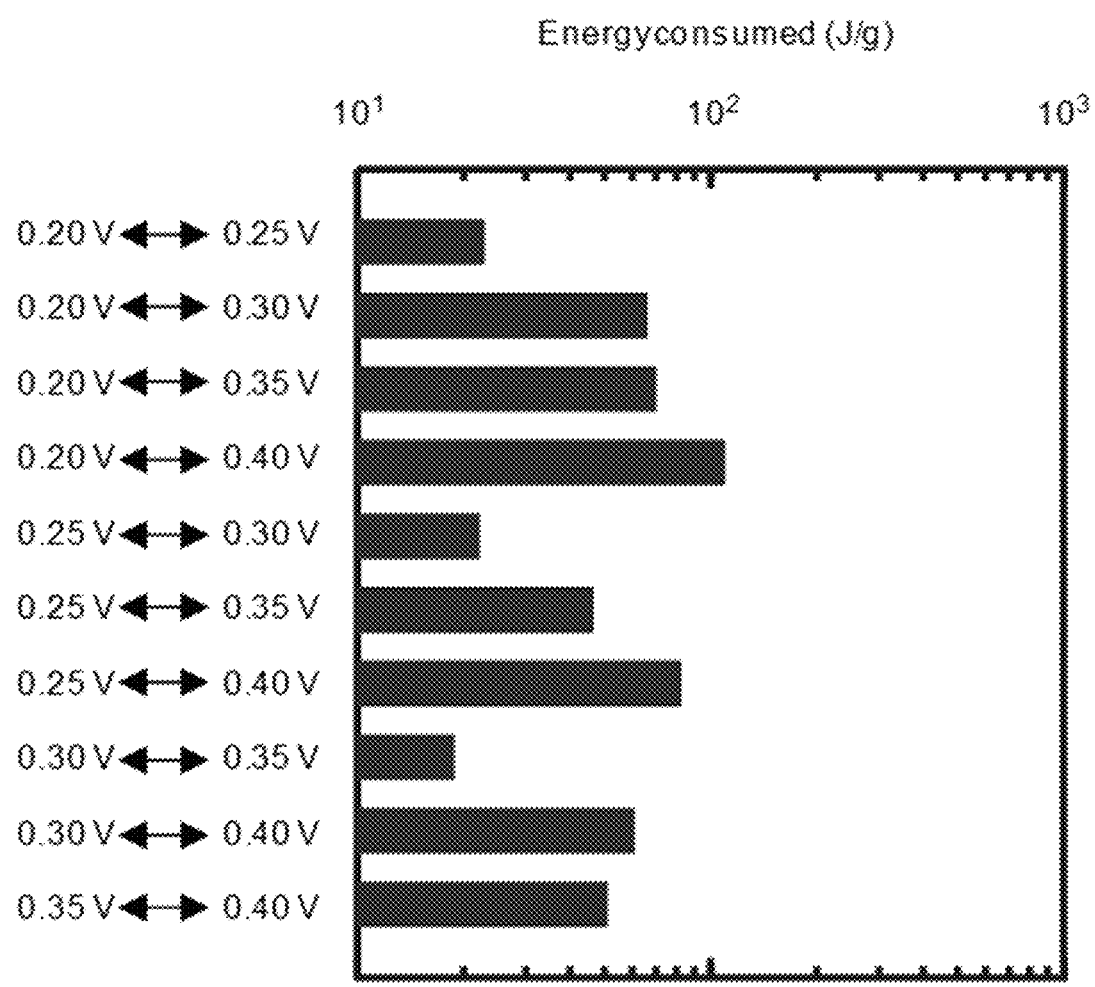
FIG. 14B shows the calculated energy consumption per gram of SOG removed (J/g) for the ETAS multi-stage cyclic operation with different potential pairs using an adsorbent comprising PVF/PPY/CNT, according to one set of embodiments.
Figure 15A:
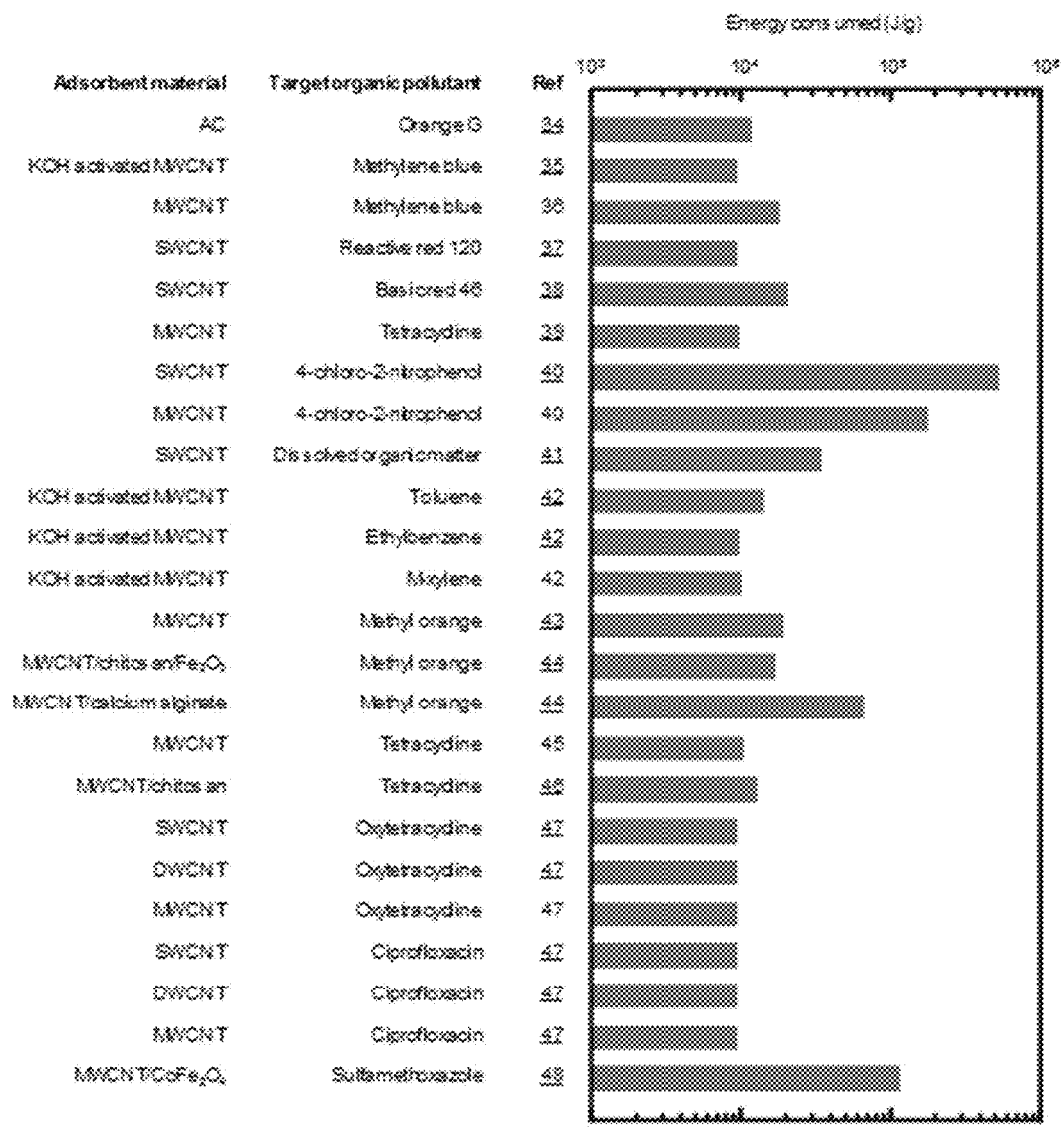
FIG. 15A shows the calculated energy consumption per gram of organic species removed (J/g) for the thermal swing adsorption/desorption process using an adsorbent comprising carbon, according to one set of embodiments.
Figure 15B:
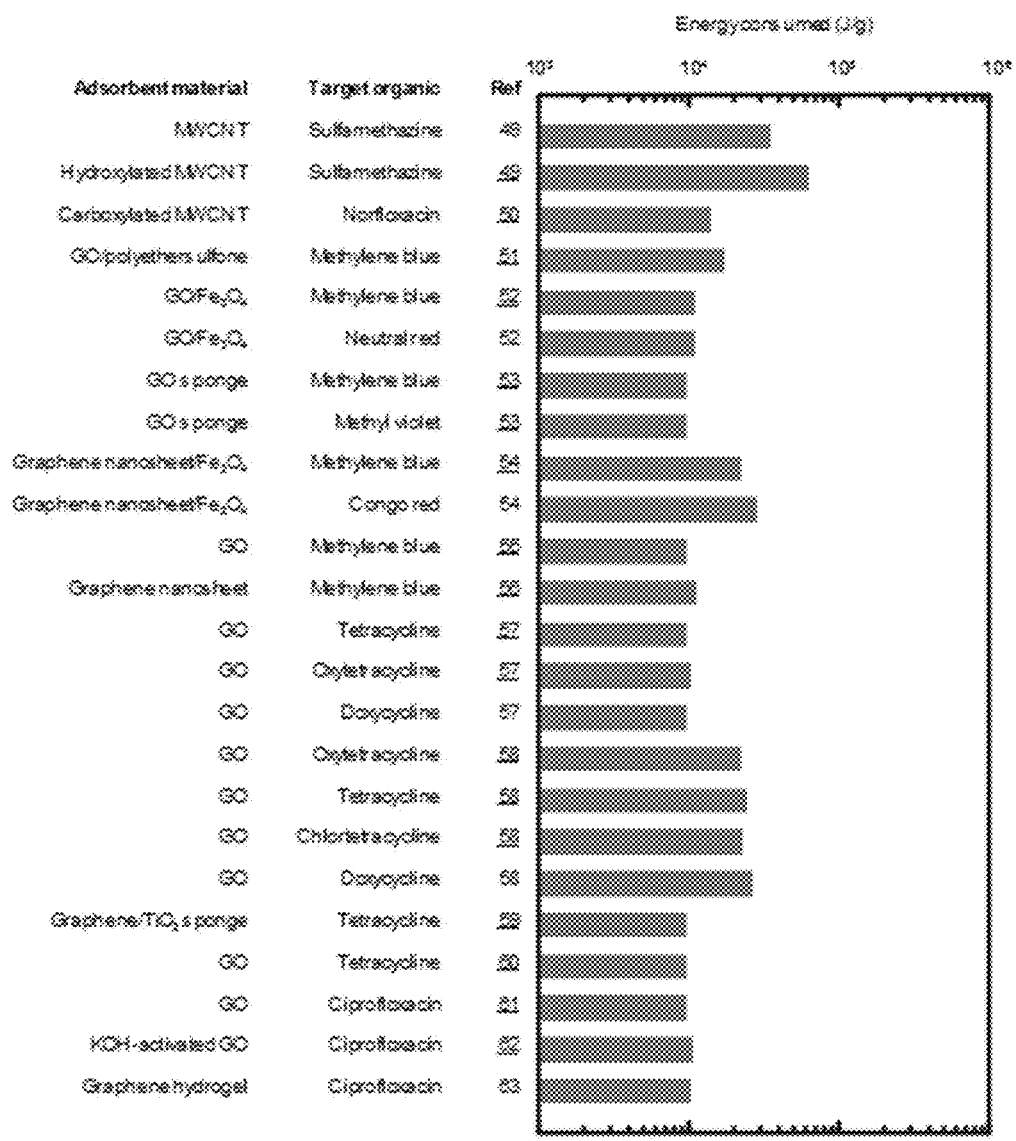
FIG. 15B shows a continuation of FIG. 15A.

One important metric for assessing the energetic efficiency and the overall effectiveness of a separation technology is the energy consumption per unit mass of organics removed (J/g). Based on the calculation scheme described above (see FIG. 13), the energy consumption per unit mass of organics removed was quantified for ETAS operating with different potential pairs (see FIGS. 14A-14B), as well as for the thermal swing adsorption/desorption process using the adsorption isotherms reported previously (see FIG. 15).

For ETAS operation, it is evident that a smaller difference between the paired potential results in a smaller energy use per gram of organics removed. Also, the use of PVF/PPY/CNT as the ETAS adsorbent is more energetically efficient than the use of PVF/PPY. The ETAS adsorbents require energy consumption around $10^2$ to $10^3$ J/g, whereas the thermal swing approach usually needs energy consumption around $10^4$ J/g. Therefore, the energy efficiency in ETAS is improved by at least one order of magnitude compared to that in the conventional thermal swing separation process. It has been estimated that in US alternative technologies that do not rely on heat could make most separation processes 10 times more energy efficient. To date, separation processes account for about 50% of US industrial energy use and about 15% of the nation's total energy consumption (commercial, transportation, residential, and industrial uses combined). The majority of current separation processes involve the use of heat (such as conventional adsorption and distillation), and thus are energy intensive. These thermal separation methods combined account for 80 percent of the energy consumed for industrial separations, and therefore constitute the most attractive target for improvement. Therefore, the development of separation technologies that do not depend on heat (such as ETAS) would be critical for significant reduction of energy use in US. In fact, it has been estimated by the US Department of Energy that new, energy efficient separation methods that do not heat, if applied to the US petroleum, chemical and paper manufacturing sectors alone, save 100 million tons of carbon dioxide emissions and 4 billion US dollars in energy costs per year.

Figure 16:
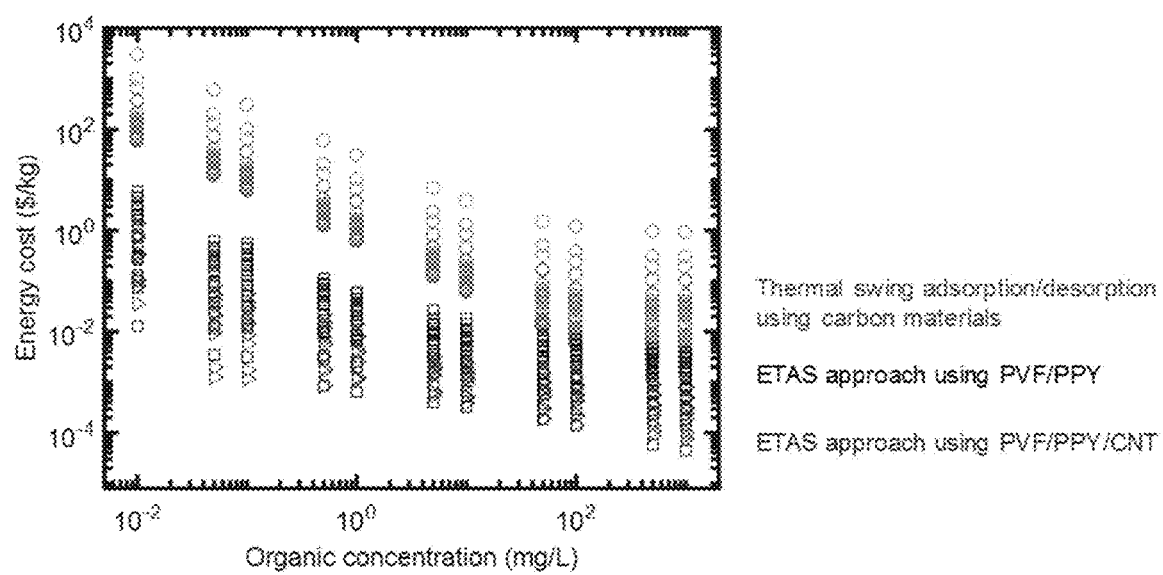
FIG. 16 shows a comparison of the energy cost per kilogram of organics removed ($/kg) between the ETAS approach and an adsorption/desorption process using carbon materials as the adsorbent, according to one set of embodiments

A more practical metric for comparing the economic viability between ETAS and the thermal swing separation technology should consider the cost of the energy source, which is electricity for ETAS and thermal energy for the thermal swing process. Based on the US Department of Energy and Energy Information Administration's national average data, the cost of electricity and heat is about $30.5 and $13.4 per million BTU (British thermal unit, about 0.0003 kilowatt-hours), respectively. Taking these costs into consideration, the cost required to remove one kilogram of organics was calculated (see FIG. 16), as a function of the typical range for the concentration of the organics. Considering the dependence of the energetic cost on the concentration range is important since it is necessary to compare separation technologies in a certain concentration range that is relevant to the target species to be separated. As shown in FIG. 16, ETAS is more economically viable than the conventional thermal swing separation process.

The key metrics for evaluating the performance of ETAS and the thermal swing adsorption/desorption process are summarized in Table 2, and the important factors that need to be considered when comparing the two separation technologies are summarized in Table 3.

TABLE 1

Important metrics for assessing the performance of ETAS and the thermal swing separation technology.

| Key metrics | Units |
| --- | --- |
| Organic adsorption capacity | mg g$^{-1}$ |
| Average adsorption rate | mg g$^{-1}$ min$^{-1}$ |
| Energy consumption per unit mass organic removed | J g$^{-1}$ |
| Energy cost (versus the organic concentration range) | $ kg$^{-1}$ |

TABLE 2

Key factors to be considered when comparing ETAS and the conventional thermal swing separation technology.

| | ETAS | Thermal Swing Separation Technology |
| --- | --- | --- |
| Materials production cost | Low (EAPs) | Low (carbon materials) |
| Equipment capital cost | Adsorber: low Desorber: low | Adsorber: low Desorber: high |
| Energy cost | Low | High |
| Scale up cost | High | Low |
| Materials reusability | Moderate | Good |
| Equipment long term stability | Good | Moderate |
| Clean water production rate | Low | High |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape and/or geometric relationship of or between, for example, one or more articles, structures, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described.

What is claimed is:

1. A method of separating an uncharged organic species from water, the method comprising:
    applying a first electrical potential to a first adsorbent while contacting the first adsorbent with a feed stream comprising water and the uncharged organic species, wherein the first electrical potential is suitable for adsorbing at least some of the uncharged organic species into the first adsorbent, thereby adsorbing at least some of the uncharged organic species into the first adsorbent;
    applying a second electrical potential to the first adsorbent having adsorbed uncharged organic species, while contacting the first adsorbent with a receiving stream comprising water, wherein the second electrical potential is suitable for desorbing at least some of the adsorbed uncharged organic species, thereby desorbing at least some of the adsorbed uncharged organic species from the first adsorbent into the receiving stream; and
    applying the second electrical potential to a second adsorbent having adsorbed uncharged organic species, while contacting the second adsorbent with a receiving stream, thereby desorbing at least some of the adsorbed uncharged organic species from the second adsorbent into the receiving stream with which the second adsorbent has been contacted;
    wherein the desorbing comprises dissociating the uncharged organic species from the first adsorbent and/or second adsorbent by hydrophilic interaction between the first adsorbent and the receiving stream and/or between the second adsorbent and the receiving stream.

2. The method of claim 1, comprising repeating the following steps of claim 1 a plurality of times:
    applying the second electrical potential to the first adsorbent having adsorbed uncharged organic species, while contacting the first adsorbent with the receiving stream comprising water, wherein the second electrical potential is suitable for desorbing at least some of the adsorbed uncharged organic species, thereby desorbing at least some of the adsorbed uncharged organic species from the first adsorbent into the receiving stream.

3. The method of claim 1, comprising repeating the following steps of claim 1 from 2 to 500 times:
    applying the second electrical potential to the first adsorbent having adsorbed uncharged organic species, while contacting the first adsorbent with the receiving stream comprising water, wherein the second electrical potential is suitable for desorbing at least some of the adsorbed uncharged organic species, thereby desorbing at least some of the adsorbed uncharged organic species from the first adsorbent into the receiving stream.

4. The method of claim 1, comprising repeating the following steps of claim 1 from 5 to 20 times:
    applying the second electrical potential to the first adsorbent having adsorbed uncharged organic species, while contacting the first adsorbent with the receiving stream comprising water, wherein the second electrical potential is suitable for desorbing at least some of the adsorbed uncharged organic species, thereby desorbing at least some of the adsorbed uncharged organic species from the first adsorbent into the receiving stream.

5. The method of claim 1, further comprising applying the first electrical potential to the second adsorbent while contacting the second adsorbent with a feed stream comprising water and the uncharged organic species wherein the first electrical potential is suitable for adsorbing at least some of the uncharged organic species into the second adsorbent, thereby adsorbing at least some of the uncharged organic species into the second adsorbent.

6. The method of claim 5, wherein the adsorbing comprises associating the uncharged organic species with the first adsorbent and/or second adsorbent by hydrophobic interaction between the uncharged organic species and the first adsorbent and/or between the uncharged organic species and the second adsorbent.

7. The method of claim 1, wherein the first adsorbent is redox active.

8. The method of claim 1, wherein the first adsorbent comprises a nanostructure.

9. The method of claim 8, wherein the nanostructure is a core-shell nanostructure.

10. The method of claim 1, wherein the first adsorbent comprises a carbon nanotube (CNT).

11. The method of claim 10, wherein the carbon nanotube is a metallic carbon nanotube.

12. The method of claim 1, wherein the first adsorbent comprises a coating.

13. The method of claim 12, wherein the coating comprises an organometallic polymer comprising an aromatic group.

14. The method of claim 13, wherein the organometallic polymer comprises polyvinylferrocene (PVF).

15. The method of claim 12, wherein the coating comprises a conducting polymer.

16. The method of claim 15, wherein the conducting polymer comprises polypyrrole (PPY).

17. The method of claim 12, wherein the coating comprises a hybrid of polyvinylferrocene/polypyrrole (PVF/PPY).

18. The method of claim 1, wherein the second adsorbent is redox active.

19. The method of claim 1, wherein the second adsorbent comprises a nanostructure.

20. The method of claim 19, wherein the nanostructure is a core-shell nanostructure.

21. The method of claim 1, wherein the second adsorbent comprises a carbon nanotube (CNT).

22. The method of claim 21, wherein the carbon nanotube is a metallic carbon nanotube.

23. The method of claim 1, wherein the second adsorbent comprises a coating.

24. The method of claim 23, wherein the coating comprises an organometallic polymer that comprises an aromatic group.

25. The method of claim 24, wherein the organometallic polymer comprises polyvinylferrocene (PVF).

26. The method of claim 23, wherein the coating comprises a conducting polymer.

27. The method of claim 26, wherein the conducting polymer comprises polypyrrole (PPY).

28. The method of claim 23, wherein the coating comprises a hybrid of polyvinylferrocene/polypyrrole (PVF/PPY).

29. The method of claim 12, wherein the coating has a conductivity from 1 S/cm to 200 S/cm.

30. The method of claim 12, wherein the coating has a Brunauer-Emmett-Teller surface area of between or equal to 10 m$^2$/g and 200 m$^2$/g.

31. The method of claim 1, wherein the ratio of the volume of the receiving stream to the volume of the feed stream, theta ($\theta$), is between or equal to 0.01 and 0.1.

32. The method of claim 1, wherein at least some of the uncharged organic species is transferred from the feed steam to the receiving stream.

33. The method of claim 32, wherein between 50% and 99% of the uncharged organic species is transferred from the feed stream to the receiving stream.

34. The method of claim 1, wherein the first electrical potential and the second electrical potential are applied at normal temperature and pressure.

35. The method of claim 1, wherein the first electrical potential is from 0.0 V to 0.4 V, referenced to an Ag/AgCl reference electrode.

36. The method of claim 1, wherein the first electrical potential is from 0.0 V to 0.32 V, referenced to an Ag/AgCl reference electrode.

37. The method of claim 1, wherein the uncharged organic species comprises a pesticide, pharmaceutical compound, a carcinogenic compound, and/or a dye.

38. The method of claim 1, wherein the organic species comprises 2,4-Dihydroxyazobenzene.

39. The method of claim 1, wherein the uncharged organic species is selected from the group consisting of 2,4-Dihydroxyazobenzene, 2,4-dichlorophenol (DCP), 2-naphthol (NT), 1-naphthylamine (NA), bisphenol A (BA), bisphenol S (BS), metolachlor (MC), ethinyl estradiol (EE), propranolol hydrochloride (PH), methyl orange (MO), rhodamine B (RB), and mixtures of these.

40. The method of claim 1, wherein a distribution coefficient ($K_d$) of the uncharged organic species with respect to the first adsorbent and/or second adsorbent is established.

41. The method of claim 40, wherein the $K_d$ of the uncharged organic species with respect to the first adsorbent and/or second adsorbent decreases as the applied electrical potential increases.

42. The method of claim 40, wherein the $K_d$ of the uncharged organic species with respect to the first adsorbent and/or second adsorbent is between or equal to $10^4$ mL/g and $10^6$ mL/g at an electrical potential of 0 V.

43. A method of separating an organic species from water, the method comprising:
applying a reductive potential to a first adsorbent while contacting the first adsorbent with a feed stream comprising water and the organic species, wherein the reductive potential is suitable for reducing the first adsorbent to a reduced state and adsorbing at least some of the organic species into the first adsorbent, thereby adsorbing at least some of the organic species into the first adsorbent;
applying an oxidative potential to the first adsorbent having adsorbed organic species, while contacting the first adsorbent with a receiving stream comprising water, wherein the oxidative potential is suitable for oxidizing the first adsorbent to an oxidized state and desorbing at least some of the adsorbed organic species, thereby desorbing at least some of the adsorbed organic species from the first adsorbent into the receiving stream; and
applying an oxidative potential to a second adsorbent having adsorbed organic species, while contacting the second adsorbent with the receiving stream, thereby oxidizing the second adsorbent to an oxidized state and desorbing at least some of the adsorbed organic species from the second adsorbent into the receiving stream with which the second adsorbent has been contacted;
wherein the desorbing comprises dissociating the organic species from the first adsorbent and/or second adsorbent by hydrophilic interaction between the first adsorbent and the receiving stream and/or between the second adsorbent and the receiving stream.

44. The method of claim 43, further comprising applying a reductive potential to the second adsorbent while contacting the second adsorbent with the feed stream, wherein the reductive potential is suitable for reducing the second adsorbent to a reduced state and adsorbing at least some of the organic species into the second adsorbent, thereby adsorbing at least some of the organic species into the second adsorbent.

45. The method of claim 43, wherein the adsorption comprises associating the organic species with the first adsorbent and/or second adsorbent by hydrophobic interaction between the organic species and the first adsorbent and/or between the organic species and the second adsorbent.

46. The method of claim 43, wherein the organic species is an uncharged organic species.

47. The method of claim 43, wherein the organic species comprises a pesticide, pharmaceutical compound, a carcinogenic compound, and/or a dye.

48. The method of claim 43, wherein the organic species comprises 2,4-Dihydroxyazobenzene.

49. The method of claim 43, wherein the organic species is selected from the group consisting of 2,4-Dihydroxyazobenzene, 2,4-dichlorophenol (DCP), 2-naphthol (NT), 1-naphthylamine (NA), bisphenol A (BA), bisphenol S (BS), metolachlor (MC), ethinyl estradiol (EE), propranolol hydrochloride (PH), methyl orange (MO), rhodamine B (RB), and mixtures of these.

50. The method of claim 43, wherein the reductive potential is from 0.0 V to 0.2 V, referenced to an Ag/AgCl reference electrode.

51. The method of claim 43, wherein the oxidative potential applied to the first adsorbent is from 0.3 V to 0.6 V, referenced to an Ag/AgCl reference electrode.

52. The method of claim 43, wherein the reductive potential and/or oxidative potential applied to the first adsorbent is applied at normal temperature and pressure.

53. The method of claim 43, wherein the oxidative potential and reductive potential applied to the first adsorbent differ by 0.1 V to 0.6 V, referenced to an Ag/AgCl reference electrode.

54. The method of claim 43, wherein the oxidative potential and reductive potential applied to the first adsorbent differ by 0.15 V to 0.25 V, referenced to an Ag/AgCl reference electrode.

55. The method of claim 43, wherein the first adsorbent is redox active.

56. The method of claim 43, wherein the first adsorbent comprises a nanostructure.

57. The method of claim 56, wherein the nanostructure is a core-shell nanostructure.

58. The method of claim 43, wherein the first adsorbent comprises a carbon nanotube (CNT).

59. The method of claim 58, wherein the carbon nanotube is a metallic carbon nanotube.

60. The method of claim 55, wherein the second adsorbent comprises a coating.

61. The method of claim 60, wherein the coating comprises an organometallic polymer comprising an aromatic group.

62. The method of claim 61, wherein the organometallic polymer comprises polyvinylferrocene (PVF).

63. The method of claim 60, wherein the coating comprises a conducting polymer.

64. The method of claim 63, wherein the conducting polymer comprises polypyrrole (PPY).

65. The method of claim 60, wherein the coating comprises a hybrid of polyvinylferrocene/polypyrrole (PVF/PPY).

66. The method of claim 43, wherein the second adsorbent is redox active.

67. The method of claim 43, wherein the second adsorbent comprises a nanostructure.

68. The method of claim 67, wherein the nanostructure is a core-shell nanostructure.

69. The method of claim 43, wherein the second adsorbent comprises a carbon nanotube (CNT).

70. The method of claim 69, wherein the carbon nanotube is a metallic carbon nanotube.

71. The method of claim 66, wherein the second adsorbent comprises a coating.

72. The method of claim 71, wherein the coating comprises an organometallic polymer that comprises an aromatic group.

73. The method of claim 72, wherein the organometallic polymer comprises polyvinylferrocene (PVF).

74. The method of claim 71, wherein the coating comprises a conducting polymer.

75. The method of claim 74, wherein the conducting polymer comprises polypyrrole (PPY).

76. The method of claim 71, wherein the coating comprises a hybrid of polyvinylferrocene/polypyrrole (PVF/PPY).

77. The method of claim 60, wherein the coating has a conductivity between or equal to 1 S/cm and 200 S/cm.

78. The method of claim 60, wherein the coating has a Brunauer-Emmett-Teller surface area of between or equal to 10 $m^2/g$ and 200 $m^2/g$.

79. The method of claim 43, wherein the ratio of the volume of the receiving stream to the volume of the feed stream, theta ($\theta$), is between or equal to 0.01 and 0.1.

80. The method of claim 43, wherein at least some of the organic species is transferred from the feed stream to the receiving stream.

81. The method of claim 70, wherein at least 50%, at least 60%, at least 70%, at least 80%, at least 90%, at least 95%, at least 98%, or at least 99% of the organic species is transferred from the feed stream to the receiving stream.

82. A method of separating an uncharged organic species from water, the method comprising:
applying a first electrical potential to a first adsorbent while contacting the first adsorbent with a feed stream comprising water and the uncharged organic species, wherein the first electrical potential is suitable for adsorbing at least some of the uncharged organic species into the first adsorbent, thereby adsorbing at least some of the uncharged organic species into the first adsorbent;
applying a second electrical potential to the first adsorbent having adsorbed uncharged organic species, while contacting the first absorbent with a receiving stream comprising water, wherein the second electrical potential is suitable for desorbing at least some of the adsorbed uncharged organic species, thereby desorbing at least some of the adsorbed uncharged organic species from the first adsorbent into the receiving stream; and
applying the second electrical potential to a second adsorbent having adsorbed uncharged organic species, while contacting the second adsorbent with a receiving stream, thereby desorbing at least some of the adsorbed uncharged organic species from the second adsorbent into the receiving stream with which the second adsorbent has been contacted;
wherein the first and/or second adsorbent comprises a core-shell nanostructure.

83. A method of separating an organic species from water, the method comprising:

applying a reductive potential to a first adsorbent while contacting the first adsorbent with a feed stream comprising water and the organic species, wherein the reductive potential is suitable for reducing the first adsorbent to a reduced state and adsorbing at least some of the organic species into the first adsorbent, thereby adsorbing at least some of the organic species into the first adsorbent;

applying an oxidative potential to the first adsorbent having adsorbed organic species, while contacting the first adsorbent with a receiving stream comprising water, wherein the oxidative potential is suitable for oxidizing the first adsorbent to an oxidized state and desorbing at least some of the adsorbed organic species, thereby desorbing at least some of the adsorbed organic species from the first adsorbent into the receiving stream; and applying an oxidative potential to a second adsorbent having adsorbed organic species, while contacting the second adsorbent with the receiving stream, thereby oxidizing the second adsorbent to an oxidized state and desorbing at least some of the adsorbed organic species from the second adsorbent into the receiving stream with which the second adsorbent has been contacted;

wherein the first and/or second adsorbent comprises a core-shell nanostructure.

\* \* \* \* \*